US012657066B2

(12) United States Patent (10) Patent No.: US 12,657,066 B2
Ming Chang (45) Date of Patent: Jun. 16, 2026

(54) PARTITION A TENSOR WITH VARYING GRANULARITY LEVELS IN SHUFFLED SECURE MULTIPARTY COMPUTATION

(71) Applicant: Micron Technology, Inc., Boise, ID (US)

(72) Inventor: Andre Xian Ming Chang, Bellevue, WA (US)

(73) Assignee: Micron Technology, Inc., Boise, ID (US)

( * ) Notice: Subject to any disclaimer, the term of this patent is extended or adjusted under 35 U.S.C. 154(b) by 912 days.

(21) Appl. No.: 17/715,877

(22) Filed: Apr. 7, 2022

(65) Prior Publication Data

US 2023/0325251 A1 Oct. 12, 2023

(51) Int. Cl.
 *G06F 15/16* (2006.01)
 *G06F 9/50* (2006.01)
 *G06F 21/62* (2013.01)
 *H04L 9/00* (2022.01)
(52) U.S. Cl.
 CPC ........ *G06F 9/5066* (2013.01); *G06F 21/6254* (2013.01); *G06F 2209/5017* (2013.01); *H04L 9/008* (2013.01); *H04L 2209/46* (2013.01)
(58) Field of Classification Search
 CPC .............. G06F 9/5066; G06F 21/6254; G06F 2209/5017; H04L 9/008; H04L 2209/46
 USPC ........................................................ 709/203
 See application file for complete search history.

(56) References Cited

U.S. PATENT DOCUMENTS 6,487,549 B1 11/2002 Amundsen
6,502,089 B1 12/2002 Amundsen et al.

6,745,173 B1 6/2004 Amundsen
9,092,802 B1 7/2015 Akella
10,275,287 B2 4/2019 Manhardt et al.
11,010,666 B1 5/2021 Terilla et al.
11,366,783 B1 6/2022 Prabhakar et al.
11,385,875 B2 7/2022 Xu
11,442,775 B1 9/2022 Yu et al.
11,675,693 B2 6/2023 Baum et al.
(Continued)

FOREIGN PATENT DOCUMENTS

CN 111784018 10/2020

OTHER PUBLICATIONS

Kaya, Oguz, et al., "Scalable sparse tensor deompositions in distributed memory systems." International Conference for High Performance Computing, Networking, Storage and Analysis (SC15). HAL Open Science, Nov. 2015.
(Continued)

*Primary Examiner* — Alan S Chou
(74) *Attorney, Agent, or Firm* — Greenberg Traurig

(57) ABSTRACT

Protection of access to a tensor in outsourcing deep learning computations via shuffling. For example, the tensor in the computation of an artificial neural network can be partitioned into portions of different sizes. The computing tasks can be generated for operating on the portions such that the results of the computing tasks can be combined to obtain the result of a computing task operates on the tensor in the computation of the artificial neural network. The computing tasks can be shuffled for distribution out of order to external entities. The partitioning and shuffling can prevent the external entities from accessing and/or reconstructing the tensor.

20 Claims, 25 Drawing Sheets

(56) References Cited

U.S. PATENT DOCUMENTS

| | | | |
|---|---|---|---|
| 11,676,003 | B2 | 6/2023 | Darvish Rouhani et al. |
| 12,153,688 | B2 | 11/2024 | Yang et al. |
| 2012/0240124 | A1 | 9/2012 | Lipton et al. |
| 2013/0339414 | A1 | 12/2013 | Hayes |
| 2017/0089689 | A1 | 3/2017 | Boyle et al. |
| 2018/0205707 | A1 | 7/2018 | Bellala et al. |
| 2018/0315399 | A1 | 11/2018 | Kaul et al. |
| 2018/0341483 | A1 | 11/2018 | Fowers et al. |
| 2019/0042092 | A1* | 2/2019 | Wu ..................... G06N 3/063 |
| 2019/0258953 | A1 | 8/2019 | Ulrich |
| 2020/0042867 | A1 | 2/2020 | Shao |
| 2020/0042875 | A1* | 2/2020 | Shazeer .............. G06F 16/9024 |
| 2020/0142441 | A1 | 5/2020 | Bunandar et al. |
| 2020/0160181 | A1 | 5/2020 | Zlateski et al. |
| 2020/0272596 | A1 | 8/2020 | Narayanamoorthy et al. |
| 2020/0348997 | A1 | 11/2020 | Owechko |
| 2020/0403781 | A1 | 12/2020 | Gentry et al. |
| 2020/0409664 | A1 | 12/2020 | Li et al. |
| 2021/0034582 | A1 | 2/2021 | Liu et al. |
| 2021/0051007 | A1 | 2/2021 | Li et al. |
| 2021/0241108 | A1 | 8/2021 | Chai et al. |
| 2021/0248002 | A1 | 8/2021 | Li et al. |
| 2021/0256386 | A1 | 8/2021 | Wieman et al. |
| 2021/0264250 | A1 | 8/2021 | Singh et al. |
| 2022/0012578 | A1 | 1/2022 | Brady et al. |
| 2022/0084371 | A1 | 3/2022 | Semichev et al. |
| 2022/0092386 | A1 | 3/2022 | Zhou et al. |
| 2022/0108156 | A1 | 4/2022 | Hunter et al. |
| 2022/0114014 | A1 | 4/2022 | Chen et al. |
| 2022/0114475 | A1 | 4/2022 | Zhu et al. |
| 2022/0121903 | A1 | 4/2022 | Zhang et al. |
| 2022/0245453 | A1 | 8/2022 | Majnemer et al. |
| 2022/0277196 | A1 | 9/2022 | Flint |
| 2022/0284114 | A1 | 9/2022 | Klein et al. |
| 2022/0329407 | A1* | 10/2022 | Soceanu ................. H04L 9/008 |
| 2022/0360778 | A1 | 11/2022 | Yang et al. |
| 2022/0374762 | A1 | 11/2022 | Radhakrishnan et al. |
| 2022/0374763 | A1 | 11/2022 | Gu et al. |
| 2022/0382908 | A1 | 12/2022 | Buddhavarapu et al. |
| 2022/0391172 | A1 | 12/2022 | Imber et al. |
| 2022/0391702 | A1* | 12/2022 | Lin ......................... G06N 3/045 |
| 2023/0023101 | A1* | 1/2023 | Su ........................... G06F 17/16 |
| 2023/0053311 | A1* | 2/2023 | Aharoni ................... G06N 3/04 |
| 2023/0053566 | A1* | 2/2023 | Horne ................. G06F 21/6227 |
| 2023/0100036 | A1* | 3/2023 | Park ...................... G06F 7/5443 |
| | | | 714/48 |
| 2023/0177000 | A1* | 6/2023 | Huang ................ G06F 9/30036 |
| | | | 712/17 |
| 2023/0177489 | A1 | 6/2023 | Chan et al. |
| 2023/0244448 | A1 | 8/2023 | Avudaiyappan et al. |
| 2023/0306272 | A1 | 9/2023 | Ming Chang et al. |
| 2023/0325250 | A1* | 10/2023 | Ming Chang ......... G06F 9/5066 |
| | | | 718/104 |
| 2023/0325252 | A1 | 10/2023 | Ming Chang |
| 2023/0325529 | A1 | 10/2023 | Sav et al. |
| 2023/0325627 | A1 | 10/2023 | Ming Chang |
| 2023/0325633 | A1 | 10/2023 | Ming Chang |
| 2023/0325653 | A1 | 10/2023 | Ming Chang |
| 2023/0403143 | A1 | 12/2023 | Tsuchida et al. |
| 2024/0037451 | A1 | 2/2024 | Sone et al. |
| 2024/0256850 | A1* | 8/2024 | Soceanu ................. H04L 9/008 |

OTHER PUBLICATIONS

Shuffled Secure Multiparty Deep Learning, U.S. Appl. No. 17,715,768, filed Apr. 7, 2022, Andre Xian Ming Chang, Docketed New Case—Ready for Examination, Apr. 29, 2022.

Secure Multiparty Deep Learning via Shuffling and Offsettin, U.S. Appl. No. 17/715,798, filed Apr. 7, 2022, Andre Xian Ming Chang, Docketed New Case—Ready for Examination, May 11, 2022.

Secure Artificial Neural Network Models in Outsourcing Deep Learning Computation, U.S. Appl. No. 17/715,835, filed Apr. 7, 2022, Andre Xian Ming Chang, Docketed New Case—Ready for Examination, May 2, 2022.

Split a Tensor for Shuffling in Outsourcing Computation Tasks, U.S. Appl. No. 17,715,863, filed Apr. 7, 2022, Andre Xian Ming Chang, Docketed New Case—Ready for Examination, May 9, 2022.

Non-uniform Splitting of a Tensor in Shuffled Secure Multiparty Computation, U.S. Appl. No. 17/715,885, filed Apr. 7, 2022, Andre Xian Ming Chang, Docketed New Case—Ready for Examination, May 9, 2022.

D. Evans, V. Kolesnikov, and M. Rosulek. A Pragmatic Introduction to Secure Multi-Party Computation. NOW Publishers, 2018.

Damgard, Ivan, et al. "Multiparty computation from somewhat homomorphic encryption." Annual Cryptology Conference. Springer, Berlin, Heidelberg, 2012.

Homomorphic Encryption, Wikipedia, printed on Nov. 18, 2021.

Knott, Brian, et al. "CrypTen Secure multi-party computation meets machine learning." arXiv preprint arXiv:2109.00984 (2021).

Patel, Kinjal. "Secure multiparty computation using secret sharing." 2016 International Conference on Signal Processing, Communication, Power and Embedded System (SCOPES). IEEE, 2016.

Attia, Mohamed Adel, et al., "Near Optimal Coded Data Shuffling for Distributed Learning." IEEE Transactions on Information Theory, Nov. 2019.

Fan, Fenglei, et al., "Learning From Pseudo-Randomness With an Artificial Neural Network—Does God Play Pseudo-Dice?" IEEE Access, Apr. 26, 2018.

Tang, Wei, et al., "How to Train a Compact Binary Neural Network with High Accuracy?" Association for the Advancement of Artificial Intelligence, Proceedings of the AAAI conference on artificial intelligence, 2017.

Govindu, Venu Madhav, "A Tensor Decomposition for Geometric Grouping and Segmentation." IEEE, Jun. 2005.

Thuen, Marte, "Manganese-enhanced and diffusion tensor MR imaging of the normal, injured and regenerating rat visual pathway." Norwegian University of Science and Technology, Doctoral Thesis, Jul. 2008.

Cheu, Albert, et al., "Distributed differential privacy via shuffling." Annual International Conference on the Theory and Applications of Cryptographic Techniques, Springer International Publishing, 2019.

Zheng, Fei, et al., "Towards secure and practical machine learning via secret sharing and random permutation." Knowledge-Based Systems 245, 2022.

Li, Xinsheng, et al., "M2TD: Multi-Task Tensor Decomposition for Sparse Ensemble Simulations." Institute of Electrical and Electronics Engineers Inc., 2021.

* cited by examiner

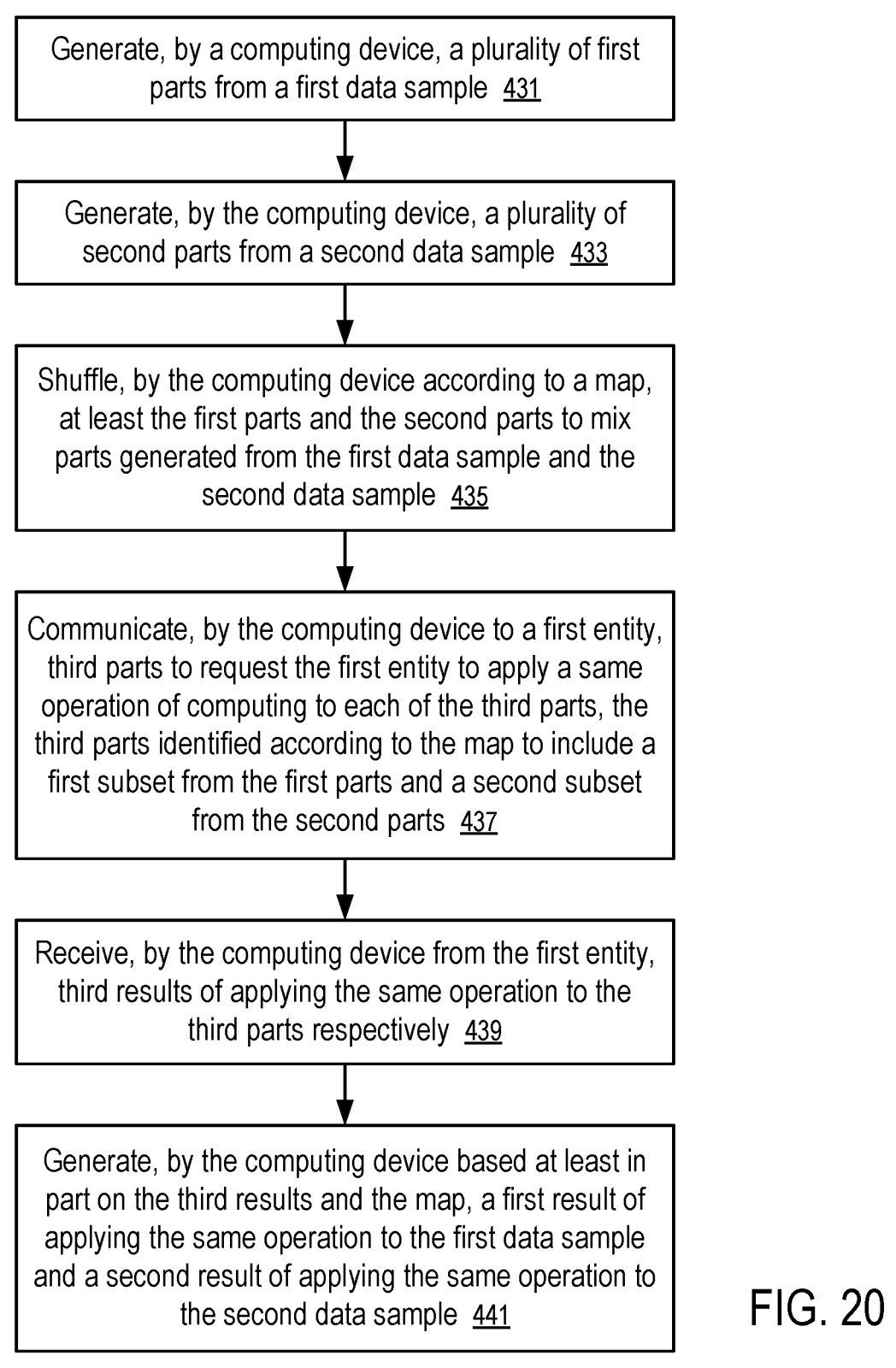

Generate, by a computing device, a plurality of first parts from a first data sample  431

Generate, by the computing device, a plurality of second parts from a second data sample  433

Shuffle, by the computing device according to a map, at least the first parts and the second parts to mix parts generated from the first data sample and the second data sample  435

Communicate, by the computing device to a first entity, third parts to request the first entity to apply a same operation of computing to each of the third parts, the third parts identified according to the map to include a first subset from the first parts and a second subset from the second parts  437

Receive, by the computing device from the first entity, third results of applying the same operation to the third parts respectively  439

Generate, by the computing device based at least in part on the third results and the map, a first result of applying the same operation to the first data sample and a second result of applying the same operation to the second data sample  441

FIG. 20

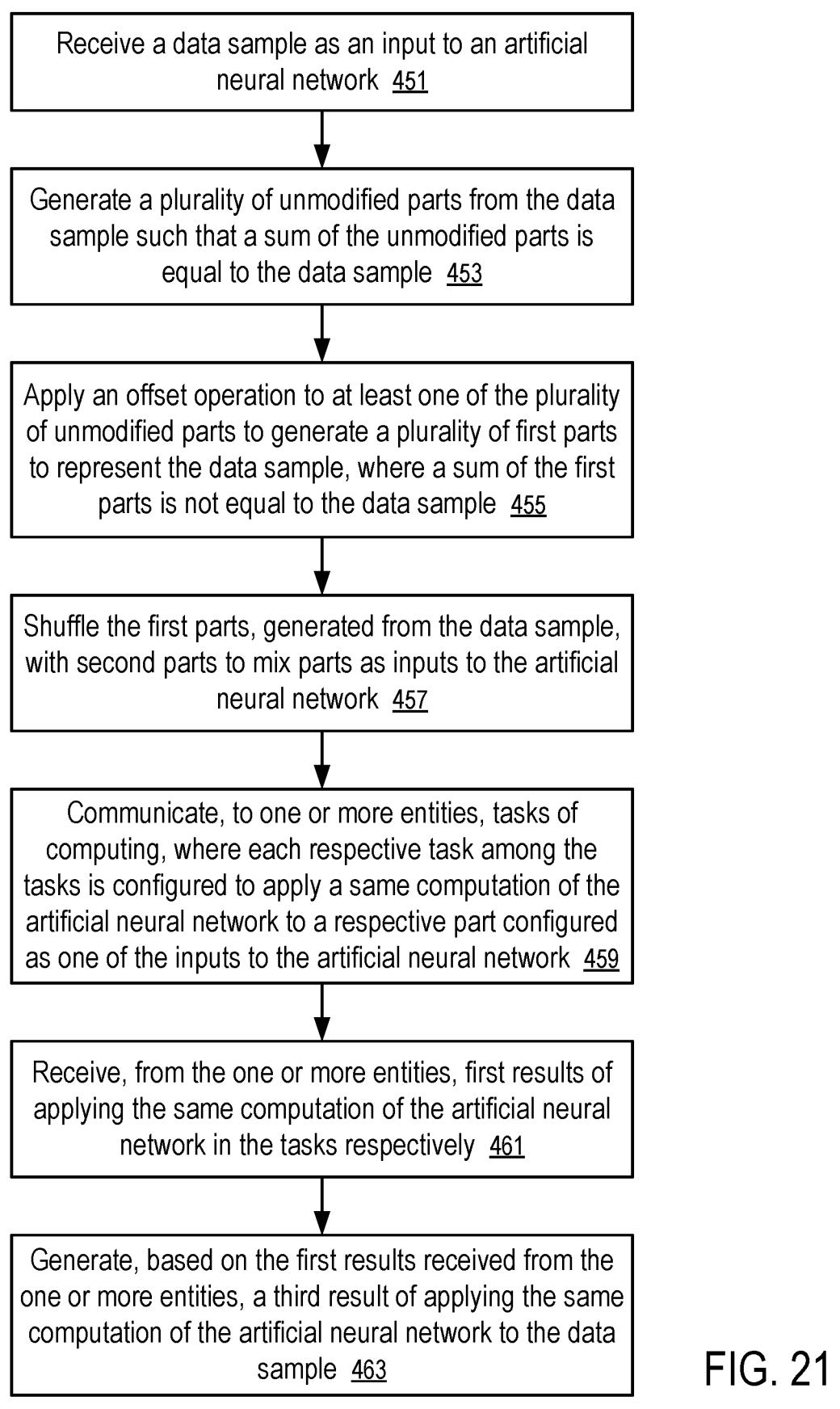

Receive a data sample as an input to an artificial neural network  451

↓

Generate a plurality of unmodified parts from the data sample such that a sum of the unmodified parts is equal to the data sample  453

↓

Apply an offset operation to at least one of the plurality of unmodified parts to generate a plurality of first parts to represent the data sample, where a sum of the first parts is not equal to the data sample  455

↓

Shuffle the first parts, generated from the data sample, with second parts to mix parts as inputs to the artificial neural network  457

↓

Communicate, to one or more entities, tasks of computing, where each respective task among the tasks is configured to apply a same computation of the artificial neural network to a respective part configured as one of the inputs to the artificial neural network  459

↓

Receive, from the one or more entities, first results of applying the same computation of the artificial neural network in the tasks respectively  461

↓

Generate, based on the first results received from the one or more entities, a third result of applying the same computation of the artificial neural network to the data sample  463

FIG. 21

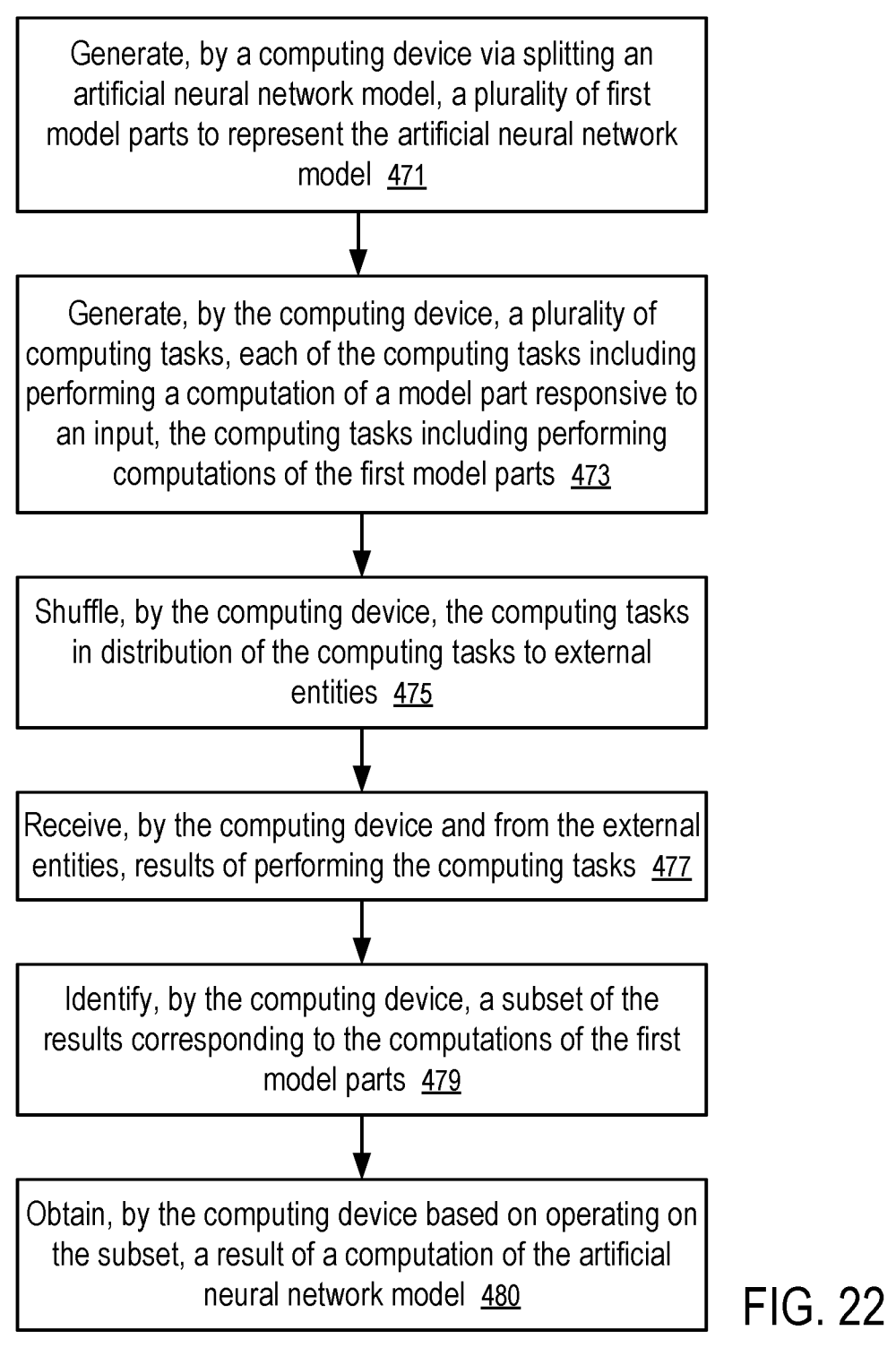

Generate, by a computing device via splitting an artificial neural network model, a plurality of first model parts to represent the artificial neural network model  471

↓

Generate, by the computing device, a plurality of computing tasks, each of the computing tasks including performing a computation of a model part responsive to an input, the computing tasks including performing computations of the first model parts  473

↓

Shuffle, by the computing device, the computing tasks in distribution of the computing tasks to external entities  475

↓

Receive, by the computing device and from the external entities, results of performing the computing tasks  477

↓

Identify, by the computing device, a subset of the results corresponding to the computations of the first model parts  479

↓

Obtain, by the computing device based on operating on the subset, a result of a computation of the artificial neural network model  480

FIG. 22

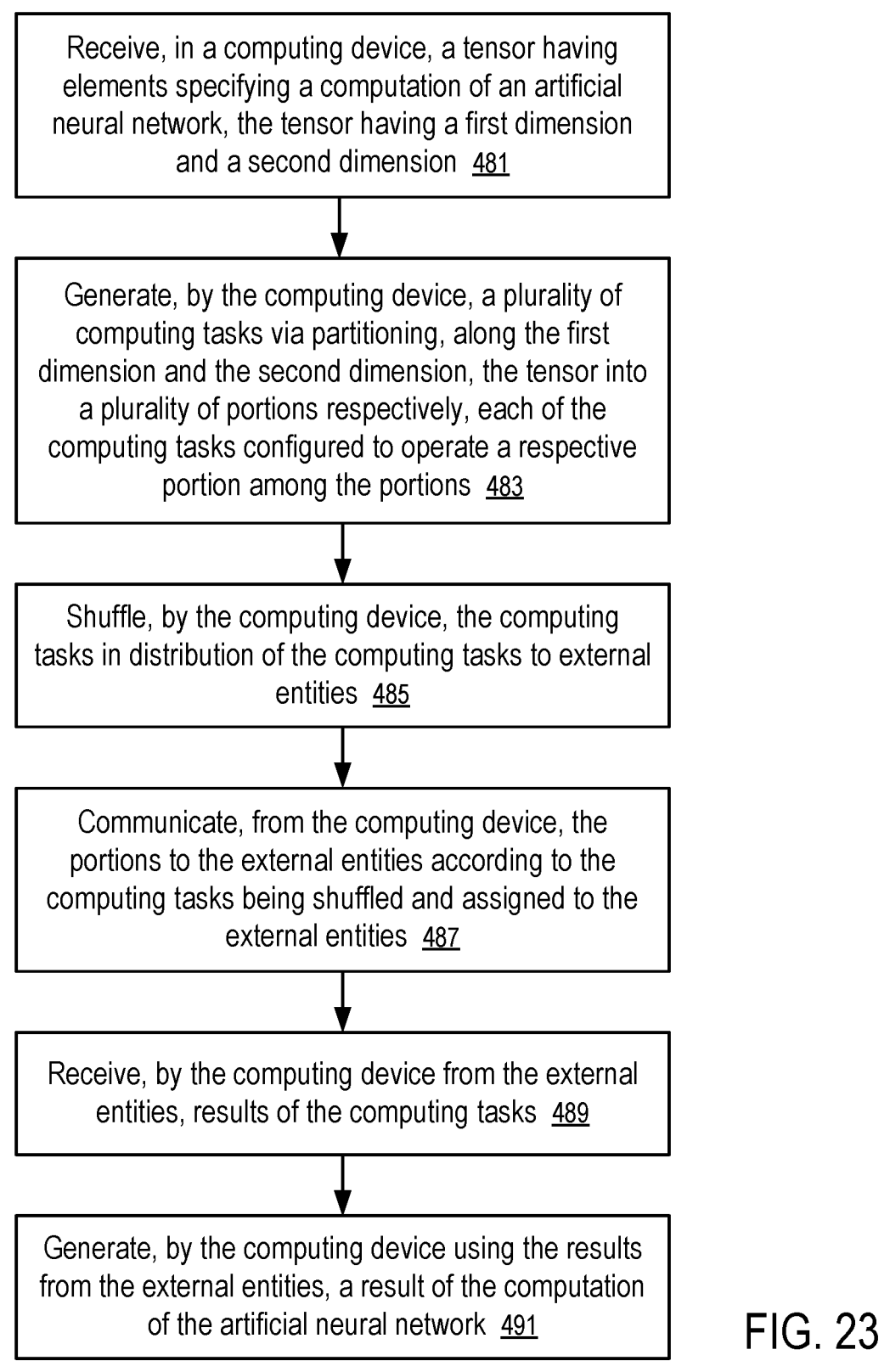

Receive, in a computing device, a tensor having elements specifying a computation of an artificial neural network, the tensor having a first dimension and a second dimension 481

↓

Generate, by the computing device, a plurality of computing tasks via partitioning, along the first dimension and the second dimension, the tensor into a plurality of portions respectively, each of the computing tasks configured to operate a respective portion among the portions 483

↓

Shuffle, by the computing device, the computing tasks in distribution of the computing tasks to external entities 485

↓

Communicate, from the computing device, the portions to the external entities according to the computing tasks being shuffled and assigned to the external entities 487

↓

Receive, by the computing device from the external entities, results of the computing tasks 489

↓

Generate, by the computing device using the results from the external entities, a result of the computation of the artificial neural network 491

FIG. 23

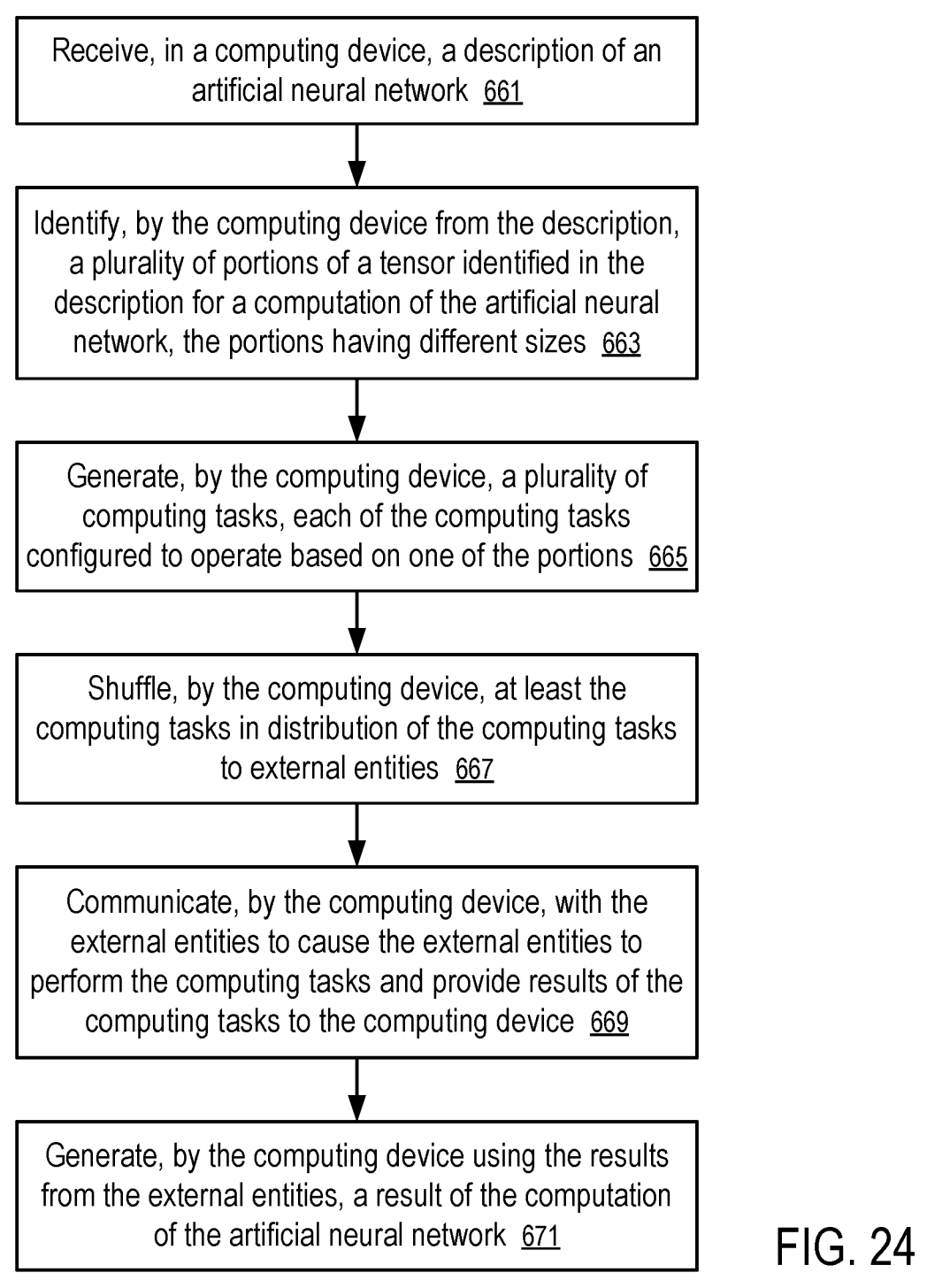

Receive, in a computing device, a description of an artificial neural network 661

↓

Identify, by the computing device from the description, a plurality of portions of a tensor identified in the description for a computation of the artificial neural network, the portions having different sizes 663

↓

Generate, by the computing device, a plurality of computing tasks, each of the computing tasks configured to operate based on one of the portions 665

↓

Shuffle, by the computing device, at least the computing tasks in distribution of the computing tasks to external entities 667

↓

Communicate, by the computing device, with the external entities to cause the external entities to perform the computing tasks and provide results of the computing tasks to the computing device 669

↓

Generate, by the computing device using the results from the external entities, a result of the computation of the artificial neural network 671

FIG. 24

PARTITION A TENSOR WITH VARYING GRANULARITY LEVELS IN SHUFFLED SECURE MULTIPARTY COMPUTATION

TECHNICAL FIELD

At least some embodiments disclosed herein relate to secured multiparty computing in general and more particularly, but not limited to, computing using accelerators for Artificial Neural Networks (ANNs), such as ANNs configured through machine learning and/or deep learning.

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

FIG. 20 shows a method of shuffled secure multiparty deep learning computation according to one embodiment.

FIG. 21 shows another method of shuffled secure multiparty deep learning computation according to one embodiment.

FIG. 22 shows a method to secure computation models in outsourcing tasks of deep learning computation according to one embodiment.

FIG. 23 shows a method to secure data via splitting a tensor in outsourcing tasks of deep learning computation according to one embodiment.

FIG. 24 shows a method to secure data via partitioning a tensor into portions with varying granularity levels according to one embodiment.

DETAILED DESCRIPTION

Figure 1:
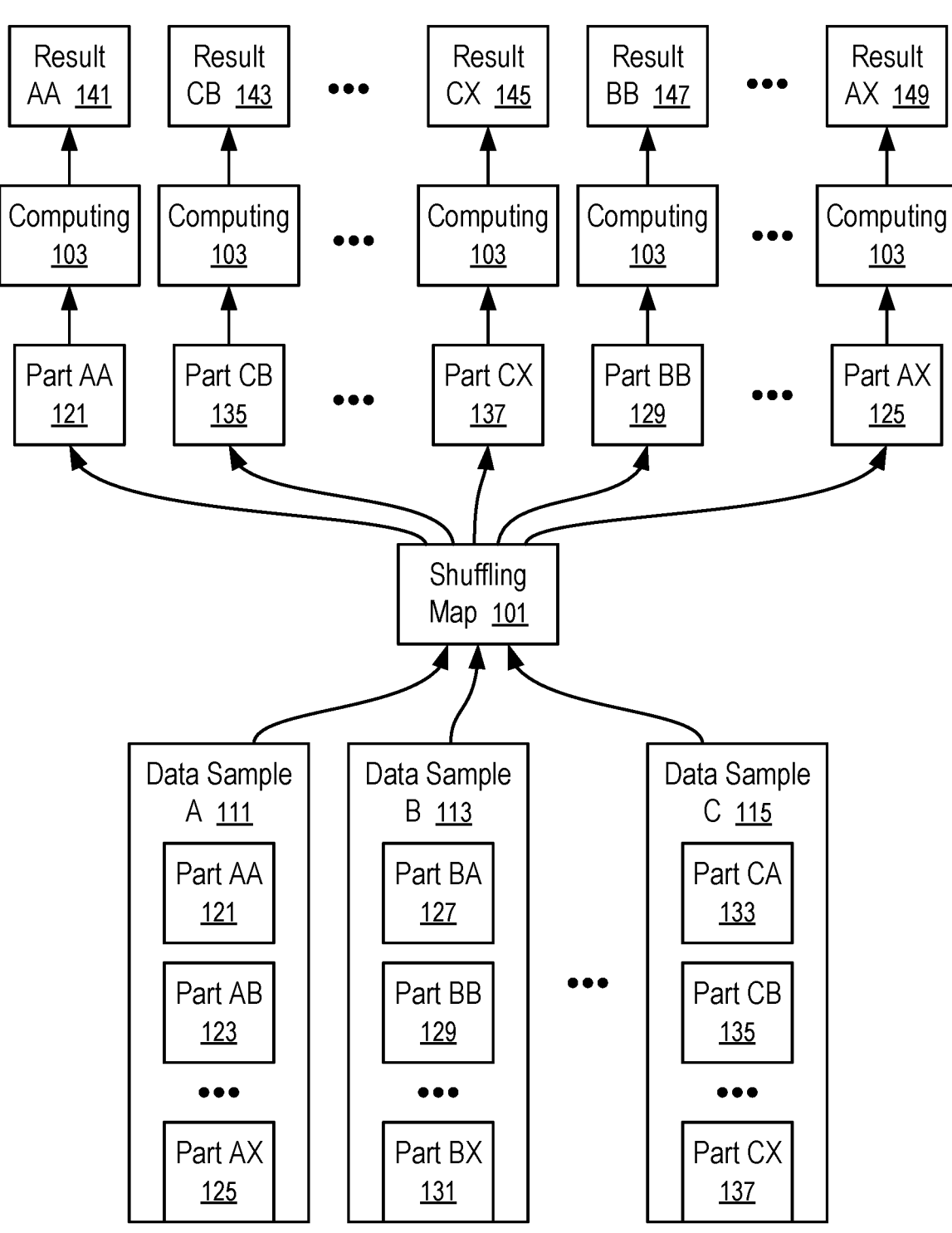
FIG. 1 illustrates the distribution of shuffled, randomized data parts from different data samples for outsourced computing according to one embodiment.

At least some embodiments disclosed herein provide techniques to shuffle data parts of deep learning data samples for data privacy protection in outsource deep learning computations.

Conventional techniques of Secure Multi-Party Computation (SMPC) are based on Homomorphic Encryption. When Homomorphic Encryption is applied, the order of decryption and a computation/operation can be changed/switched without affecting the result. For example, the sum of the ciphertexts of two numbers can be decrypted to obtain the same result of summing the two numbers in clear text. To protect data privacy, a conventional SMPC is configured to provide ciphertexts of data to be operated upon in a computation to external parties in outsourcing the computation (e.g., summation). The results (e.g., sum of the ciphertexts) are decrypted by the data owner to obtain the results of the computation (e.g., addition) as applied to the clear texts.

The encryption key used in Homomorphic Encryption is typically longer than the clear texts of the numbers. As a result, a high precision circuit is required to operate on the ciphertexts in order to handle the ciphertexts that are much longer than the corresponding clear texts in their bit length.

However, typical Deep Learning Accelerators (DLAs) are not configured to with such high precision circuits in performing operations such as multiplication and accumulation of vectors and/or matrices. The lack of high precision circuits (e.g., for multiplication and accumulation operations) can prevent the use of conventional techniques of Secure Multi-Party Computation (SMPC) with such Deep Learning Accelerators (DLAs).

At least some aspects of the present disclosure address the above and other deficiencies by securing data privacy in outsource deep learning computations through shuffling randomized data parts. When the data privacy is protected via shuffling, the use of a long encryption key to create ciphertexts for task outsourcing can be eliminated. As a result, typical Deep Learning Accelerators (DLAs) that do not have high precision circuits (e.g., for acceleration of multiplication and accumulation operations) can also participate in perform the outsourced deep learning computations.

Deep Learning involves evaluating a model against multiple sets of samples. When the data parts from different sample sets are shuffled for distribution to external parties to perform deep learning computations (e.g., performed using DLAs), the external parties cannot recreate the data samples to make sense of the data without obtaining all of the data parts and/or the shuffle key.

Data parts can be created from a data sample via splitting each data element in the data sample such that the sum of the data parts is equal to the data element. The computing tasks assigned to (outsourced to) one or more external parties can be configured such that switching the order of summation and the deep learning computation performed by the external parties does not change the results. Thus, by shuffling the data parts across the samples for distribution to external parties, each of the external parties obtains only a partial, randomized sample. After the data owner receives the computing results back from the external parties, the data owner can shuffle the results back into a correct order for summation to obtain the results of applying the deep learning computation to the samples. As a result, the privacy of the data samples can be protected, while at least a portion of the computation of Deep Learning can be outsourced to external Deep Learning Accelerators that do not have high precision circuits. Such high precision circuits would be required to operate on ciphertexts generated from Homomorphic Encryption if a conventional technique of Secure Multi-Party Computation (SMPC) were to be used.

In some situations, shuffled data parts may be collected by a single external party, which may attempt to re-assemble the data parts to recover/discover the data samples. For example, the external party may use a brute-force approach by trying different combinations of data parts to look for meaningful combinations of data parts that represent the data sample. The difficulty of a successful reconstruction can be increased by increasing the count of parts to be tried, and thus their possible combinations.

For enhanced data privacy protection, a selectable offset key can be used to mask the data parts. When the shuffling technique is combined with the use of an offset key, the difficulty associated with a brute-force attack is significantly increased. The offset key can be selected/configured such that it is not as long as the conventional encryption key. Thus, external DLAs without high precision circuits can still be used.

Optionally, an encryption key can be used to apply Homomorphic Encryption to one or more parts generated from a data sample to enhance data privacy protection. The part shuffling operation can allow the use of a reduced encryption length such that external DLAs without high precision circuits can still be used.

Optionally, some of the external entities can have high precision circuits; and parts encrypted using a long encryption key having a precision requirement that is met by the high precision circuits can be provided to such external entities to perform computation of an artificial neural network.

In some situations, it is desirable to protect the model of deep learning computation. For example, outsourcing computations of an artificial neural network can be configured in a way that prevents an external entity from discovering the artificial neural network. The data provided to the external entity to perform the outsourced computation can be transformed, obscured and/or insufficient such that the external entity is prevented from obtaining the artificial neural network. However, the results of the outsource computations performed by the external entity is still usable to generate a computation result of the artificial neural network.

Outsourced computation tasks can be configured to protect not only the data samples as input to an artificial neural network, but also the artificial neural network against which the data samples are evaluated to obtain the responses of the artificial neural network.

An artificial neural network model can include data representative of the connectivity of artificial neurons in the network and the weights of artificial neurons applied to their inputs in generating their outputs.

When the artificial neural network model does not change, the computation of generating the outputs of neurons as the artificial neural network model responding to a data sample as inputs can be a linear operation applied to the data sample. As a result, the data sample can be split into sample parts with a sum equal to the data sample; and a sum of the results representing the neural outputs generated by the artificial neural network model responsive to the sample parts respectively is equal to the result representing the neural outputs generated by the artificial neural network model responsive to the data sample.

On the other hand, when the data sample as an input does not change, the computation of generating the outputs of neurons as an artificial neural network model responsive to the data sample as inputs can be a linear operation applied to the artificial neural network. As a result, the artificial neural network model can be split into model parts with a sum that is equal to the artificial neural network model; and a sum of the results representing the neural outputs generated by the model parts responsive to the data sample is equal to the result representing the neural outputs generated by the artificial neural network model responsive to the data sample.

Thus, an artificial neural network model can be split into a plurality of model parts to obscure the artificial neural network model in outsourced data; and a data sample as an input to the artificial neural network model and thus an input to each of the model parts can be split into a plurality of sample parts to obscure the data sample. The data sample can be split in different ways as input to different model parts. Similarly, the artificial neural network model can be split into a plurality of model parts in different ways to process different samples parts as inputs.

Similar to the splitting of a data sample to randomize sample parts, splitting an artificial neural network model can also be performed to randomize model parts. For example, numbers in one or more model parts can be random numbers; and each model part can be configured as the artificial neural network model subtracted by the sum of the remaining model parts.

The computation tasks of applying sample parts as inputs to randomized model parts can be shuffled for outsourcing to one or more external entities. Optionally, the offsetting technique discussed above can also be applied to at least some randomized model parts and at least some randomized sample parts to increase the difficulties to resemble or discover the artificial neural network model and/or the data source, even when an external entity manages to collection a complete set of model parts, or a complete set of sample parts.

Splitting both the data samples and the artificial neural network models increases the complexity in formulating the computations that can be outsourced. The computations outsourced to the external entities having deep learning accelerators can be configured such that the computing results obtained from the external entities can be shuffled back into order for summation and thus obtain the results of the data samples applied as inputs to artificial neural network models. However, without the shuffling keys and/or the offset keys, it is difficult for entities receiving the computation tasks to recover the data samples and/or the artificial neural network models based on the data external entities receive to perform their computation tasks.

Computation tasks for deep learning typically involve a tensor/matrix of data elements having multiple dimensions. For example, the tensor/matrix can have a two-dimensional array of elements having multiple columns of elements along one dimension and multiple rows of elements along another dimension. A two-dimensional tensor/matrix can reduce to one-dimension for having a single row, or column, of elements. A tensor/matrix can have more than two dimensions. For example, a three-dimensional tensor/matrix can have an array of two-dimensional arrays of elements, extending in a third dimension; and a three-dimensional tensor/matrix can reduce to a two-dimensional tensor/matrix for having a single two-dimensional array of elements. Thus, a tensor/matrix is not limited to a two-dimensional array of elements. For example, the neural connectivity and weights to combine inputs to artificial neurons in generating outputs of the neurons can be represented by a tensor or matrix; and an input to the network of artificial neurons can be configured as a vector such that the multiplication of the tensor or matrix by the vector provides the output from the network in response to the input.

The tensor or matrix can be split into parts or portions to generate computing tasks that can be shuffled for distribution to external entities. The corresponding computing results received from the external entities can be shuffled back to determine the computing result of the tensor/matrix. The distribution of the shuffled parts of the tensor or matrix can be configured such that an external entity only receives a subset of the portions or parts of the tensor or matrix, which subset is insufficient to reconstruct the tensor or matrix. Optionally, some of the parts of the tensor or matrix can be further protected via offsetting and/or Homomorphic Encryption, as discussed above.

To prevent an external entity from recovering a tensor, the tensor can be split along different dimensions to generate outsourced computing tasks. Splitting along different dimensions can increase the different permutations of computation tasks outsourced to external entities having deep learning accelerators. Without the scheme used to split tensor/matrix and/or shuffle the parts/portions, the difficulty associated with a brute-force attack to recover the tensor/matrix is significantly increased, even when an external entity collects a complete set of parts/portions of the tensor/matrix presented to external entities in outsourcing the computing tasks.

A tensor can be split into blocks to define computations to be shuffled and outsourced to external entities. The sizes of the blocks can change, resulting partitions of the tensor at variable granularity. For example, a block of a tensor can have a row size corresponding to a number of rows of elements in the block and a column size corresponding to a number of columns of elements in the block. The tensor can be partitioned into blocks having different row sizes and/or different column sizes. The row sizes, the column sizes, and their combinations to partition the tensor into blocks can be determined based on a dynamically generated, randomized scheme. The use of variable, randomized, and/or adjustable granularity levels in partitioning a tensor into blocks for shuffling outsourced computing tasks can increase the difficulty to successfully reconstruct the tensor from a set of out-of-order blocks used to define the computing tasks outsourced to external entities.

FIG. 1 illustrates the distribution of shuffled, randomized data parts from different data samples for outsourced computing according to one embodiment.

In FIG. 1, it is desirable to obtain the results of applying a same operation of computing 103 to a plurality of data samples 111, 113, . . . , 115. However, it is also desirable to protect the data privacy associated with the data samples 111, 113, . . . , 115 such that the data samples 111, 113, . . . , 115 are not revealed to one or more external entities entrusted to perform the computing 103.

For example, the operation of computing 103 can be configured to be performed using Deep Learning Accelerators; and the data samples 111, 113, . . . , 115 can be sensor data, medical images, or other inputs to an artificial neural network that involves the operation of computing 103.

In FIG. 1, each of data samples is split into multiple parts. For example, data sample 111 is divided into randomized parts 121, 123, . . . , 125; data sample 113 is divided into randomized parts 127, 129, . . . , 131; and data sample 115 is divided into randomized parts 133, 135, . . . , 137. For example, the generation of the randomized parts from a data sample can be performed using a technique illustrated in FIG. 3.

A shuffling map 101 is configured to shuffle the parts 121, 123, . . . , 125, 127, 129, . . . , 131, 133, 135, . . . , 137 for the distribution of tasks to apply the operation of computing 103.

For example, the shuffling map 101 can be used to generate a randomized sequence of tasks to apply the operation of computing 103 to the parts 121, 135, . . . , 137, 129, . . . , 125. The operation of computing 103 can be applied to the parts 121, 135, . . . , 137, 129, . . . , 125 to generate respective results 141, 143, . . . , 145, 147, . . . , 149.

Since the parts 121, 135, . . . , 137, 129, . . . , 125 are randomized parts of the data samples 111, 113, . . . , 115 and have been shuffled to mix different parts from different data samples, an external party performing the operation of computing 103 cannot reconstruct the data samples 111, 113, . . . , 115 from the data associated with the computing 103 without the complete sets of parts and the shuffling map 101.

Thus, the operations of the computing 103 can be outsourced for performance by external entities to generate the results 141, 143, . . . , 145, 147, . . . , 149, without revealing the data samples 111, 113, . . . , 115 to the external entities.

In one implementation, the entire set of shuffled parts 121, 135, . . . , 137, 129, . . . , 125 contains all of the parts in the data samples 111, 113, . . . , 115. Optionally, some of the parts in the data samples 111, 113, . . . , 115 are not in the shuffled parts 121, 135, . . . , 137, 129, . . . , 125 communicated to external entities for improved privacy protection. Optionally, the operation of computing 103 applied on parts of the data samples 111, 113, . . . , 115 not in the shuffled parts 121, 135, . . . , 137, 129, . . . , 125 can be outsourced to other external entities and protected using a conventional technique of Secure Multi-Party Computation (SMPC) where the corresponding parts are provided in ciphertexts generated using Homomorphic Encryption. Alternatively, the computation on some of the parts of the data samples 111, 113, . . . , 115 not in the shuffled parts 121, 135, . . . , 137, 129, . . . , 125 can be arranged to be performed by a trusted device, entity or system.

In one implementation, the entire set of shuffled parts 121, 135, . . . , 137, 129, . . . , 125 is distributed to multiple external entities such that each entity does not receive a complete set of parts from a data sample. Optionally, the entire set of shuffled parts 121, 135, . . . , 137, 129, . . . , 125 can be provided to a same external entity to perform computing 103.

Figure 2:
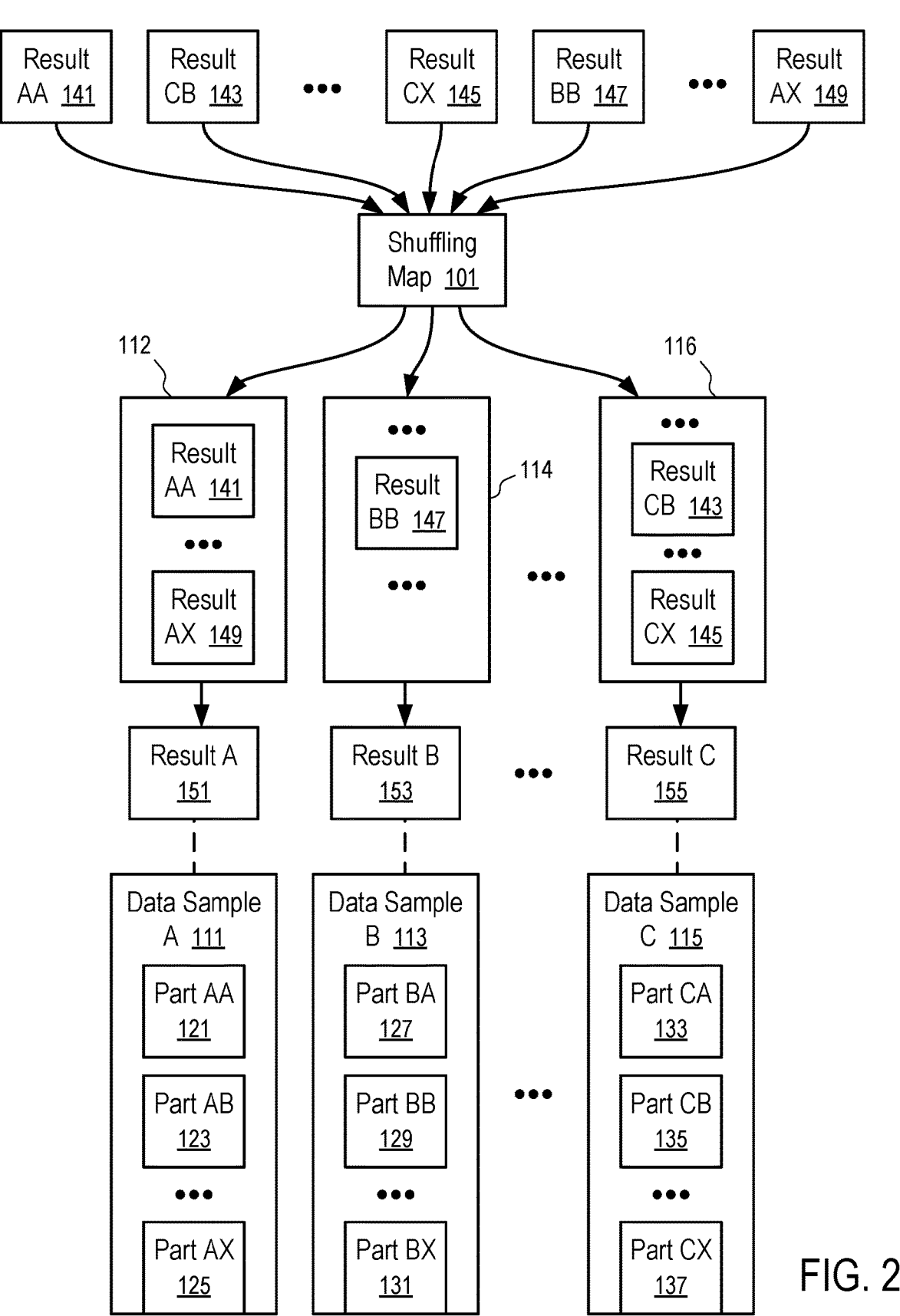
FIG. 2 illustrates the reconstruction of computing results for data samples based on computing results from shuffled, randomized data parts according to one embodiment.

The sequence of results 141, 143, . . . , 145, 147, . . . , 149 corresponding to the shuffled parts 121, 135, . . . , 137, 129, . . . , 125 can be used to construct the results of applying the computing 103 to the data samples 111, 113, . . . , 115 using the shuffling map 101, as illustrated in FIG. 2 and discussed below.

FIG. 2 illustrates the reconstruction of computing results for data samples based on computing results from shuffled, randomized data parts according to one embodiment.

In FIG. 2, the shuffling map 101 is used to sort the results 141, 143, . . . , 145, 147, . . . , 149 into result groups 112, 114, . . . , 116 for the data samples 111, 113, . . . , 115 respectively.

For example, the results 141, . . . , 149 computed for respective parts 121, . . . , 125 of the data sample 111 are sorted according to the shuffling map 101 to the result group 112. Similarly, the results (e.g., 143, . . . , 145) computed for respective parts (e.g., 135, . . . , 137) of the data sample 115 are sorted according to the shuffling map 101 to the result group 116; and the result group 114 contains results (e.g., 147) computed from respective parts (e.g., 129) of the data sample 113.

The results 151, 153, . . . , 155 of applying the operation of computing 103 to the data samples 111, 113, . . . , 115 respectively can be computed from the respective result groups 112, 114, . . . , 116.

Figure 3:
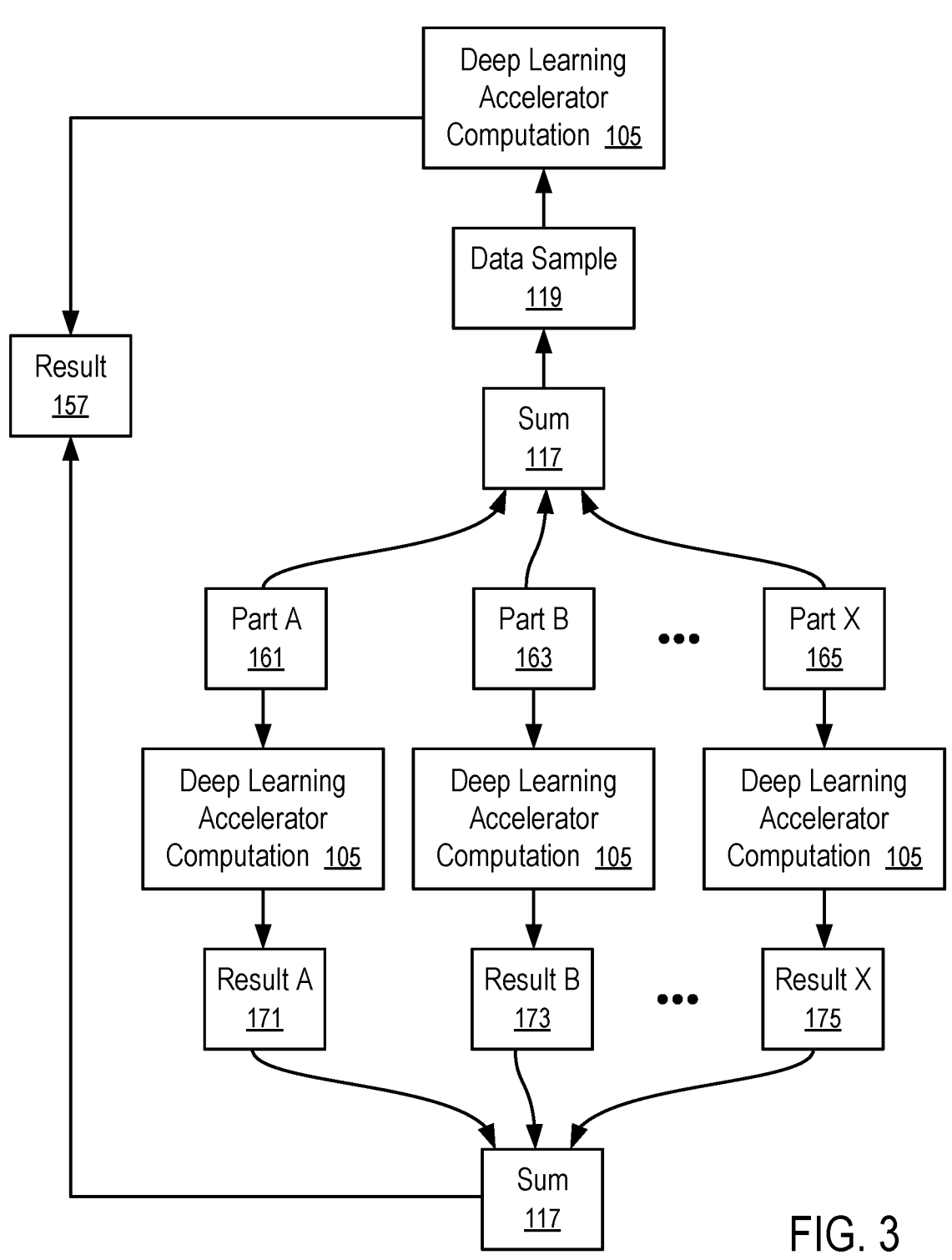
FIG. 3 shows a technique to break data samples into parts for shuffled secure multiparty computing using deep learning accelerators according to one embodiment.

For example, when a technique of FIG. 3 is used to generate parts that have a sum equal to a data sample, the results of applying the operation of computing 103 to the parts can be summed to obtain the result of applying the operation of the computing 103 to the data sample.

FIG. 3 shows a technique to break data samples into parts for shuffled secure multiparty computing using deep learning accelerators according to one embodiment.

For example, the technique of FIG. 3 can be used to generate the parts of data samples in FIG. 1, and to generate results of applying the operation of computing 103 to the data samples from results of applying the operation of computing 103 to the parts of the data samples in FIG. 2.

In FIG. 3, a data sample 119 is split into parts 161, 163, . . . , 165, such that the sum 117 of the parts 161, 163, . . . , 165 is equal to the data sample 119.

For example, parts 163, . . . , 165 can be random numbers; and part 161 can be computed from subtracting the data sample 119 from the parts 163, . . . , 165. Thus, the parts 161, 163, . . . , 165 are randomized.

In FIG. 3, a deep learning accelerator computation 105 is configured such that the order of the sum 117 and the computation 105 can be switched without affecting the result 157. Thus, the deep learning accelerator computation 105 as applied to the data sample 119 generates the same result 157 as the sum 117 of the results 171, 173, . . . , 175 obtained from applying the deep learning accelerator computation 105 to the parts 161, 163, . . . , 165 respectively.

For example, the data sample 119 can be a vector or a matrix/tensor representative of an input to an artificial neural network. When the deep learning accelerator computation 105 is configured to apply a linear operation to the data sample 119 (e.g., an operation representative of the processing by the artificial neural network), the result 157 is same as the sum of the results 171, 173, . . . , 175 from the computation 105 being applied to the parts 161, 163, . . . , 165 respectively. For example, a matrix or tensor can be generated according to the neuron connectivity in the artificial neural network and the weights of the artificial neurons applied to their inputs to generate outputs; the deep learning accelerator computation 105 can be the multiplication of the matrix or tensor with the input vector or matrix/tensor of the data sample 119 as the input to the artificial neural network to obtain the output of the artificial neural network; and such a computation 105 is a linear operation applied to the data sample 119. While the parts 161, 163, . . . , 165 appear to be random, the data sample 119 and the result 157 can contain sensitive information that needs protection.

In FIG. 1, when a shuffling map 101 is used to mix parts from different data samples 111, 113, . . . , 115, the difficulty to discover the original data samples 111, 113, . . . , 115 is increased.

The technique of shuffling parts can eliminate or reduce the use of a traditional technique of Secure Multi-Party Computation (SMPC) that requires deep learning accelerators having high precision computing units to operate on ciphertexts generated using a long encryption key.

A data item (e.g., a number) in a data sample 119 is typically specified at a predetermined precision level (e.g., represented by a predetermined number of bits) for computation by a deep learning accelerator. When the data sample 119 is split into parts 161, 163, . . . , 165, the parts can be in the same level of precision (e.g., represented by bits of the predetermined number). Thus, the operation of splitting the data sample 119 into parts 161, 163, . . . , 165 and the operation of shuffling the parts of different data samples (e.g., 111, 113, . . . , 115) do not change or increase the precision level of data items involved in the computation.

In contrast, when a traditional technique of Secure Multi-Party Computation (SMPC) is used, a data items (e.g., a number) is combined with a long encryption key to generate a ciphertext. A long encryption key is used for security. As a result, the ciphertext has an increased precision level (e.g., represented by an increased number of bits). To apply the deep learning accelerator computation 105 on the ciphertext having an increased precision level, the deep learning accelerator is required to have a computing circuit (e.g., a multiply-accumulate (MAC) unit) at the corresponding increased precision level. The technique of protecting data privacy through shuffling across data samples can remove the requirement of encryption using a long encryption key. As a result, deep learning accelerators without high precision computing circuits as required by the use of the long encryption key can also be used in Secure Multi-Party Computation (SMPC).

For example, a deep learning accelerator can be configured to perform multiply-accumulate (MAC) operations at a first level of precision (e.g., 16-bit, 32-bit, 64-bit, etc.). Such a precision can be sufficient for the computations of an Artificial Neural Network (ANN). However, when the use of Homomorphic Encryption increases the precision requirement to a second level (e.g., 128-bit, 512-bit, etc.), the deep learning accelerator cannot be used to perform the computation on ciphertexts generated using the Homomorphic Encryption. The use of the shuffling map 101 to protect the data privacy allows such a deep learning accelerator to perform outsourced computation (e.g., 105).

Figure 15:
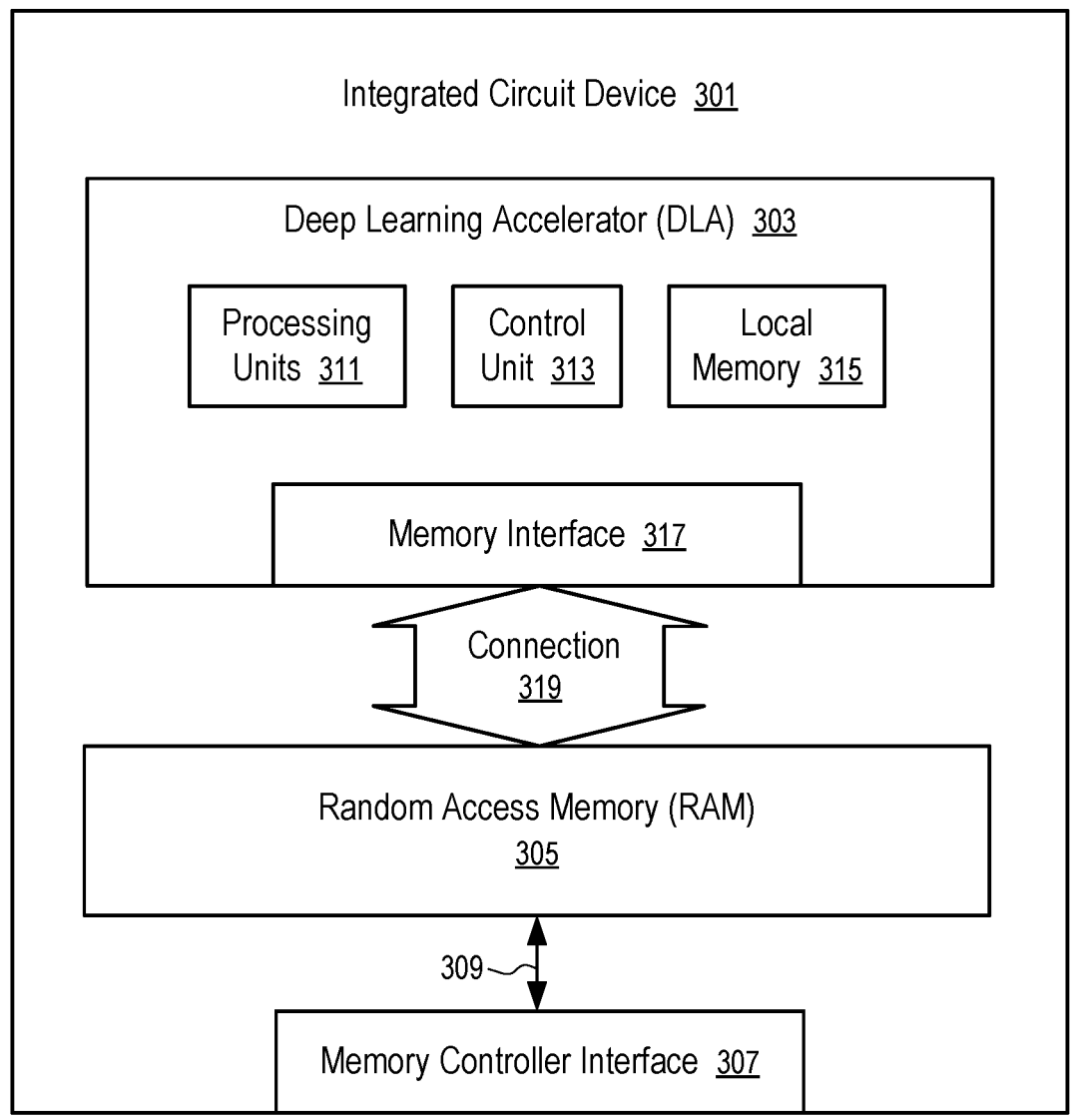
FIG. 15 shows an integrated circuit device having a Deep Learning Accelerator and random access memory configured according to one embodiment.

For example, the task of applying the operation of computing 103 to a part 121 can be outsourced to a computing device having an integrated circuit device include a Deep Learning Accelerator (DLA) and random access memory (e.g., as illustrated in FIG. 15). The random access memory can be configured to store parameters representative of an Artificial Neural Network (ANN) and instructions having matrix operands representative of a deep learning accelerator computation 105. The instructions stored in the random access memory can be executable by the Deep Learning Accelerator (DLA) to implement matrix computations according to the Artificial Neural Network (ANN), as further discussed below.

In a typical configuration, each neuron in an Artificial Neural Network (ANN) receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network. Each neuron can have a bias, an activation function, and a set of synaptic weights for its inputs respectively. The activation function may be in the form of a step function, a linear function, a log-sigmoid function, etc. Different neurons in the network may have different activation functions. Each neuron can generate a weighted sum of its inputs and its bias and then produce an output that is the function of the weighted sum, computed using the activation function of the neuron. The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

Since the outputs of the Artificial Neural Network (ANN) can be a linear operation on the inputs to the artificial neurons, data samples (e.g., 119) representative of an input to the Artificial Neural Network (ANN) can be split into parts (e.g., 161, 163, . . . , 165 as in FIG. 3) as randomized inputs to the Artificial Neural Network (ANN) such that the sum of the outputs responsive to the randomized inputs provides the correct outputs of the Artificial Neural Network (ANN) responding to the data samples (e.g., 119).

In some instances, the relation between the inputs and outputs of an entire Artificial Neural Network (ANN) is not a linear operation that supports the computation of the result 157 for a data sample 119 from the sum 117 of the results 171, 173, . . . , 175 obtained from the parts 161, 163, . . . , 165. However, a significant portion of the computation of the Artificial Neural Network (ANN) can be a task that involves a linear operation. Such a portion can be accelerated with the use of deep learning accelerators (e.g., as in FIG. 15). Thus, the shuffling of parts allows the outsourcing of such a portion of computation to multiple external computing devices having deep learning accelerators.

A Deep Learning Accelerator can have local memory, such as registers, buffers and/or caches, configured to store vector/matrix operands and the results of vector/matrix operations. Intermediate results in the registers can be pipelined/shifted in the Deep Learning Accelerator as operands for subsequent vector/matrix operations to reduce time and energy consumption in accessing memory/data and thus speed up typical patterns of vector/matrix operations in implementing a typical Artificial Neural Network. The capacity of registers, buffers and/or caches in the Deep Learning Accelerator is typically insufficient to hold the entire data set for implementing the computation of a typical Artificial Neural Network. Thus, a random access memory coupled to the Deep Learning Accelerator is configured to provide an improved data storage capability for implementing a typical Artificial Neural Network. For example, the Deep Learning Accelerator loads data and instructions from the random access memory and stores results back into the random access memory.

The communication bandwidth between the Deep Learning Accelerator and the random access memory is configured to optimize or maximize the utilization of the computation power of the Deep Learning Accelerator. For example, high communication bandwidth can be provided between the Deep Learning Accelerator and the random access memory such that vector/matrix operands can be loaded from the random access memory into the Deep Learning Accelerator and results stored back into the random access memory in a time period that is approximately equal to the time for the Deep Learning Accelerator to perform the computations on the vector/matrix operands. The granularity of the Deep Learning Accelerator can be configured to increase the ratio between the amount of computations performed by the Deep Learning Accelerator and the size of the vector/matrix operands such that the data access traffic between the Deep Learning Accelerator and the random access memory can be reduced, which can reduce the requirement on the communication bandwidth between the Deep Learning Accelerator and the random access memory. Thus, the bottleneck in data/memory access can be reduced or eliminated.

Figure 4:
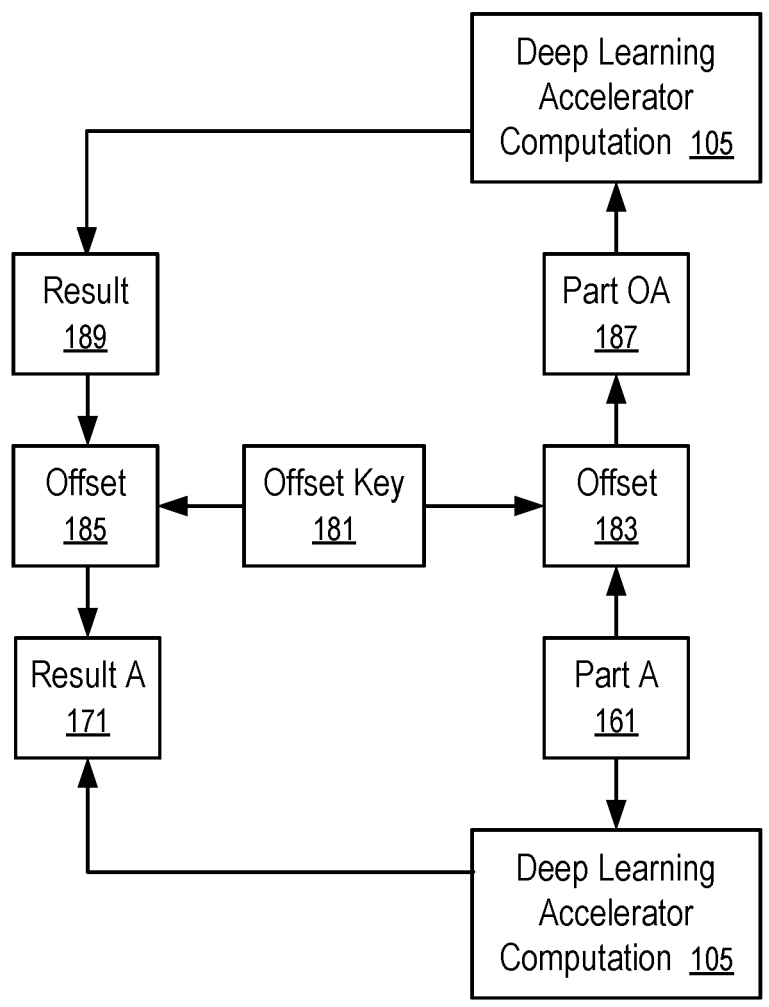
FIG. 4 shows the use of an offset key to modify a part for shuffled secure multiparty computing using deep learning accelerators according to one embodiment.

FIG. 4 shows the use of an offset key to modify a part for shuffled secure multiparty computing using deep learning accelerators according to one embodiment.

In FIG. 4, an offset key 181 is configured to control an operation of offsetting 183 applied on an unmodified part 161 to generate a modified part 187.

For example, the offset key 181 can be used to shift bits of each element in the part 161 to the left by a number of bits specified by the offset key 181. The bit-wise shifting operation corresponds to multiplying the part 161 by a factor represented by the offset key 181.

Shifting bits of data to the left by n bits can lead to loss of information when the leading n bits of the data are not zero. To prevent loss of information, the data elements in the modified parts 187 can be represented with increased number of bits.

Optionally, after the bits of the data are shifted to the left by n bits, the least significant n bits of the resulting numbers can be filled with random bits to avoid the detection of the bit-wise shift operation that has been applied.

In another example, the offset key 181 can be used to identify a constant to be added to each number in the unmodified part 161 to generate the corresponding number in the modified part 187.

In a further example, the offset key 181 can be used to identify a constant; and each number in the unmodified part 161 is multiplied by the constant represented by the offset key 181 to generate the corresponding number in the modified part 187.

In general, the offset key 181 can be used to represent multiplication by a constant, addition of a constant, and/or adding random least significant bits.

Since the deep learning accelerator computation 105 is configured as a linear operation applied on a part as an input, the effect of the offset key 181 in the operation of offsetting 183 in the result 189 can be removed by applying a corresponding reverse operation of offsetting 185 according to the offset key 181.

For example, when the offset key 181 is configured to left shift numbers in the unmodified part 161 to generate the modified part 187, the result 189 of applying the deep learning accelerator computation 105 to the modified part 187 can be right shifted to obtain the result 171 that is the same as applying the deep learning accelerator computation 105 to the unmodified part 161.

For example, when the offset key 181 is configured to add a constant to the numbers in the unmodified part 161 to generate the modified part 187, the constant can be subtracted from the result 189 of applying the deep learning accelerator computation 105 to the modified part 187 to obtain the same result 171 of applying the deep learning accelerator computation 105 to the unmodified part 161.

For example, when the offset key 181 is configured to multiply the numbers in the unmodified part 161 by a constant to generate the modified part 187, the result 189 of applying the deep learning accelerator computation 105 to the modified part 187 can be multiplied by the inverse of the constant to obtain the same result 171 of applying the deep learning accelerator computation 105 to the unmodified part 161.

Optionally, the offset key 181 can be replaced with an encryption key; the offset 183 can be replaced with Homomorphic Encryption performed according to the encryption key; and the offset 185 can be replaced with decryption performed according to the encryption key. When the encryption key is used, the modified part 187 is ciphertexts generated from the unmodified part 161 as clear text. Preferably, the ciphertexts in the modified parts 187 have bit lengths that are the same, or substantially the same, as the bit lengths of the numbers in the part 161 to reduce the requirement for high precision circuits in performing the deep learning accelerator computation 105.

When one or more parts (e.g., 161) generated from a data sample (e.g., 119 according to the technique of FIG. 3) are modified through offsetting 183 for outsourcing, the likelihood of an external entity recovering the data sample 119 from the outsourced parts (e.g., 187, 163, . . . , 165) is further reduced.

Figure 5:
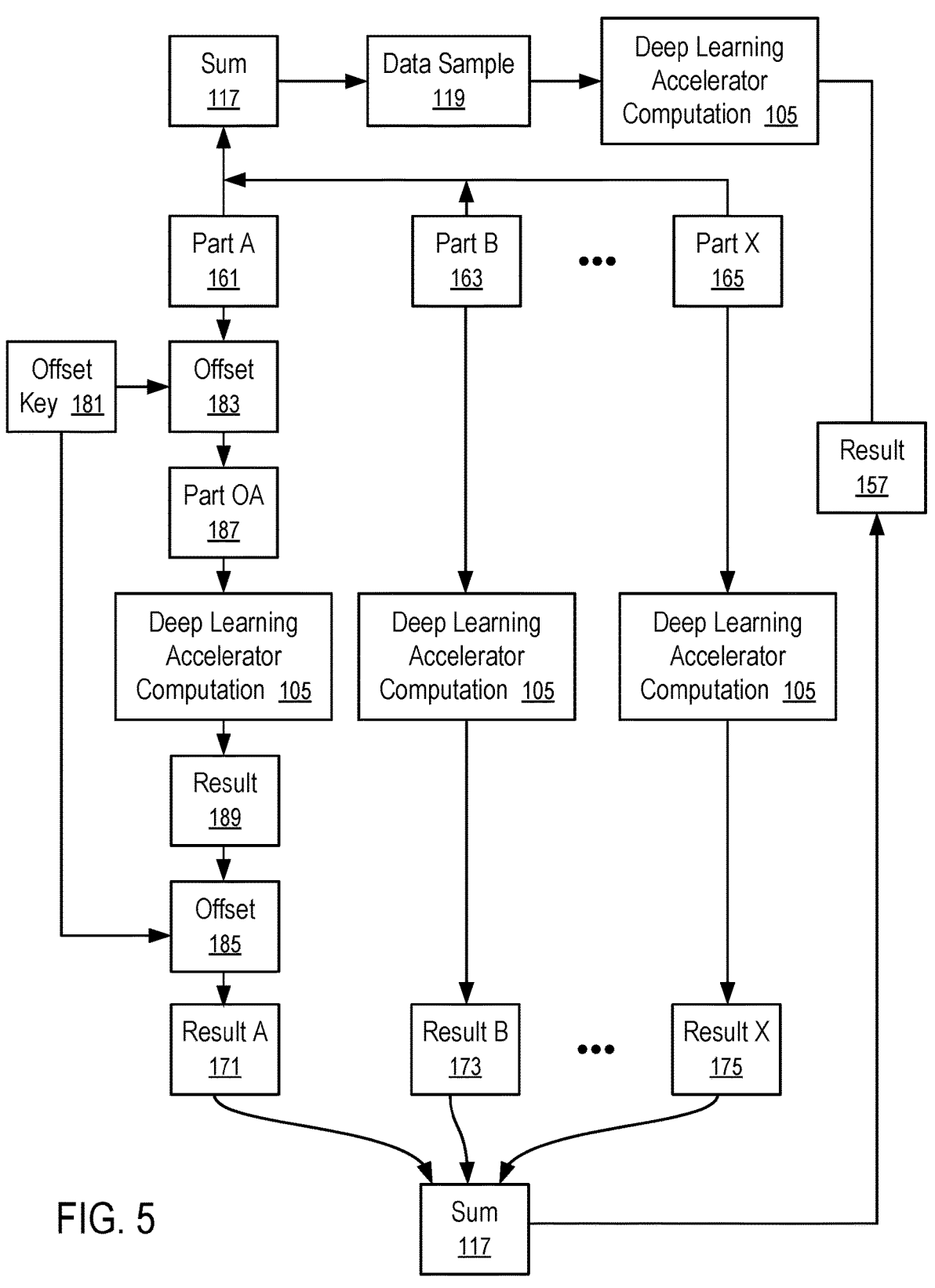
FIG. 5 shows a technique to enhance data protection via offsetting parts for shuffled secure multiparty computing using deep learning accelerators according to one embodiment.

FIG. 5 shows a technique to enhance data protection via offsetting parts for shuffled secure multiparty computing using deep learning accelerators according to one embodiment.

For example, the technique of FIG. 5 can use the operations of offsetting 183 and 185 of FIG. 4 to enhance the data privacy protection of the techniques of FIG. 1 to FIG. 3.

In FIG. 5, a data sample 119 is split into unmodified parts 161, 163, . . . , 165 such that the sum 117 of the parts 161, 163, . . . , 165 is equal to the data sample 119.

For example, the parts 163, . . . , 165 can be random numbers; and the part 161 is the data sample 119 subtracted by the sum of the parts 163, . . . , 165. As a result, each of the parts 161, 163, . . . , 165 is equal to the data sample 119 subtracted by the sum of the remaining parts.

The unmodified part 161 is further protected via the offset key 181 to generate a modified part 187. Thus, the sum of the modified part 187, and the remaining parts 163, . . . , 165 is no longer equal to the data sample 119.

The parts 187, 163, . . . , 165 can be distributed/outsourced to one or more external entities to apply the deep learning accelerator computation 105.

After receiving the results 189, 173, . . . , 175 of applying the deep learning accelerator computation 105 to the parts 187, 163, . . . , 165 respectively, the data owner of the data sample 119 can generate the result 175 of applying the deep learning accelerator computation 105 to the data sample 119 based on the results 189, 173, . . . , 175.

The reverse operation of offsetting 185 specified by the offset key 181 can be applied to the result 189 of applying the deep learning accelerator computation 105 to the modified part 187 to recover the result 171 of applying the deep learning accelerator computation 105 on the unmodified part 161. The sum 117 of the results 171, 173, . . . , 175 of applying the deep learning accelerator computation 105 to the unmodified parts 161, 163, . . . , 165 provides the result 157 of applying the deep learning accelerator computation 105 to the data sample 119.

In some implementations, an offset key can be configured for one or more parts 163, . . . , 165 to generate modified parts for outsourcing, in a way similar to the protection of the part 161.

Optionally, when the part 163 is configured to be offset via left shifting by n bits, the random numbers in the part 163 can be configured to have zeros in the leading n bits, such that the left shifting do not increase the precision requirement for performing the deep learning accelerator computation 105.

Optionally, the part 163 can be configured to be protected via right shifting by n bits. To avoid loss of information, the random numbers in the parts can be configured to have zeros in the tailing n bits, such that the right shifting do not change/increase the data precision of the parts 163.

Different unmodified parts 161, 163, . . . , 165 can be protected via different options of offsetting (e.g., bit-wise shift, left shift, right shift, adding by a constant, multiplying by a constant). Different offset keys can be used for improved protection. Optionally, one or more of the unmodified parts 161, 163, . . . , 165 can be protected via Homomorphic Encryption.

Figure 6:
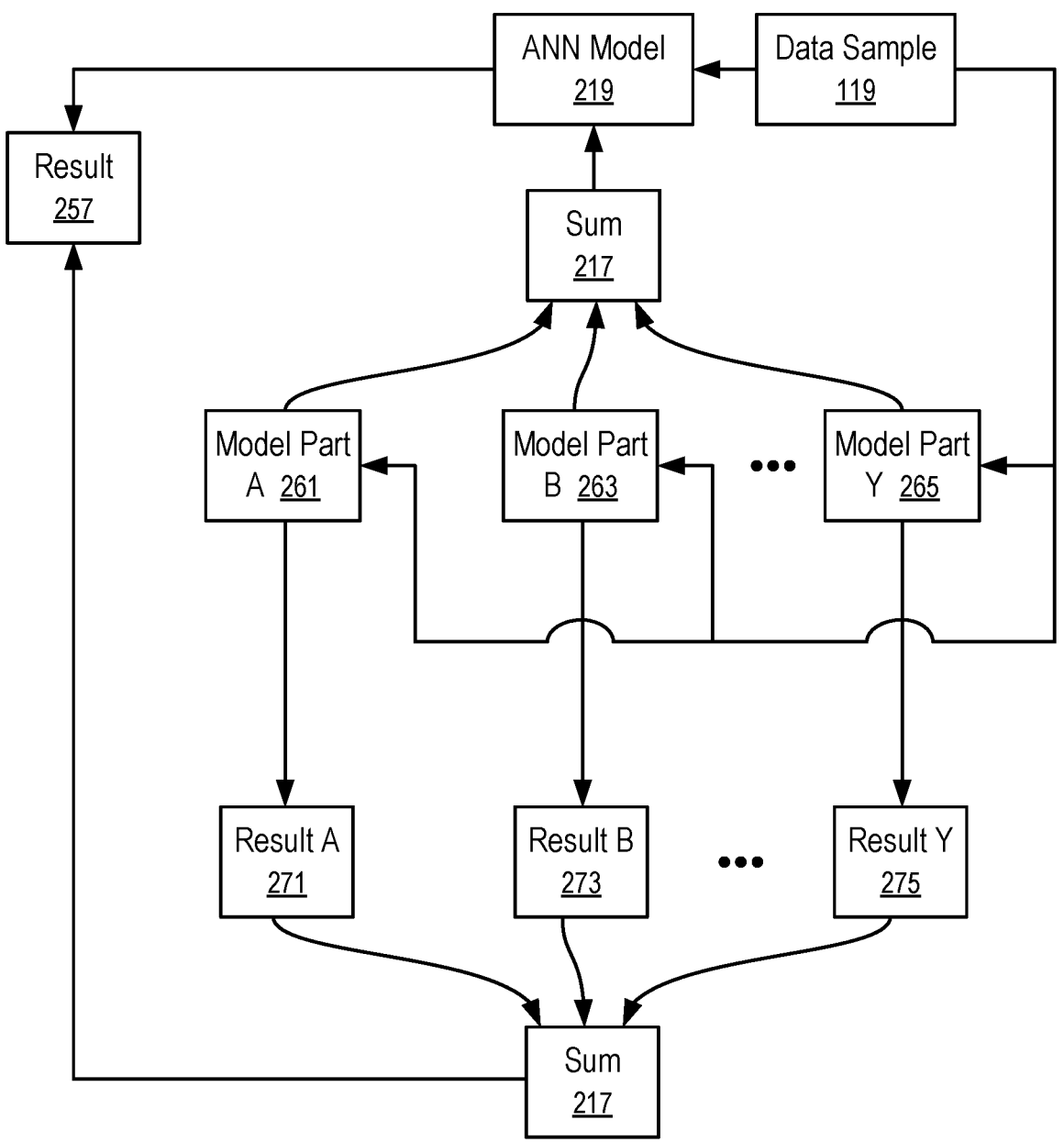
FIG. 6 illustrates model parts usable in outsourcing tasks of deep learning computation without revealing an artificial neural network model according to one embodiment.

FIG. 6 illustrates model parts usable in outsourcing tasks of deep learning computation without revealing an artificial neural network model according to one embodiment.

In FIG. 6, an artificial neural network (ANN) model 219 is split into a plurality of model parts 261, 263, . . . , 265 such that a sum 217 of the model parts 261, 263, . . . , 265 is equal to the ANN model 219.

For example, each of the model parts 261, 263, . . . , 265 represents a separate artificial neural network having neural connectivity similar to the connectivity ANN model 219 and having neural weights different from those in the artificial neural network (ANN) model 219. Since the sum 217 of the model parts 261, 263, . . . , 265 is equal to the ANN model 219, the result 257 representing the neural outputs of the ANN model 219 responding to any input (e.g., data sample 119) is equal to the sum 217 of the results 271, 273, . . . , 275 obtained from the model parts 261, 263, . . . , 265 responding to the same input (e.g., data sample 119).

For example, numbers in each of the model parts 263, . . . , 265 can be generated using a random number generator; and the numbers in the model part 261 can be generated by subtracting the sum of the model parts 263, . . . , 265 from the ANN model 219. As a result, each of the model parts 263, . . . , 265 is a difference between the ANN model 219 and the sum of the remaining model parts.

When model parts (e.g., 261, 263, . . . , 265) from different ANN models (e.g., 219) are mixed and shuffled for distribution to external entities to perform the computation of model parts responsive to a data sample, the external entities cannot reconstruct the ANN models (e.g., 219) without a complete set of model parts (e.g., 261, 263, . . . , 265) and/or the shuffling map (e.g., 101) used to shuffle back the model parts from different ANN models.

Further, the technique of applying operations of offsetting 183 and 185 similar to that illustrated in FIG. 5 can be used to further obscure at least some of the model parts 261, 263, . . . , 265.

For example, the unmodified model part 261 can be applied an operation of offsetting 183 to generate a modified model part. The result of the computation of the modified model part responsive to an input (e.g., data sample 119) can be applied a reverse offsetting 185 to obtain the result 271 of the computation of the unmodified model part 261 responsive to the sample input (e.g., data sample 119).

For example, to generate the modified model part, an offset key 181 can be configured to bit-wise shift numbers in the unmodified model part 261, to add a constant to the numbers in the unmodified model part 261, to multiply by a constant the numbers in the unmodified model part 261, etc. The range of the random numbers generated by the random number generator can be limited according to the operation of the offset key 181 such that the precision requirement for deep learning accelerators used to perform the outsourced tasks is not increased after applying the operation of offsetting 183.

Optionally, an encryption key can be used to encrypt the unmodified model part 261 to generate the modified model part, where the computing results of the modified model part can be decrypted to obtain the computation result of the unmodified model part. For example, the encryption key can be selected such that the precision requirement for deep learning accelerator is not increased after applying Homomorphic Encryption.

Figure 7:
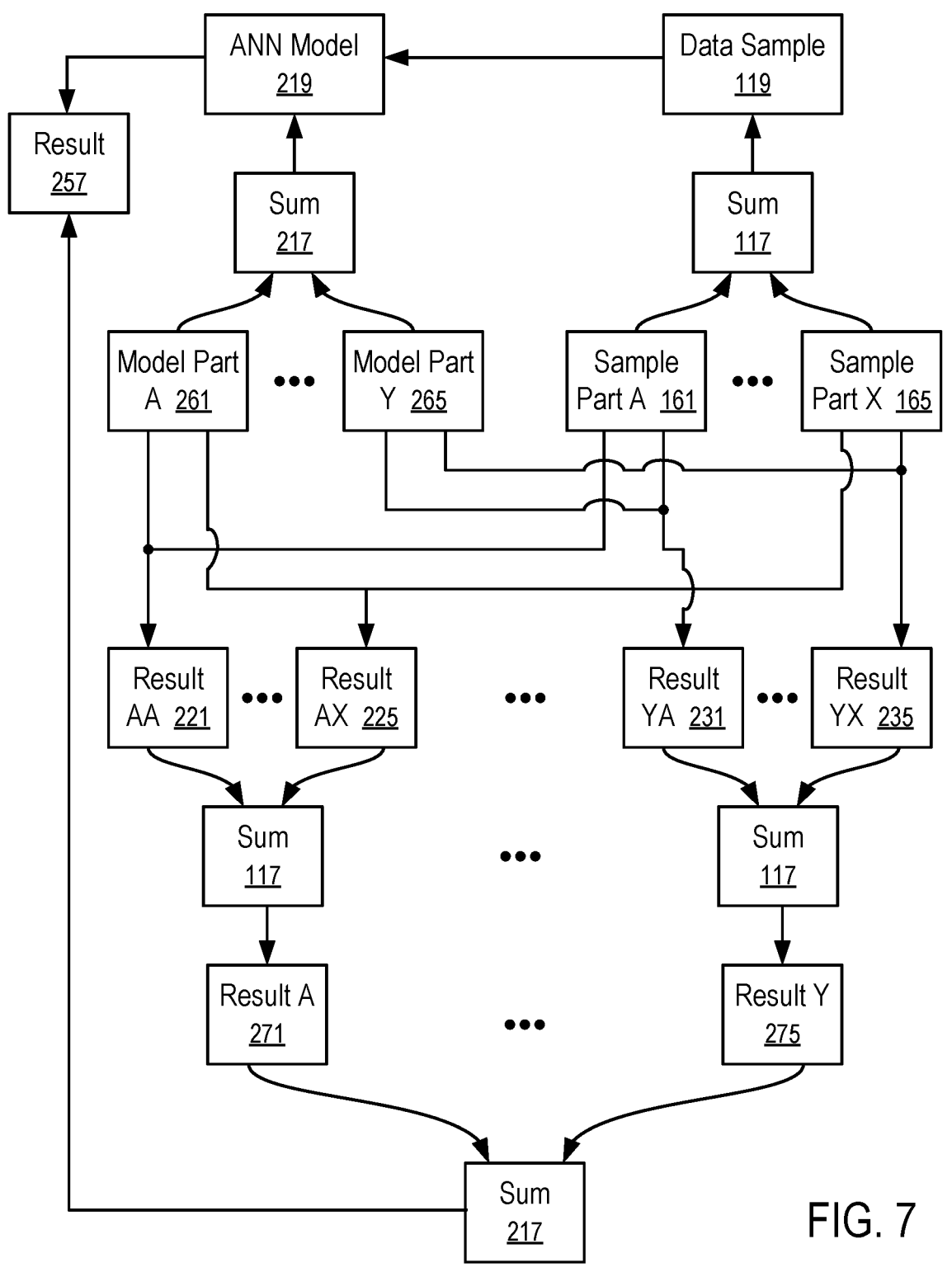
FIG. 7 illustrates model parts and sample parts usable in outsourcing tasks of deep learning computation without revealing an artificial neural network model and data samples as inputs to the artificial neural network according to one embodiment.

To further protect the data sample 119, as well as the ANN model 219, the data sample 119 can also be split into data sample parts to generate computing tasks for outsourcing, as illustrated in FIG. 7.

FIG. 7 illustrates model parts and sample parts usable in outsourcing tasks of deep learning computation without revealing an artificial neural network model and data samples as inputs to the artificial neural network according to one embodiment.

For example, the data sample 119 in FIG. 6 can be protected via splitting into sample parts 161, . . . , 165 as in FIG. 7 for shuffling in outsource computing tasks.

For example, the data sample 119 in FIG. 6 can be replaced with an unmodified part 161 generated from the data sample 119 in FIG. 3, or a modified part 187 generate from the data sample 119 in FIG. 5.

In FIG. 7, an artificial neural network (ANN) model 219 is split into model parts 261, . . . , 265 (e.g., as in FIG. 6). Further, data sample 119 is split into sample parts 161, . . . , 165 (e.g., as in FIG. 3).

Each of the sample parts 161, . . . , 165 is provided as an input to the model parts 261, . . . , 265 respectively to obtain respective computing results. For example, the sample part 161 is applied to the model parts 261, . . . , 265 to generate results 221, . . . , 225 respectively; and the sample part 165 is applied to the model parts 261, . . . , 265 to generate results 231, . . . , 235 respectively.

The results (e.g., 221, . . . , 225; or 231, . . . , 235) of the sample parts 161, . . . 165 applied as inputs to each of the model parts 261, . . . , 265 can be summed 117 to obtain the result (e.g., 271; or 275) of the data sample 119 being applied as an input to the respective model part (e.g., 261, . . . , or 265), similar to the summation of results 171, 173, . . . , 175 from data parts 161, 163, . . . , 165 in FIG. 3.

The results 271, . . . , 275 of the data sample 119 applied as inputs to the model parts 261, . . . , 265 can be summed 217 to obtain the result 257 of the data sample 119 applied as an input to the ANN model 219, similar to the summation of results 271, 273, . . . , 275 from model parts 261, 263, . . . , 265 in FIG. 6.

Since summations can be performed out of order without affecting the result 257, the result 257 is equal to the sum of the results 221, . . . , 225, . . . , 231, . . . , 235 generated from the task of applying the sample parts 161, . . . , 165 to model parts 261, . . . , 265; and it is not necessary to sum 117 and 217 the results according to the particular order illustrated in FIG. 7.

The computing tasks of applying sample parts 161, . . . , 165 as inputs to model parts 261, . . . , 265 to obtain results 221, . . . , 225, . . . , 231, . . . , 235 can be shuffled (e.g., with other computing tasks derived from other ANN models and/or data samples) for outsourcing/distribution to external entities.

For example, different subsets of the model parts 261, . . . , 265 can be provided/outsourced to different entities such that each entities has an incomplete set of the model parts 261, . . . , 265.

Optionally, one or more of the model parts 261, . . . , 265 can be protected via offsetting 183/185, such that the difficulty to recover the ANN model 219 from parts communicated to external entities is increased. Similarly, one or more of the sample parts 161, . . . , 165 can be protected via offsetting 183/185, such that the difficulty to recover the data sample 119 from parts communicated to external entities is increased.

FIG. 7 illustrates an example of applying the same set of sample parts 161, . . . , 165 to the different model parts 265. In general, the data sample 119 can be split into different sets of sample parts; and each set of sample parts (e.g., 161, . . . , 165) can be applied to a selected one of the model parts (e.g., 261, or 265). Increasing the ways to split the data sample 119 for inputting to model parts 261, . . . , 265 can increase the difficulties to recover the data sample 119 by external entities.

FIG. 7 illustrates an example of using the same set of model parts 261, . . . , 265 to represent the ANN model 219 for evaluating responses to different sample parts 161, . . . , 165 as inputs. In general, the ANN model 219 can be split into different sets of model parts; and each set of model parts (e.g., 261, . . . , 265) can be used to compute the results of applying one of the sample parts (e.g., 161, or 165) as an input to the ANN model 219.

Figure 8:
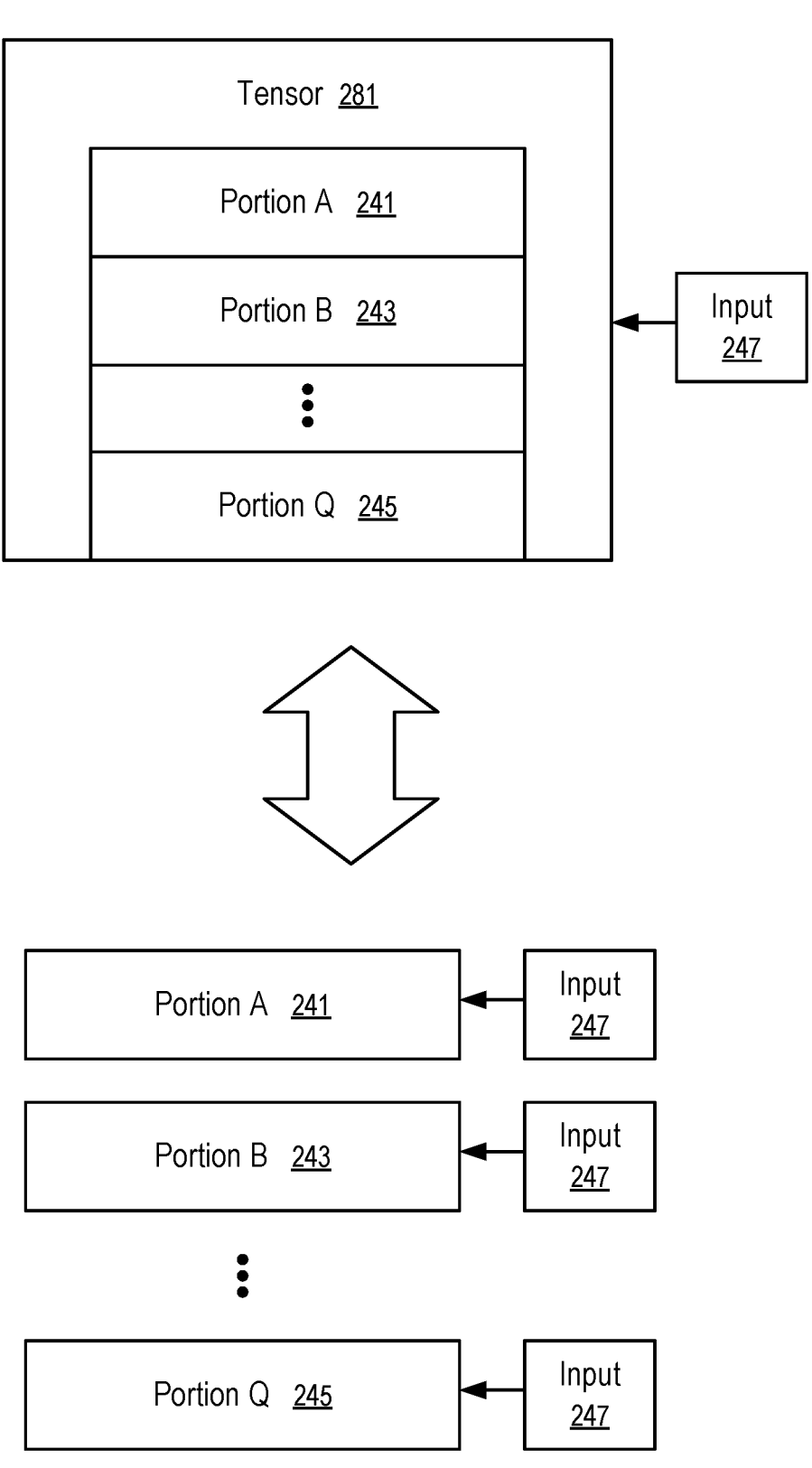
FIG. 8 illustrates a way to split a tensor to generate shuffled parallel computing tasks for outsourcing to external entities according to one embodiment.

FIG. 8 illustrates a way to split a tensor to generate shuffled parallel computing tasks for outsourcing to external entities according to one embodiment.

In FIG. 8, a tensor 281 has a dimension along which divisions of the tensor 281 lead to a plurality of portions 241, 243, . . . , 245. An operation of applying an input 247 to the tensor 281 includes the parallel applications of the input 247 to the portions 241, 243, . . . , 245.

For example, the tensor 281 can be a matrix of rows and columns of elements. Each of the portions 241, 243, . . . , 245 is one or more rows in the matrix. The input 247 is one or more columns of elements to be multiplied with each row of the matrix. The multiplication of one row in the matrix with the input 247 is independent from other rows in the tensor 281. Thus, the tensor 281 can be split into row portions 241, 243, . . . , 245 along the dimension for row divisions. The multiplication of a portion (e.g., 241, 243, . . . , or 245) with the input 247 is independent from other portions and can be distributed to randomly selected external entities. Outsourcing to an entity the computing task of the multiplication of a portion (e.g., 241, 243, . . . , or 245) with the input 247 can be limited by disclosing only the portion (e.g., 241, 243, . . . , or 245) and the input 247 without other portions in the tensor 281. Thus, each external entity receiving one or more of the computing tasks associated with the corresponding portions can be prevented from at least one other portions such that the external entity does not have a sufficient number of portions to reconstruct the tensor 281. Shuffling can increase the difficulties to reconstruct the tensor 281 even when the out of order portions representative of the tensor 281 are collected by an external entity.

The collection of the results of the portions 241, 243, . . . , 245 in response to the input 247 can be shuffled by the data owner back into an order that is same as the result of the tensor 281 in response to the input 247.

Thus, the computing task of applying the input 247 to the tensor 281 can be split into the computing tasks of applying the input 247 to the portions 241, 243, . . . , 245. The computing task can be shuffled (and optionally mixed with other computing task from other tensors) for outsourcing to external entities. The results received from the external entities can be shuffled back to the correct order as the result of applying the input 247 to the tensor 281.

Optionally, at least some of the portions 241, 243, . . . , 245 can be further protected (e.g., using the techniques to protect an ANN model 219 discussed in connection with FIG. 6 and FIG. 7).

In some implementations, the rows of the tensor 281 can be shuffled and recombined as portions 241, 243, . . . , 245. The row shuffling can further increase the difficulties of recovering the tensor 281 from outsourced portions 241, 243, . . . , 245, especially when some of the portions 241, 243, . . . , 245 are further protected via offsetting and/or Homomorphic Encryption.

Figure 9:
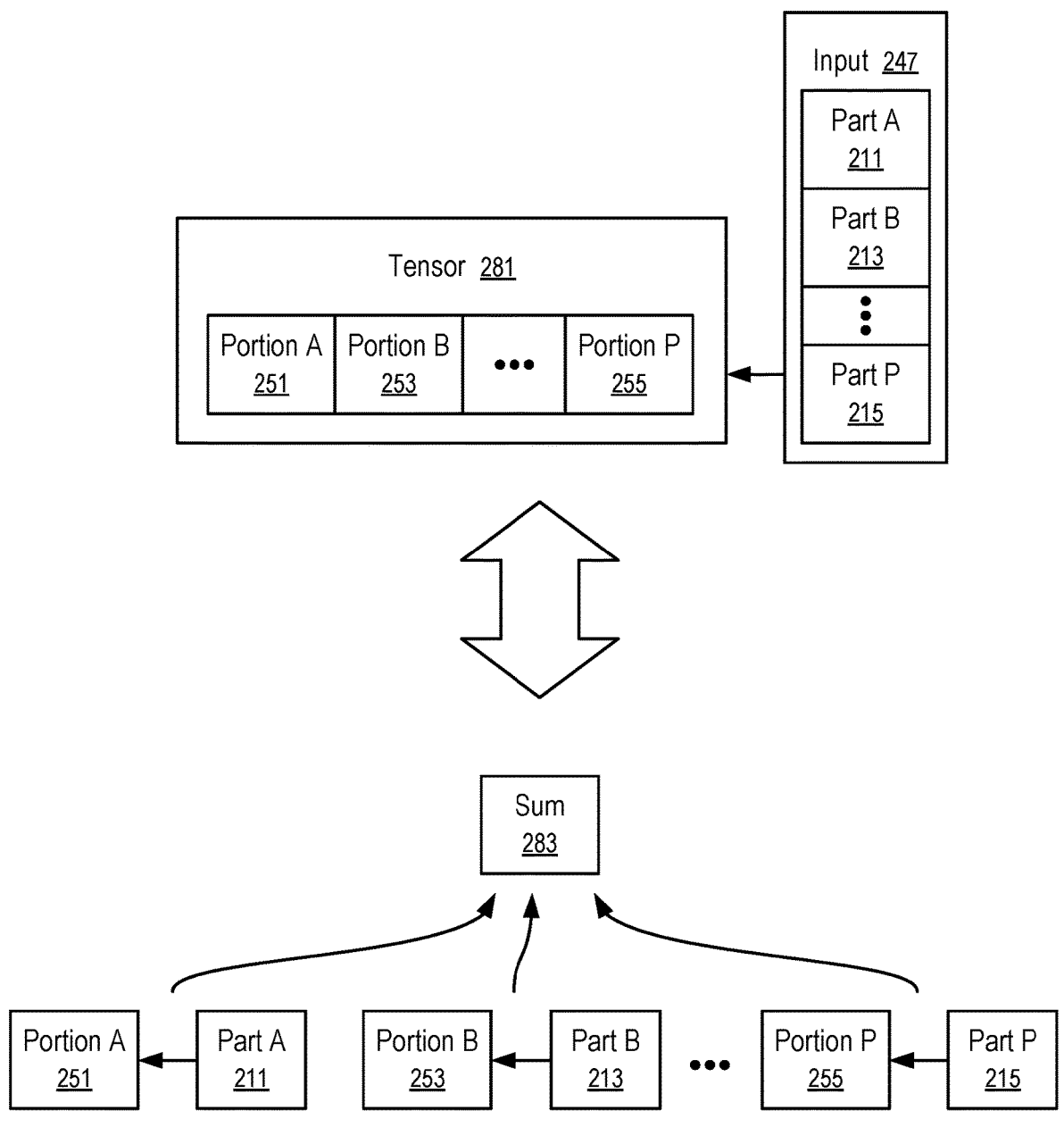
FIG. 9 illustrates another way to split a tensor to generate shuffled computing tasks for outsourcing to external entities according to one embodiment.

FIG. 9 illustrates another way to split a tensor to generate shuffled computing tasks for outsourcing to external entities according to one embodiment.

In FIG. 9, a tensor 281 has a dimension along which divisions of the tensor 281 lead to a plurality of portions 251, 253, . . . , 255. An input 247 to be applied to the tensor 281 can be split into corresponding parts 211, 213, . . . , 215. An operation of applying the input 247 to the tensor 281 includes the summation of the results of applying parts 211, 213, . . . , 215 to the portions 251, 253, . . . , 255 respectively.

For example, the tensor 281 can be a matrix of rows and columns of elements. Each of the portions 241, 243, . . . , 245 is one or more columns in the matrix. The input 247 is one or more columns of elements to be multiplied with each row of the matrix. Thus, the multiplications of portions 251, 253, . . . , 255 with the parts 211, 213, . . . , 215 respectively can be summed 283 to obtain the result of multiplying the tensor 281 by the input 247.

Thus, the tensor 281 can be split into portions 251, 253, . . . , 255 along the dimension for column divisions. The multiplication of a portion (e.g., 251, 253, . . . , or 255) with a respective part (e.g., 211, 213, . . . , or 215) of the input 247 is independent from other portions. Thus, outsourcing to an entity the computing task of the multiplication of a portion (e.g., 251, 253, . . . , or 255) with a respective part (e.g., 211, 213, . . . , or 215) of the input 247 can be limited by disclosing only the portion (e.g., 251, 253, . . . , or 255) and the corresponding part (211, 213, . . . , or 215) of the input 247 without other portions in the tensor 281 and other parts of the input 247.

The collection of the results of the portions 251, 253, . . . , 255 in response to the parts 211, 213, . . . , 215 of the input 247 can be summed 283 to obtain the result of applying the input 247 to the tensor 281.

Thus, the computing task of applying the input 247 to the tensor 281 can be split into the computing tasks of applying the parts 211, 23, . . . , 214 of the input 247 to the portions 251, 253, . . . , 255 respectively. The computing tasks can be shuffled (and optionally mixed with other computing task from other tensors) for outsourcing to external entities. The results received from the external entities can be summed 283 to obtain the result of applying the input 247 to the tensor 281.

Optionally, at least some of the portions 251, 253, . . . , 255 can be further protected (e.g., using the techniques to protect an ANN model 219 discussed in connection with FIG. 6 and FIG. 7).

In some implementations, the columns of the tensor 281 can be shuffled to form the portions 251, 253, . . . , 255 for outsourcing. Further, the columns in different portions 251, 253, . . . , 255 can be shuffled different for outsource. The column shuffling can further increase the difficulties of recovering the tensor 281 from outsource portions 251, 253, . . . , 255, especially when some of the portions 251, 253, . . . , 255 are further protected via offsetting and/or Homomorphic Encryption.

FIG. 8 and FIG. 9 illustrate the techniques of splitting a tensor along different dimensions. The techniques can be combined and applied repeatedly. For example, a row portion 241 in FIG. 8 can be further split along the dimension of column division as in FIG. 9; and different row portions 241, 243, . . . , 245 can be split differently column-wise. For example, a column portion 251 in FIG. 9 can be further split along the dimension of rows as in FIG. 8; different column portions 251, 253, . . . , 255 can be split differently row-wise; and the resulting portions can be selectively further split column-size.

The techniques of partitioning a tensor 281 according to FIG. 8 and FIG. 9 into portions do not increase (or increase significantly) the computation involved in applying the input 247 to the tensor 281. In contrast, the technique of splitting an item as the sum of multiple parts increases the computation by multiple.

Increasing the number of splitting/partitioning as applied to the tensor 281 can increase the difficult for an external entity to reconstruct the tensor 281.

Figure 10:
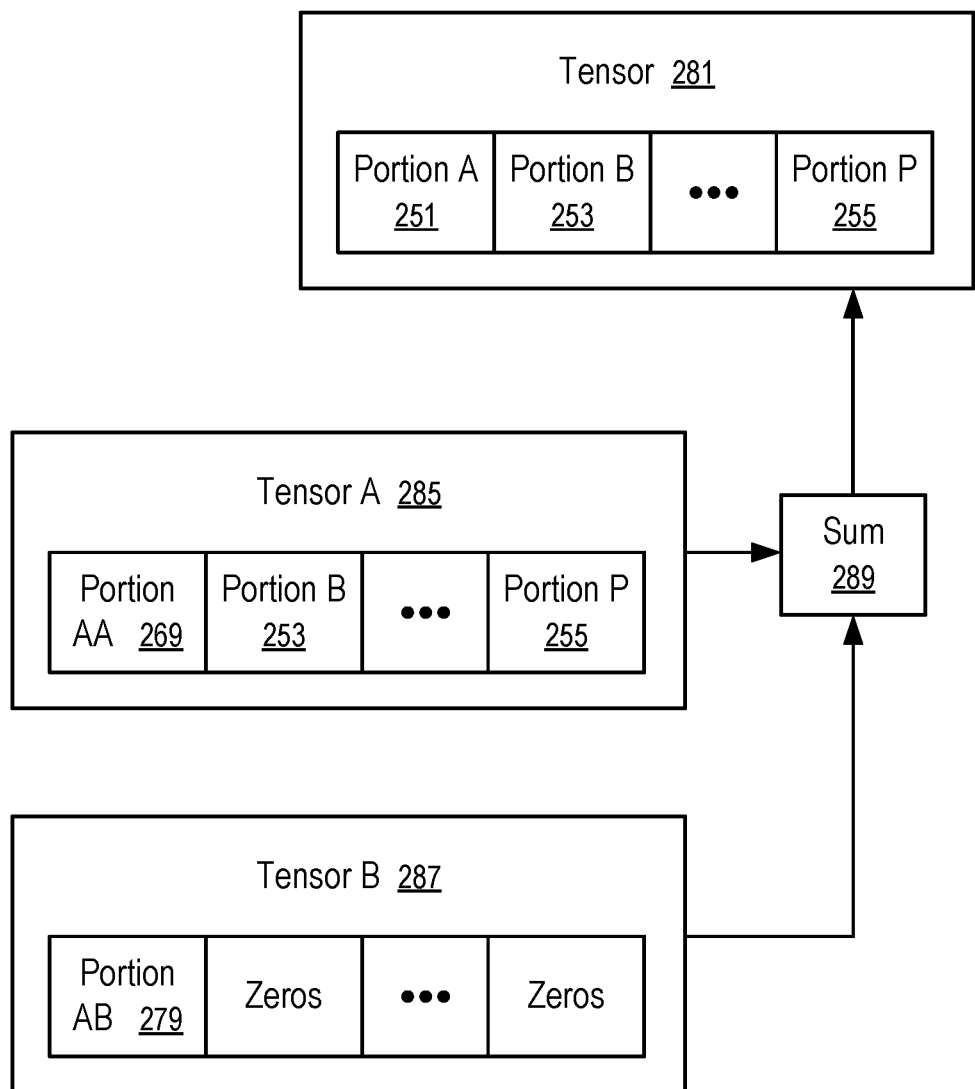
FIG. 10 illustrates a further way to split a tensor to generate shuffled computing tasks for outsourcing to external entities according to one embodiment.

FIG. 10 illustrates a further way to split a tensor to generate shuffled computing tasks for outsourcing to external entities according to one embodiment.

In FIG. 10, a tensor 281 has multiple portions 251, 253, . . . , 255 divided along a column-wise direction. The tensor 281 is split into the sum 289 of two tensors 285 and 287, where each portion in the tensor 281 is the sum of a corresponding portion in the tensor 285 and a corresponding portion in the tensor 287.

For example, a portion 251 in tensor 281 is the sum of a corresponding portion 269 in the tensor 285 and a corresponding portion 279 in the tensor 287. For example, random numbers can be used as numbers in the portion 269; and the portion 279 can be generated as the portion 251 subtracted by the portion 269. As a result, both portions 269 and 279 appear to be random numbers; and the portion 251 of the tensor 281 can be derived from combining both the portions 269 and 279.

Some of the portions (e.g., 253, . . . , 255) of the tensor 281 can be used as is in one of the tensors 285 and 287 without randomization. For example, a portion 253 in tensor 281 is the sum of a corresponding portion 253 in the tensor 285 and a corresponding portion of zeros in the tensor 287. The zeros lead to a known result of zeros when an input part is applied to it. Thus, it is not necessary to outsource the task of applying an input to the zeros, resulting in a reduced set of computing tasks that are to be outsourced.

The technique of FIG. 9 can be applied to the tensors 285 and 287 to generate computing tasks that can be shuffled. For example, when the input parts 211, 213, . . . , 215 are applied to the portions 269, 253, . . . , 255 to generate computing tasks for outsource; non-zero portions (e.g., 279) in the tensor 287 can be applied with the corresponding input parts (e.g., 211) to generate outsourced computing tasks. The computing tasks associated with the zero portions can be eliminated.

Optionally, the columns of the tensor 281 can be shuffled to generate the portion 251 protected via randomized portions 269 and 279 in tensors 285 and 287. Thus, the randomization protection is distributed via the shuffling to various parts of the tensor 281.

Splitting a portion (e.g., 251) as the sum of multiple randomized portions (e.g., 269, 279) can increase the computations by multiple. However, the randomization can improve protection against unauthorized access to the tensor 281.

Similarly, randomization protection can also be applied to row portions (e.g., 241, 243, . . . , 245 in FIG. 8). For example, a row portion 241 can be split as the sum of two randomized row portions, such that the row portion 241 cannot obtained from any of the randomized portions without the entire set of two randomized row portions. Further, the rows can be shuffled to generate the row portion 241 such that the randomization protection is distributed via the shuffling to various parts of the tensor 281.

In some instances, an input 247 is also a tensor with multiple dimensions. The input 247 can be similarly split into portions along different dimensions, or in response to the slitting of the tensor 281. For example, column-wise splitting of tensor 281 in FIG. 9 requires the corresponding row-size splitting of the input 247 in FIG. 9.

Figure 11:
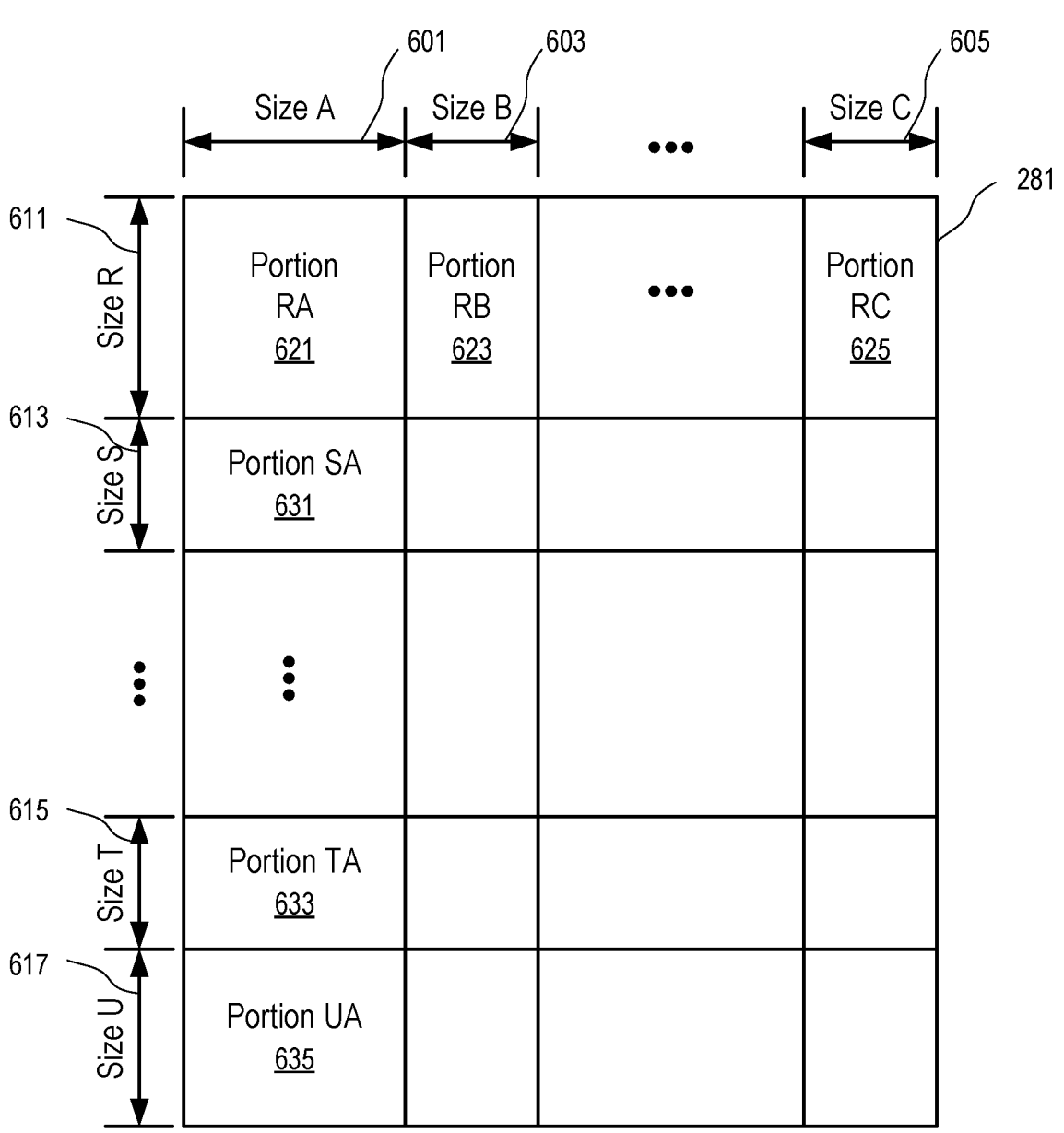
FIG. 11 illustrates a technique to partition a tensor into portions with varying sizes according to one embodiment.

FIG. 11 illustrates a technique to partition a tensor into portions with varying sizes according to one embodiment.

In FIG. 11, the array of elements of a tensor 281 is partitioned into blocks or portions (e.g., 621, 623, . . . , 625; 621, 631, . . . , 633, 635).

Portions (e.g., 621, 623, . . . , 625) can be generated according to a sequence of column sizes 601, 603, . . . , 605. At least two of the column sizes 601, 603, . . . , 605 are different from each other; and optionally, some of the column sizes 601, 603, . . . , 605 can be equal to each other.

For example, in response to a request to partition the tensor 281 into portions, the sequence of column sizes 601, 603, . . . , 605 can be generated randomly to partition the tensor 281 column-wise. For example, a set of predetermined column sizes can be pre-configured according to characteristics of available deep learning accelerators of external entities. The sequence of the column sizes 601, 603, . . . , 605 can be generated by randomly selecting one size from the set of predetermined column sizes. The random selection process can be repeated to generate the sequence of column sizes 601, 603, . . . , 605 that typically changes from one instance of partitioning the tensor 281 to another instance of partitioning the tensor 281.

Similarly, portions (e.g., 621, 631, . . . , 633, 635) have row sizes 611, 613, . . . , 615, 617. At least two of the row sizes 611, 613, . . . , 615, 617 are different from each other; and optionally, some of the row sizes 611, 613, . . . , 615, 617 can be equal to each other. For example, after partitioning the tensor 281 column-wise into column portions 251, 253, . . . , 255 according to the sequence of the column sizes 601, 603, . . . , 605, each of the column portions 251, 253, . . . , 255 can be further partitioned into row portions (e.g., 621, 631, . . . , 633, 635) according to the sequence of row sizes 611, 613, . . . , 615, 617. Alternatively, the tensor 281 can be partitioned row-wise into row portions 241, 243, . . . , 245 according to the sequence of row sizes 611, 613, . . . , 615, 617; and then each of the row portions 241, 243, . . . , 245 is partitioned according to the sequence of the column sizes 601, 603, . . . , 605 into column portions (e.g., 621, 623, . . . , 625).

Figure 12:
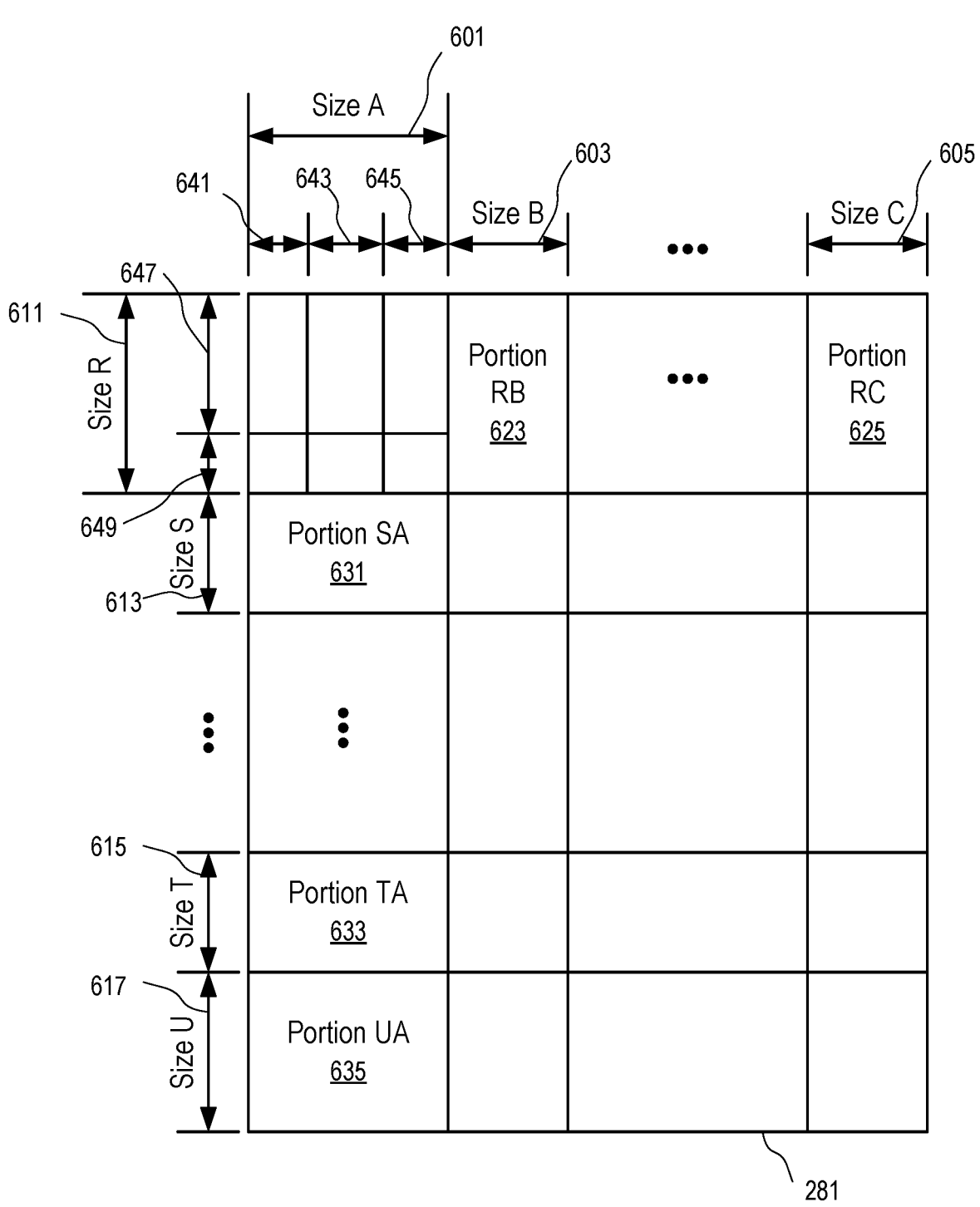
FIG. 12 illustrates a technique to partition a tensor into hierarchical portions with varying granularity levels according to one embodiment.

FIG. 12 illustrates a technique to partition a tensor into hierarchical portions with varying granularity levels according to one embodiment.

In FIG. 12, the tensor 281 is initially partitioned according to a sequence of column sizes 601, 603, . . . , 605 and a sequence of row sizes 611, 613, . . . , 615, 617 in a way as in FIG. 11. Then, selected portions (e.g., 621 in FIG. 11) resulting from the initial partitioning can be further partitioned.

For example, a portion (e.g., 621 in FIG. 11) resulting from the initial partitioning has the column size 601 and the row size 611; and the portion (e.g., 621 in FIG. 11) can be selected for further partitioning accord to column sizes 641, 643 and 645 and row sizes 647 and 649 in FIG. 12.

For example, some of the row sizes (e.g., 647) used in the subsequent partitioning of a portion resulting from a prior partitioning can be equal to a row size (e.g., 613) used in the prior partitioning. Similarly, some of the column sizes used in the subsequent partitioning of a portion resulting from a prior partitioning can be equal to a column size used in the prior partitioning.

A selected portion (e.g., 621 in FIG. 11) of the tensor 281 can be further partitioned in a way similar to the partitioning of the tensor 281 (e.g., as in FIG. 11). Different selected portions (e.g., 621 and 635 in FIG. 11) can be partitioned in different ways (e.g., using different sequences of column sizes and row sizes).

The hierarchical partitioning can increase the variation of sizes and the difficulty to reconstruct the tensor 281 from a collection of out-of-order, shuffled portions, which when reassembled according to the partitioning scheme is same as the tensor 281.

Computing results of portions in a lower hierarchy can be used to compute the result of a corresponding portion in a higher hierarchy. For example, the computing results of portions in the lower hierarchy partitioned according to the column sizes 641, 643 and 645 and the row sizes 647 and 649 can be used to compute the result of the corresponding portion having the column size 601 and the row size 611, in way similar to the computing of the result of tensor 281 from results of column portions 251, 253, . . . , 255 and/or results of row portions 241, 243, . . . , 245, as in FIG. 8 and FIG. 9. For example, in the lower hierarchy, the computing results of column portions in each row can be summed as results of row portions which are then aggregated to form the result of the corresponding portion in the higher hierarchy.

Figure 13:
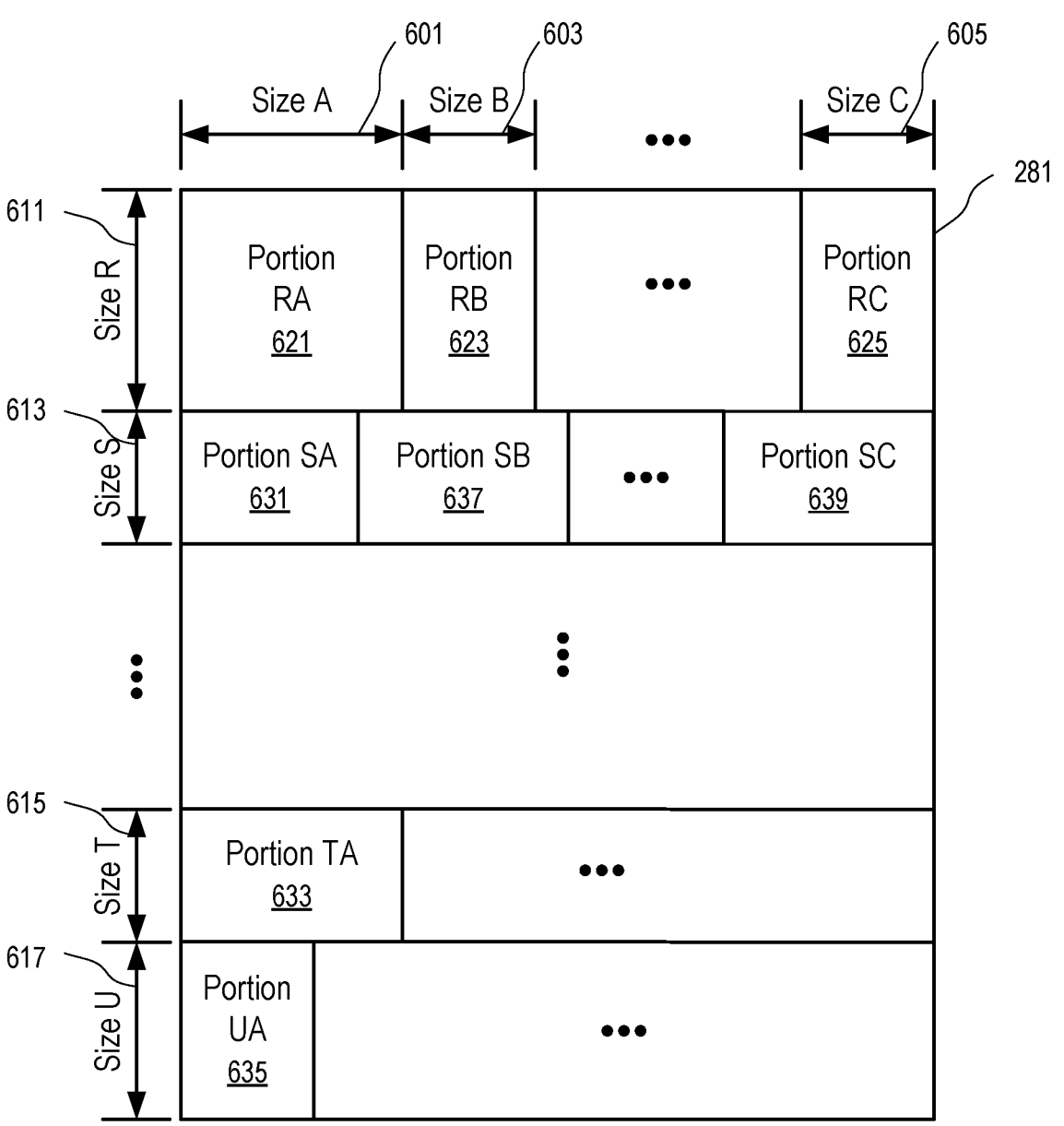
FIG. 13 illustrates a technique to partition a tensor into portions with boundary misalignment along columns according to one embodiment.

FIG. 13 illustrates a technique to partition a tensor into portions with boundary misalignment along columns according to one embodiment.

In FIG. 13, the tensor 281 is partitioned into row portions according to row sizes 611, 613, . . . , 615, 617. Each of the row portions is subsequently partitioned into column portions according to a set of column sizes (e.g., 601, 603, . . . , 605).

For example, the row portion generated according to the row size 611 is partitioned into portions 621, 623, . . . , 625 according to the column sizes 601, 603, . . . , 605 respectively. The row portion generated according to the row size 613 is partitioned into portions 631, 637, . . . , 639 according to another set of column sizes respectively.

Different row portions can be partitioned according to different sequences of column sizes. As a result, the column boundaries of resulting portions do not align with each other in lines. For example, portions 621 and 631 have elements belong to same columns of the tensor 281. However, the portion 621 has elements belong to one or more further columns of the tensor 281, but the portion 631 does not have elements for the one or more further columns. Thus, some of the column boundaries of the portions 621 and 631 are misaligned. In the example illustrated in FIG. 13, left column boundaries of the portions 621 and 631 are aligned, but right column boundaries of the portions 621 and 631 are misaligned.

The sequence of column sizes 601, 603, . . . , 605 can be generated and/or randomized for the partitioning of the row portion corresponding to the row size 611 in FIG. 13; and a different sequence of column sizes can be generated and/or randomized for the partitioning of the row portion corresponding to the row size 613.

For example, the sequence of column sizes 601, 603, . . . , 605 can be shuffled randomly to generate the sequence of column sizes for the partitioning of the row portion corresponding to the row size 613.

Optionally, the sequences of column sizes for the partitioning of the row portions corresponding to the row sizes 611 and 613 in FIG. 13 can be generated to have different numbers of column sizes. For example, after shuffling the sequence of sizes 601, 603, . . . , 605, one of the column sizes can be split into two column sizes to increase the number of column sizes used for the partitioning of the row portion corresponding to the row size 613. Alternatively, or in combination, two of the column sizes can be combined as one column size to decrease the number of column sizes used for the partitioning of the row portion corresponding to the row size 613.

The computing results of the column portions resulting from partitioning a row portion can be summed to generate the result of the row portion (e.g., as in FIG. 9); and the results of the row portions can be aggregated to form the result of the tensor 281 (e.g., as in FIG. 8).

Similar to FIG. 13, the tensor 281 can be alternatively partitioned into portions with boundary misalignment along rows according to one embodiment.

For example, the tensor 281 can be partitioned into column portions 251, 253, . . . , 255 according to column sizes 601, 603, . . . , 605. Each of the column portions 251, 253, . . . , 255 is subsequently partitioned into row portions according to a different set of row sizes (e.g., 611, 613, . . . , 615, 617). Different column portions can be partitioned according to different sequences of row sizes and/or partitioned into different numbers of row portions. Thus, the row boundaries of resulting portions do not align with each other in lines, in a way similar to the misalignment of column boundaries as in FIG. 13.

Figure 14:
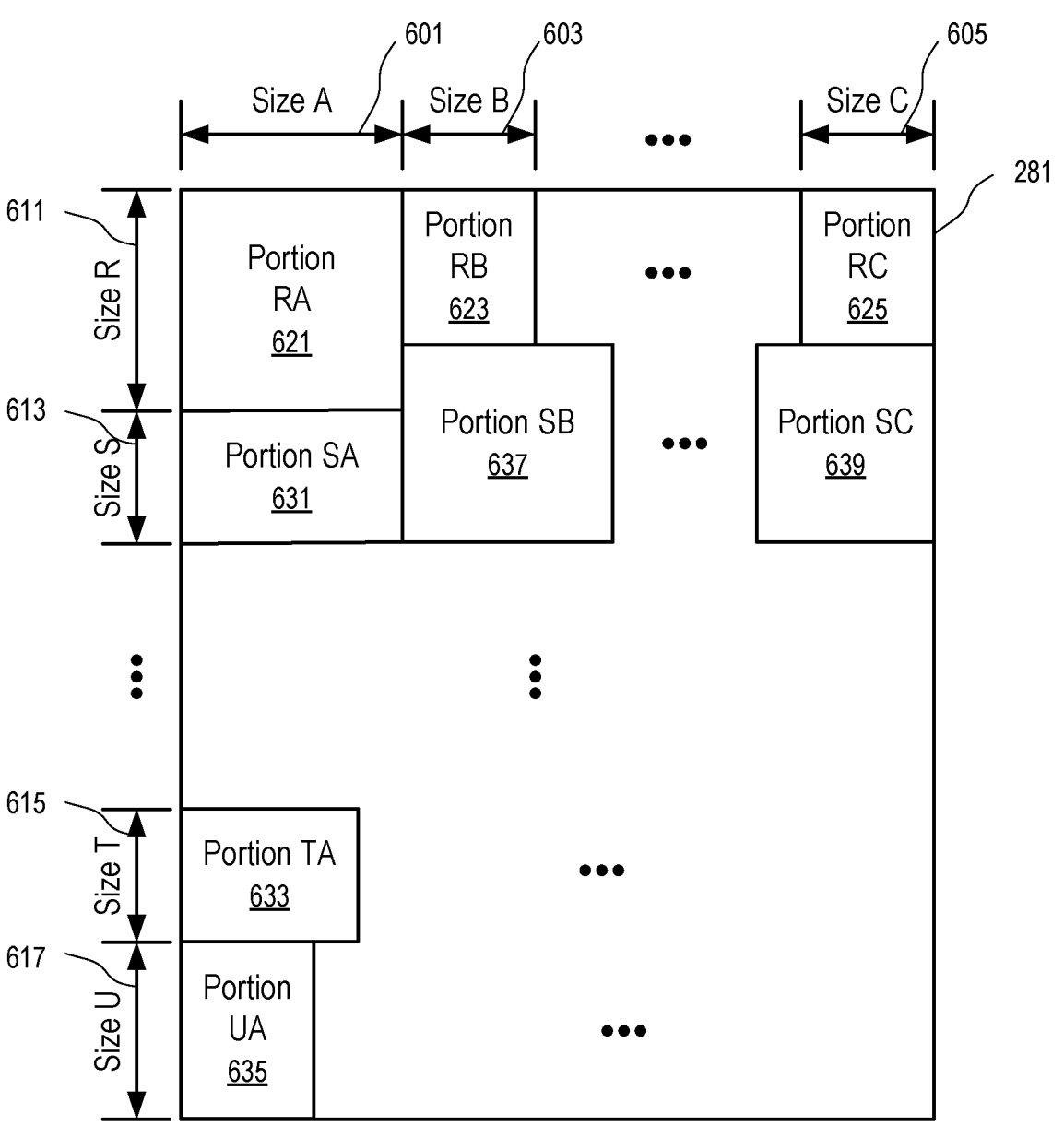
FIG. 14 illustrates a technique to partition a tensor into portions with boundary misalignment along rows and columns according to one embodiment.

FIG. 14 illustrates a technique to partition a tensor into portions with boundary misalignment along rows and columns according to one embodiment.

For example, portions 621 and 623 in FIG. 14 are substantially in a same row position (e.g., having aligned upper row boundaries) but have different row sizes. As a result, the lower row boundaries of the portions 621 and 623 do not align with each other.

Similarly, portions 623 and 637 in FIG. 14 are substantially in a same column position (e.g., having aligned left column boundaries) but have different column sizes. As a result, the right column boundaries of the portions 623 and 637 do not align with each other.

When the portions of the tensor 281 have misaligned row boundaries, the results of the portions can be re-aggregated to from results of portions having aligned row boundaries for summation row-wise.

For example, in FIG. 14, the computing result of portion 621 can be split into an upper portion and a lower portion. The upper portion is to have row alignment with portions 623, . . . , 625 to form a row portion of the tensor 281; and the aggregation of the lower portion and the portion 631 is to have row alignment with portions 637, . . . , 639 to form another row portion. Thus, the results of the row portions can be computed via summation (e.g., as in FIG. 9).

FIG. 15 shows an integrated circuit device 301 having a Deep Learning Accelerator 303 and random access memory 305 configured according to one embodiment.

For example, a computing device having an integrated circuit device 301 can be used to perform the outsourced computing 103 in FIG. 1 and the deep learning accelerator computation 105 of FIG. 3.

The Deep Learning Accelerator 303 in FIG. 15 includes processing units 311, a control unit 313, and local memory 315. When vector and matrix operands are in the local memory 315, the control unit 313 can use the processing units 311 to perform vector and matrix operations in accordance with instructions. Further, the control unit 313 can load instructions and operands from the random access memory 305 through a memory interface 317 and a high speed/bandwidth connection 319.

The integrated circuit device 301 is configured to be enclosed within an integrated circuit package with pins or contacts for a memory controller interface 307.

The memory controller interface 307 is configured to support a standard memory access protocol such that the integrated circuit device 301 appears to a typical memory controller in a way same as a conventional random access memory device having no Deep Learning Accelerator 303. For example, a memory controller external to the integrated circuit device 301 can access, using a standard memory access protocol through the memory controller interface 307, the random access memory 305 in the integrated circuit device 301.

The integrated circuit device 301 is configured with a high bandwidth connection 319 between the random access memory 305 and the Deep Learning Accelerator 303 that are enclosed within the integrated circuit device 301. The bandwidth of the connection 319 is higher than the bandwidth of the connection 309 between the random access memory 305 and the memory controller interface 307.

In one embodiment, both the memory controller interface 307 and the memory interface 317 are configured to access the random access memory 305 via a same set of buses or wires. Thus, the bandwidth to access the random access memory 305 is shared between the memory interface 317 and the memory controller interface 307. Alternatively, the memory controller interface 307 and the memory interface 317 are configured to access the random access memory 305 via separate sets of buses or wires. Optionally, the random access memory 305 can include multiple sections that can be accessed concurrently via the connection 319. For example, when the memory interface 317 is accessing a section of the random access memory 305, the memory controller interface 307 can concurrently access another section of the random access memory 305. For example, the different sections can be configured on different integrated circuit dies and/or different planes/banks of memory cells; and the different sections can be accessed in parallel to increase throughput in accessing the random access memory 305. For example, the memory controller interface 307 is configured to access one data unit of a predetermined size at a time; and the memory interface 317 is configured to access multiple data units, each of the same predetermined size, at a time.

In one embodiment, the random access memory 305 and the integrated circuit device 301 are configured on different integrated circuit dies configured within a same integrated circuit package. Further, the random access memory 305 can be configured on one or more integrated circuit dies that allows parallel access of multiple data elements concurrently.

In some implementations, the number of data elements of a vector or matrix that can be accessed in parallel over the connection 319 corresponds to the granularity of the Deep Learning Accelerator operating on vectors or matrices. For example, when the processing units 311 can operate on a number of vector/matrix elements in parallel, the connection 319 is configured to load or store the same number, or multiples of the number, of elements via the connection 319 in parallel.

Optionally, the data access speed of the connection 319 can be configured based on the processing speed of the Deep Learning Accelerator 303. For example, after an amount of data and instructions have been loaded into the local memory 315, the control unit 313 can execute an instruction to operate on the data using the processing units 311 to generate output. Within the time period of processing to generate the output, the access bandwidth of the connection 319 allows the same amount of data and instructions to be loaded into the local memory 315 for the next operation and the same amount of output to be stored back to the random access memory 305. For example, while the control unit 313 is using a portion of the local memory 315 to process data and generate output, the memory interface 317 can offload the output of a prior operation into the random access memory 305 from, and load operand data and instructions into, another portion of the local memory 315. Thus, the utilization and performance of the Deep Learning Accelerator are not restricted or reduced by the bandwidth of the connection 319.

The random access memory 305 can be used to store the model data of an Artificial Neural Network and to buffer input data for the Artificial Neural Network. The model data does not change frequently. The model data can include the output generated by a compiler for the Deep Learning Accelerator to implement the Artificial Neural Network. The model data typically includes matrices used in the description of the Artificial Neural Network and instructions generated for the Deep Learning Accelerator 303 to perform vector/matrix operations of the Artificial Neural Network based on vector/matrix operations of the granularity of the Deep Learning Accelerator 303. The instructions operate not only on the vector/matrix operations of the Artificial Neural Network, but also on the input data for the Artificial Neural Network.

In one embodiment, when the input data is loaded or updated in the random access memory 305, the control unit 313 of the Deep Learning Accelerator 303 can automatically execute the instructions for the Artificial Neural Network to generate an output of the Artificial Neural Network. The output is stored into a predefined region in the random access memory 305. The Deep Learning Accelerator 303 can execute the instructions without help from a Central Processing Unit (CPU). Thus, communications for the coordination between the Deep Learning Accelerator 303 and a processor outside of the integrated circuit device 301 (e.g., a Central Processing Unit (CPU)) can be reduced or eliminated.

Optionally, the logic circuit of the Deep Learning Accelerator 303 can be implemented via Complementary Metal Oxide Semiconductor (CMOS). For example, the technique of CMOS Under the Array (CUA) of memory cells of the random access memory 305 can be used to implement the logic circuit of the Deep Learning Accelerator 303, including the processing units 311 and the control unit 313. Alternatively, the technique of CMOS in the Array of memory cells of the random access memory 305 can be used to implement the logic circuit of the Deep Learning Accelerator 303.

In some implementations, the Deep Learning Accelerator 303 and the random access memory 305 can be implemented on separate integrated circuit dies and connected using Through-Silicon Vias (TSV) for increased data bandwidth between the Deep Learning Accelerator 303 and the random access memory 305. For example, the Deep Learning Accelerator 303 can be formed on an integrated circuit die of a Field-Programmable Gate Array (FPGA) or Application Specific Integrated circuit (ASIC).

Alternatively, the Deep Learning Accelerator 303 and the random access memory 305 can be configured in separate integrated circuit packages and connected via multiple point-to-point connections on a printed circuit board (PCB) for parallel communications and thus increased data transfer bandwidth.

The random access memory 305 can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer that is located above the memory element columns, and wires of the other layer run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory 305. The non-volatile memory in the random access memory 305 can be used to store the model data of an Artificial Neural Network. Thus, after the integrated circuit device 301 is powered off and restarts, it is not necessary to reload the model data of the Artificial Neural Network into the integrated circuit device 301. Further, the non-volatile memory can be programmable/rewritable. Thus, the model data of the Artificial Neural Network in the integrated circuit device 301 can be updated or replaced to implement an update Artificial Neural Network, or another Artificial Neural Network.

The processing units 311 of the Deep Learning Accelerator 303 can include vector-vector units, matrix-vector units, and/or matrix-matrix units. Examples of units configured to perform for vector-vector operations, matrix-vector operations, and matrix-matrix operations are discussed below in connection with FIG. 16 to FIG. 18.

Figure 16:
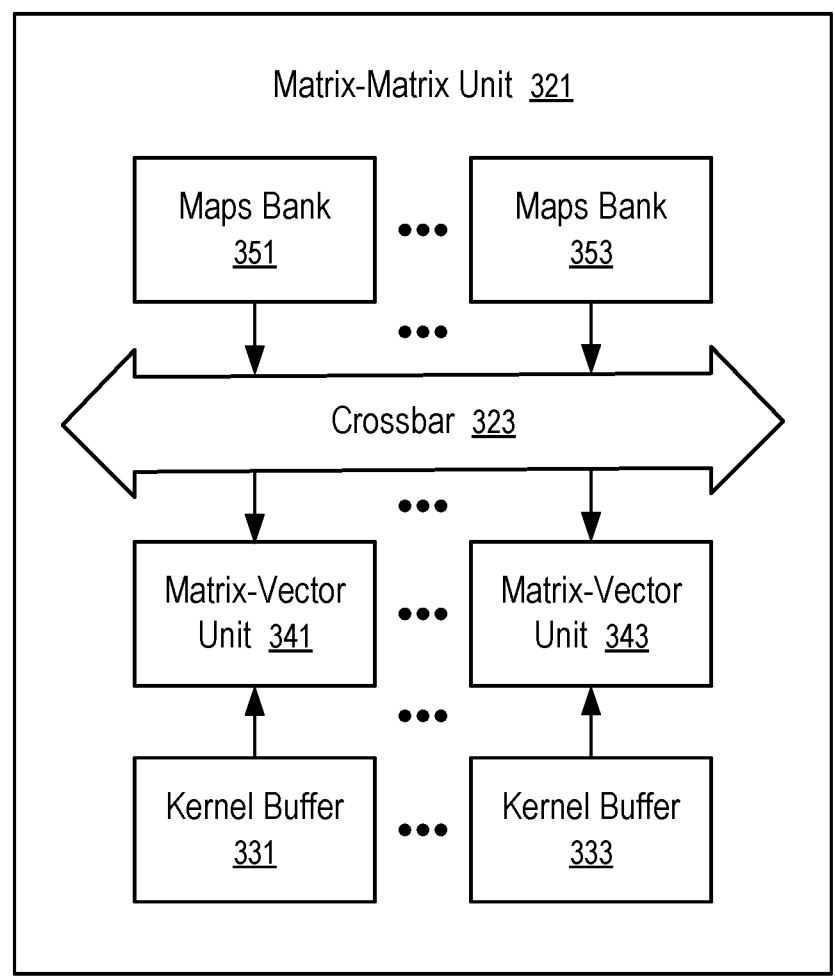
FIG. 16 shows a processing unit configured to perform matrix-matrix operations according to one embodiment.

FIG. 16 shows a processing unit configured to perform matrix-matrix operations according to one embodiment. For example, the matrix-matrix unit 321 of FIG. 16 can be used as one of the processing units 311 of the Deep Learning Accelerator 303 of FIG. 15.

In FIG. 16, the matrix-matrix unit 321 includes multiple kernel buffers 331 to 333 and multiple the maps banks 351 to 353. Each of the maps banks 351 to 353 stores one vector of a matrix operand that has multiple vectors stored in the maps banks 351 to 353 respectively; and each of the kernel buffers 331 to 333 stores one vector of another matrix operand that has multiple vectors stored in the kernel buffers 331 to 333 respectively. The matrix-matrix unit 321 is configured to perform multiplication and accumulation operations on the elements of the two matrix operands, using multiple matrix-vector units 341 to 343 that operate in parallel.

A crossbar 323 connects the maps banks 351 to 353 to the matrix-vector units 341 to 343. The same matrix operand stored in the maps bank 351 to 353 is provided via the crossbar 323 to each of the matrix-vector units 341 to 343; and the matrix-vector units 341 to 343 receives data elements from the maps banks 351 to 353 in parallel. Each of the kernel buffers 331 to 333 is connected to a respective one in the matrix-vector units 341 to 343 and provides a vector operand to the respective matrix-vector unit. The matrix-vector units 341 to 343 operate concurrently to compute the operation of the same matrix operand, stored in the maps banks 351 to 353 multiplied by the corresponding vectors stored in the kernel buffers 331 to 333. For example, the matrix-vector unit 341 performs the multiplication operation on the matrix operand stored in the maps banks 351 to 353 and the vector operand stored in the kernel buffer 331, while the matrix-vector unit 343 is concurrently performing the multiplication operation on the matrix operand stored in the maps banks 351 to 353 and the vector operand stored in the kernel buffer 333.

Figure 17:
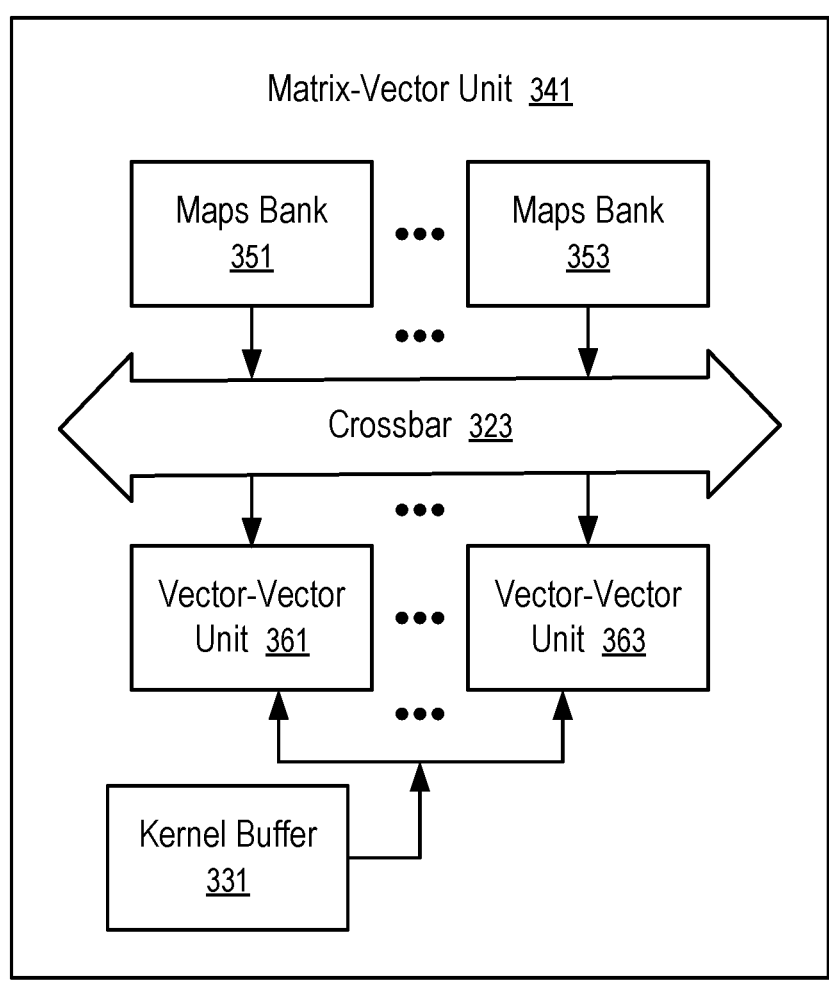
FIG. 17 shows a processing unit configured to perform matrix-vector operations according to one embodiment.

Each of the matrix-vector units 341 to 343 in FIG. 16 can be implemented in a way as illustrated in FIG. 17.

FIG. 17 shows a processing unit configured to perform matrix-vector operations according to one embodiment. For example, the matrix-vector unit 341 of FIG. 17 can be used as any of the matrix-vector units in the matrix-matrix unit 321 of FIG. 16.

In FIG. 17, each of the maps banks 351 to 353 stores one vector of a matrix operand that has multiple vectors stored in the maps banks 351 to 353 respectively, in a way similar to the maps banks 351 to 353 of FIG. 16. The crossbar 323 in FIG. 17 provides the vectors from the maps banks 351 to the vector-vector units 361 to 363 respectively. A same vector stored in the kernel buffer 331 is provided to the vector-vector units 361 to 363.

The vector-vector units 361 to 363 operate concurrently to compute the operation of the corresponding vector operands, stored in the maps banks 351 to 353 respectively, multiplied by the same vector operand that is stored in the kernel buffer 331. For example, the vector-vector unit 361 performs the multiplication operation on the vector operand stored in the maps bank 351 and the vector operand stored in the kernel buffer 331, while the vector-vector unit 363 is concurrently performing the multiplication operation on the vector operand stored in the maps bank 353 and the vector operand stored in the kernel buffer 331.

When the matrix-vector unit 341 of FIG. 17 is implemented in a matrix-matrix unit 321 of FIG. 16, the matrix-vector unit 341 can use the maps banks 351 to 353, the crossbar 323 and the kernel buffer 331 of the matrix-matrix unit 321.

Figure 18:
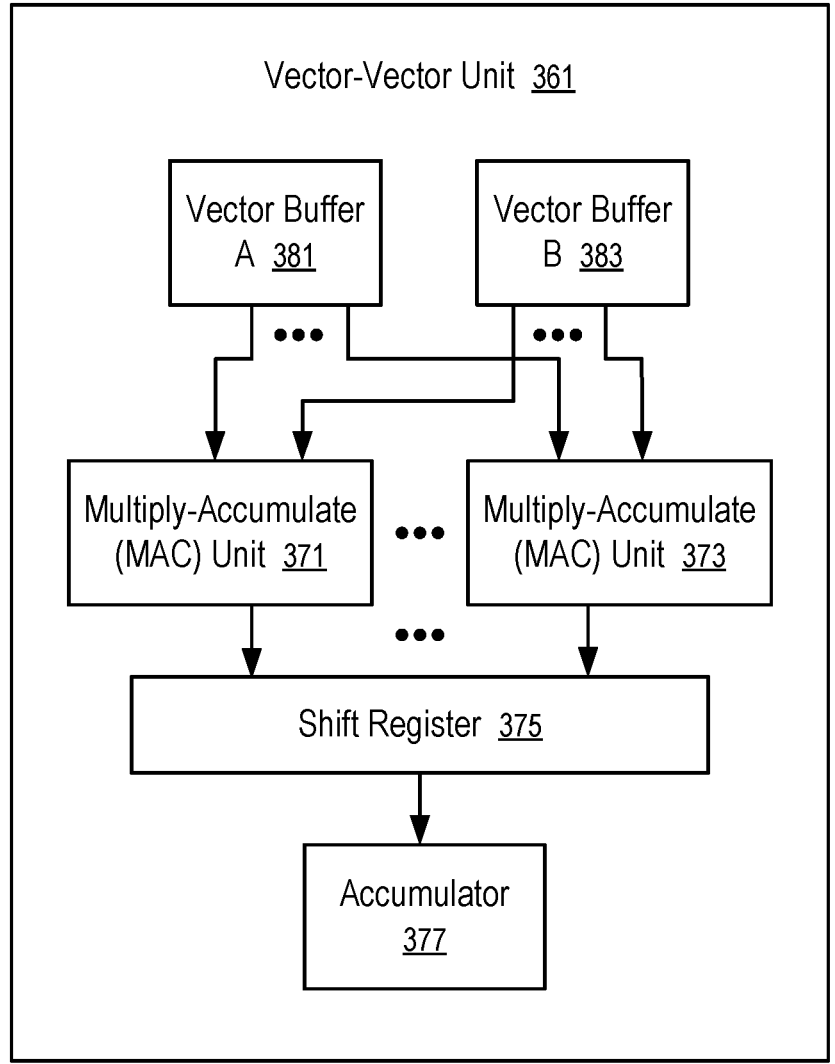
FIG. 18 shows a processing unit configured to perform vector-vector operations according to one embodiment.

Each of the vector-vector units 361 to 363 in FIG. 17 can be implemented in a way as illustrated in FIG. 18.

FIG. 18 shows a processing unit configured to perform vector-vector operations according to one embodiment. For example, the vector-vector unit 361 of FIG. 18 can be used as any of the vector-vector units in the matrix-vector unit 341 of FIG. 17.

In FIG. 18, the vector-vector unit 361 has multiple multiply-accumulate (MAC) units 371 to 373. Each of the multiply-accumulate (MAC) units (e.g., 373) can receive two numbers as operands, perform multiplication of the two numbers, and add the result of the multiplication to a sum maintained in the multiply-accumulate unit.

Each of the vector buffers 381 and 383 stores a list of numbers. A pair of numbers, each from one of the vector buffers 381 and 383, can be provided to each of the multiply-accumulate (MAC) units 371 to 373 as input. The multiply-accumulate (MAC) units 371 to 373 can receive multiple pairs of numbers from the vector buffers 381 and 383 in parallel and perform the multiply-accumulate (MAC) operations in parallel. The outputs from the multiply-accumulate (MAC) units 371 to 373 are stored into the shift register 375; and an accumulator 377 computes the sum of the results in the shift register 375.

When the vector-vector unit 361 of FIG. 18 is implemented in a matrix-vector unit 341 of FIG. 17, the vector-vector unit 361 can use a maps bank (e.g., 351 or 353) as one vector buffer 381, and the kernel buffer 331 of the matrix-vector unit 341 as another vector buffer 383.

The vector buffers 381 and 383 can have a same length to store the same number/count of data elements. The length can be equal to, or the multiple of, the count of multiply-accumulate (MAC) units 371 to 373 in the vector-vector unit 361. When the length of the vector buffers 381 and 383 is the multiple of the count of multiply-accumulate (MAC) units 371 to 373, a number of pairs of inputs, equal to the count of the multiply-accumulate (MAC) units 371 to 373, can be provided from the vector buffers 381 and 383 as inputs to the multiply-accumulate (MAC) units 371 to 373 in each iteration; and the vector buffers 381 and 383 feed their elements into the multiply-accumulate (MAC) units 371 to 373 through multiple iterations.

In one embodiment, the communication bandwidth of the connection 319 between the Deep Learning Accelerator 303 and the random access memory 305 is sufficient for the matrix-matrix unit 321 to use portions of the random access memory 305 as the maps banks 351 to 353 and the kernel buffers 331 to 333.

In another embodiment, the maps banks 351 to 353 and the kernel buffers 331 to 333 are implemented in a portion of the local memory 315 of the Deep Learning Accelerator 303. The communication bandwidth of the connection 319 between the Deep Learning Accelerator 303 and the random access memory 305 is sufficient to load, into another portion of the local memory 315, matrix operands of the next operation cycle of the matrix-matrix unit 321, while the matrix-matrix unit 321 is performing the computation in the current operation cycle using the maps banks 351 to 353 and the kernel buffers 331 to 333 implemented in a different portion of the local memory 315 of the Deep Learning Accelerator 303.

Figure 19:
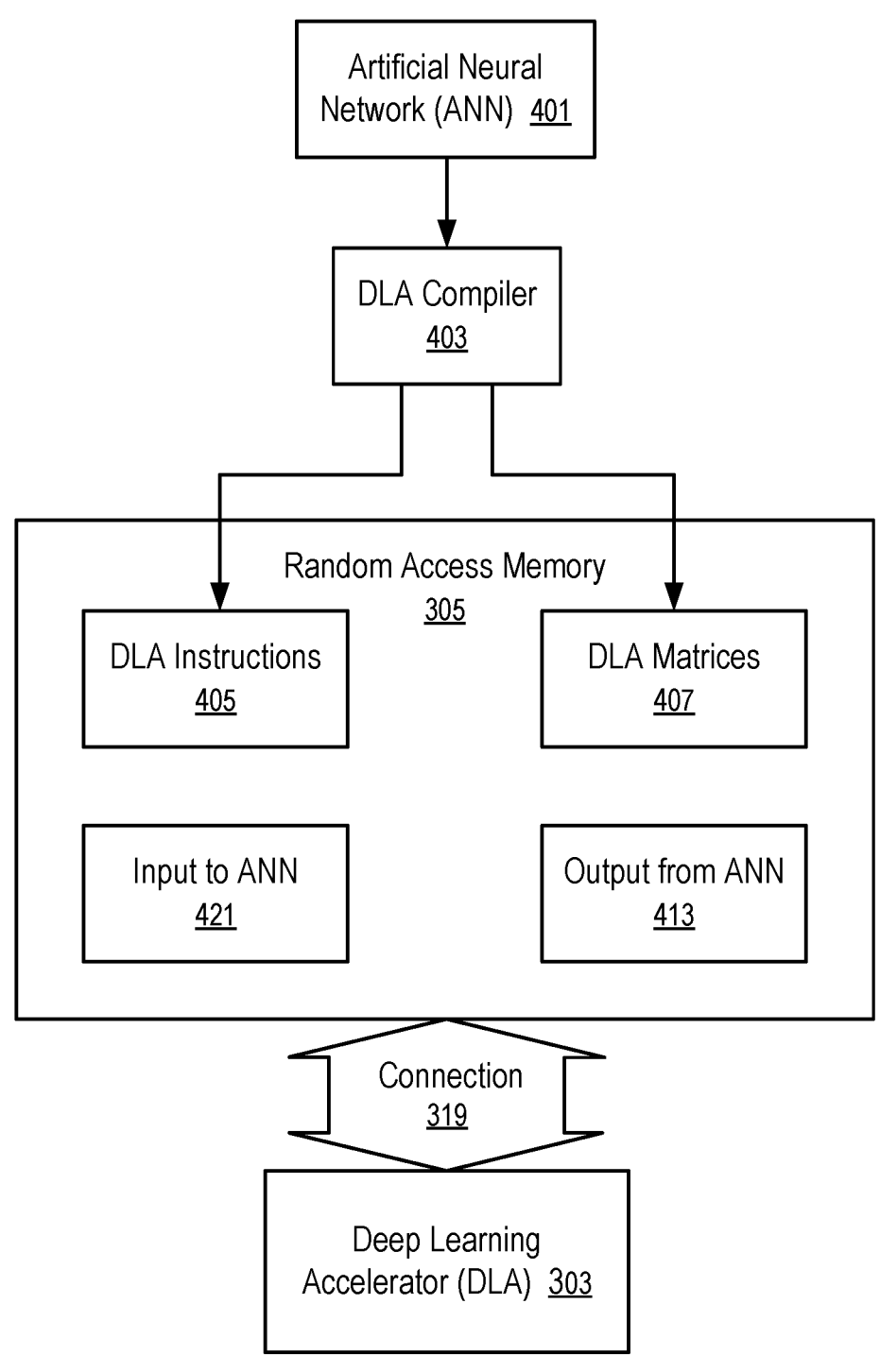
FIG. 19 shows a Deep Learning Accelerator and random access memory configured to autonomously apply inputs to a trained Artificial Neural Network according to one embodiment.

FIG. 19 shows a Deep Learning Accelerator and random access memory configured to autonomously apply inputs to a trained Artificial Neural Network according to one embodiment.

An Artificial Neural Network 401 that has been trained through machine learning (e.g., deep learning) can be described in a standard format (e.g., Open Neural Network Exchange (ONNX)). The description of the trained Artificial Neural Network 401 in the standard format identifies the properties of the artificial neurons and their connectivity.

In FIG. 19, a Deep Learning Accelerator compiler 403 converts trained Artificial Neural Network 401 by generating instructions 405 for a Deep Learning Accelerator 303 and matrices 407 corresponding to the properties of the artificial neurons and their connectivity. The instructions 405 and the matrices 407 generated by the DLA compiler 403 from the trained Artificial Neural Network 401 can be stored in random access memory 305 for the Deep Learning Accelerator 303.

For example, the random access memory 305 and the Deep Learning Accelerator 303 can be connected via a high bandwidth connection 319 in a way as in the integrated circuit device 301 of FIG. 15. The autonomous computation of FIG. 19 based on the instructions 405 and the matrices 407 can be implemented in the integrated circuit device 301 of FIG. 15. Alternatively, the random access memory 305 and the Deep Learning Accelerator 303 can be configured on a printed circuit board with multiple point to point serial buses running in parallel to implement the connection 319.

In FIG. 19, after the results of the DLA compiler 403 are stored in the random access memory 305, the application of the trained Artificial Neural Network 401 to process an input 421 to the trained Artificial Neural Network 401 to generate the corresponding output 413 of the trained Artificial Neural Network 401 can be triggered by the presence of the input 421 in the random access memory 305, or another indication provided in the random access memory 305.

In response, the Deep Learning Accelerator 303 executes the instructions 405 to combine the input 421 and the matrices 407. The matrices 407 can include kernel matrices to be loaded into kernel buffers 331 to 333 and maps matrices to be loaded into maps banks 351 to 353. The execution of the instructions 405 can include the generation of maps matrices for the maps banks 351 to 353 of one or more matrix-matrix units (e.g., 321) of the Deep Learning Accelerator 303.

In some embodiments, the inputs to Artificial Neural Network 401 is in the form of an initial maps matrix.

Portions of the initial maps matrix can be retrieved from the random access memory 305 as the matrix operand stored in the maps banks 351 to 353 of a matrix-matrix unit 321. Alternatively, the DLA instructions 405 also include instructions for the Deep Learning Accelerator 303 to generate the initial maps matrix from the input 421.

According to the DLA instructions 405, the Deep Learning Accelerator 303 loads matrix operands into the kernel buffers 331 to 333 and maps banks 351 to 353 of its matrix-matrix unit 321. The matrix-matrix unit 321 performs the matrix computation on the matrix operands. For example, the DLA instructions 405 break down matrix computations of the trained Artificial Neural Network 401 according to the computation granularity of the Deep Learning Accelerator 303 (e.g., the sizes/dimensions of matrices that loaded as matrix operands in the matrix-matrix unit 321) and applies the input feature maps to the kernel of a layer of artificial neurons to generate output as the input for the next layer of artificial neurons.

Upon completion of the computation of the trained Artificial Neural Network 401 performed according to the instructions 405, the Deep Learning Accelerator 303 stores the output 413 of the Artificial Neural Network 401 at a pre-defined location in the random access memory 305, or at a location specified in an indication provided in the random access memory 305 to trigger the computation.

When the technique of FIG. 19 is implemented in the integrated circuit device 301 of FIG. 15, an external device connected to the memory controller interface 307 can write the input 421 into the random access memory 305 and trigger the autonomous computation of applying the input 421 to the trained Artificial Neural Network 401 by the Deep Learning Accelerator 303. After a period of time, the output 413 is available in the random access memory 305; and the external device can read the output 413 via the memory controller interface 307 of the integrated circuit device 301.

For example, a predefined location in the random access memory 305 can be configured to store an indication to trigger the autonomous execution of the instructions 405 by the Deep Learning Accelerator 303. The indication can optionally include a location of the input 421 within the random access memory 305. Thus, during the autonomous execution of the instructions 405 to process the input 421, the external device can retrieve the output generated during a previous run of the instructions 405, and/or store another set of input for the next run of the instructions 405.

Optionally, a further predefined location in the random access memory 305 can be configured to store an indication of the progress status of the current run of the instructions 405. Further, the indication can include a prediction of the completion time of the current run of the instructions 405 (e.g., estimated based on a prior run of the instructions 405). Thus, the external device can check the completion status at a suitable time window to retrieve the output 413.

In some embodiments, the random access memory 305 is configured with sufficient capacity to store multiple sets of inputs (e.g., 421) and outputs (e.g., 413). Each set can be configured in a predetermined slot/area in the random access memory 305.

The Deep Learning Accelerator (DLA) 303 can execute the instructions 405 autonomously to generate the output 413 from the input 421 according to matrices 407 stored in the random access memory 305 without helps from a processor or device that is located outside of the integrated circuit device 301.

FIG. 20 shows a method of shuffled secure multiparty deep learning computation according to one embodiment.

For example, the method of FIG. 20 can be performed by a shuffled task manager implemented via software and/or hardware in a computing device to shuffle parts of data samples for outsourcing tasks of computing to other computing devices and to shuffle results of the computing applied to the parts back in order for the data samples to generate results of the same computing applied to the data samples, as in FIG. 1 to FIG. 3. The computing device can outsource the tasks to other computing devices having Deep Learning Accelerators (DLA) (e.g., 303 having processing units 311, such as matrix-matrix unit 321, matrix-vector unit 341, vector-vector unit 361, and/or multiply-accumulate (MAC) unit 371 as illustrated in FIG. 15 to FIG. 18). Optionally, the computing device can have a Deep Learning Accelerator (DLA) (e.g., 303) and a compiler 403 to convert a description of an artificial neural network (ANN) 401 to instructions 405 and matrices 407 representative of a task of Deep Learning Accelerator Computation 105. The task is generated such that an operation to sum 117 can be performed before or after the computation 105 without changing the result 157.

At block 431, a computing device having a shuffled task manager generates a plurality of first parts (e.g., 121, 123, . . . , 125; or 161, 163, . . . , 165) from a first data sample (e.g., 111; or 119).

For example, each of the first parts (e.g., 121, 123, . . . 125) can be based on random numbers; and the first parts (e.g., 121, 123, . . . , 125) are generated such that a sum 117 of the first parts (e.g., 121, 123, . . . , 125) is equal to the first data sample (e.g., 111).

For example, to generate the plurality of first parts (e.g., 121, 123, . . . , 125), the computing device can generate a set of random numbers as one part (e.g., 123) among the plurality of first parts (e.g., 121, 123, . . . , 125). Similarly, another part (e.g., 125) can be generated to include random numbers. To satisfy the relation that the sum 117 of the first parts (e.g., 121, 123, . . . , 125) is equal to the first data sample (e.g., 111), a part (e.g., 121) can be generated by subtracting from the data sample (e.g., 111) the sum 117 of the remaining parts (e.g., 123, . . . , 125).

For example, the first parts (e.g., 121, 123, . . . , 125) can be generated and provided at a same precision level as the first data sample (e.g., 111).

For example, each respective data item in the first data sample (e.g., 111) has a corresponding data item in each of the first parts (e.g., 121, 123, . . . , 125); and the respective data item and the corresponding data item are specified via a same number of bits.

At block 433, the computing device generates a plurality of second parts (e.g., 127, 129, . . . , 131) from a second data sample (e.g., 113). The second parts (e.g., 127, 129, . . . , 131) can be generated in a way similar to the generation of the first parts (e.g., 121, 123, . . . , 125)

At block 435, the computing device shuffles, according to a map 101, at least the first parts (e.g., 121, 123, . . . , 125) and the second parts (e.g., 127, 129, . . . , 131) to mix parts (e.g., 121, 135, . . . , 137, 129, . . . , 125) generated at least from the first data sample (e.g., 111) and the second data sample (e.g., 113) (and possibly other data samples (e.g., 115)).

At block 437, the computing device communicates, to a first entity, third parts (e.g., 137, 129, . . . , 125) to request the first entity to apply a same operation of computing 103 to each of the third parts (e.g., 121, 135, . . . ). The third parts (e.g., 137, 129, . . . , 125) are identified according to the map 101 to include at least a first subset from the first parts (e.g., 125) and a second subset from the second parts (e.g., 129).

For improved data privacy protection, the shuffled task manager in the computing device can be configured to exclude the first entity from receiving at least one of the first parts (e.g., 121) and/or at least one of the second parts (e.g., 127).

For example, the same operation of computing 103 can be representative of a computation (e.g., 105) in an artificial neural network 401 configured to be performed by one or more Deep Learning Accelerators (DLA) (e.g., 303) of external entities (e.g., the first entity). The Deep Learning Accelerators (DLA) (e.g., 303) can have matrix-matrix units (e.g., 321), matrix-vector units (e.g., 341), vector-vector units (e.g., 361), and/or multiply-accumulate (MAC) units (e.g., 371) to accelerate computations (e.g., 105) of an artificial neural network 401.

For example, the computing device can include a compiler 403 configured to generate, from a description of a first artificial neural network (e.g., 401), a description of a second artificial neural network represented by instructions 405 and matrices 407 to be executed in deep learning accelerators (DLA) (e.g., 303) to perform the deep learning accelerator computation 105 outsourced to external entities (e.g., the first entities). To outsource a task of performing the operation of computing 103 to the first entity, the computing device can provide the description of a second artificial neural network represented by (or representative of) instructions 405 and matrices 407 to the first entity. The computing device can provide the subset of first parts (e.g., 125) as the inputs (e.g., 421) to the second artificial neural network, and receive, from the first entity, the corresponding outputs (e.g., 413) generated by the Deep Learning Accelerator (DLA) (e.g., 303) of the first entity by running the instructions 405.

At block 439, the computing device receives, from the first entity, third results (e.g., 145, 147, . . . , 149) of applying the same operation of computing 103 to the third parts (e.g., 137, 129, . . . , 125) respectively.

At block 441, the computing device generates, based at least in part on the third results (e.g., 145, 147, . . . , 149) and the map 101, a first result 151 of applying the same operation of computing 103 to the first data sample (e.g., 111) and a second result (e.g., 153) of applying the same operation of computing 103 to the second data sample (e.g., 113).

For example, the computing device identifies, according to the map 101, fourth results (e.g., 141, . . . , 149) of applying the same operation of the computing 103 to the first parts (e.g., 121, 123, . . . , 125) respectively. The computing device sums (e.g., 117) the fourth results (e.g., 141, . . . , 149) to obtain the first result (e.g., 151) of applying the operation of computing 103 to the first data sample (e.g., 111).

For example, the computing device communicates, to a second entity, the at least one of the first parts (e.g., 121) (which is not communicated to the first entity) and requests the second entity to apply the same operation of computing 103 to each of the at least one of the first parts (e.g., 121). After receiving, from the second entity, respective at least one result (e.g., 141) of applying the same operation of computing 103 to the at least one of the first parts (e.g., 121), the computing device can determine, based on the map 101, that the least one result (e.g., 141) is for the at least one of the first parts (e.g., 121) and thus is to be summed 117 with other results (e.g., 149) of applying the operation of computing 103 to other parts generated from the first data sample to compute the first result (e.g., 151) of applying the operation of computing 103 to the first data sample (e.g., 111).

FIG. 21 shows another method of shuffled secure multi-party deep learning computation according to one embodiment.

For example, the method of FIG. 21 can be performed by a shuffled task manager implemented via software and/or hardware in a computing device to shuffle and offset parts of data samples for outsourcing tasks of computing to other computing devices and to shuffle and reverse offset results of the computing applied to the parts back in order for the data samples to generate results of the same computing applied to the data samples, as in FIG. 1 to FIG. 5. The computing device can outsource the tasks to other computing devices having Deep Learning Accelerators (DLA) (e.g., 303 having processing units 311, such as matrix-matrix unit 321, matrix-vector unit 341, vector-vector unit 361, and/or multiply-accumulate (MAC) unit 371 as illustrated in FIG. 15 to FIG. 18). Optionally, the computing device can have a Deep Learning Accelerator (DLA) (e.g., 303) and a compiler 403 to convert a description of an artificial neural network (ANN) 401 to instructions 405 and matrices 407 representative of a task of Deep Learning Accelerator Computation 105.

At block 451, a shuffled task manager running in a computing device receives a data sample (e.g., 111; or 119) as an input to an artificial neural network 401.

At block 453, the shuffled task manager generates a plurality of unmodified parts (e.g., 161, 163, . . . , 165) from the data sample (e.g., 119) such that a sum (e.g., 117) of the unmodified parts (e.g., 161, 163, . . . , 165) is equal to the data sample (e.g., 119).

At block 455, the shuffled task manager applies an offset operation (e.g., offset 183) to at least one of the plurality of unmodified parts (e.g., 161) to generate a plurality of first parts (e.g., 187, 163, . . . , 165) to represent the data sample (e.g., 119), where a sum of the first parts (e.g., 187, 163, . . . , 165) is not equal to the data sample (e.g., 119).

At block 457, the shuffled task manager shuffles the first parts (e.g., 187, 163, . . . , 165), generated from the data sample (e.g., 119), with second parts (e.g., 127, 129, . . . , 131; 133, 135, . . . , 137, generated from other data samples or dummy/random data samples) to mix parts (e.g., 121, 135, . . . , 137, 129, . . . , 125) as inputs to the artificial neural network 401.

At block 459, the shuffled task manager communicates, to one or more external entities, tasks of computing, where each respective task among the tasks is configured to apply a same computation 105 of the artificial neural network 401 to a respective part configured as one of the inputs to the artificial neural network 401.

At block 461, the shuffled task manager receives, from the one or more external entities, first results (e.g., 141, 143, . . . , 145, 147, . . . , 149, such as results 189, 173, . . . , 175) of applying the same computation 105 of the artificial neural network 401 in the respective tasks outsourced to the one or more external entities.

At block 463, the shuffled task manager generates, based on the first results (e.g., 141, 143, . . . , 145, 147, . . . , 149, such as results 189, 173, . . . , 175) received from the one or more entities, a third result (e.g., 157) of applying the same computation 105 of the artificial neural network 401 to the data sample (e.g., 119).

For example, using the shuffling map 101 that is used initially to shuffle the parts for outsourcing, the shuffled task manager can identify, among the first results (e.g., 141, 143, . . . , 145, 147, . . . , 149) received from the one or more external entities, a subset of the first results (e.g., 141, 143, . . . , 145, 147, . . . , 149), where second results (e.g., 189, 173, . . . , 175) in the subset are generated from applying to the same computation 105 of the artificial neural network 401 to the first parts (e.g., 187, 163, . . . , 165) outsourced to represent the data sample (e.g., 119). The shuffled task manager can perform, according to an offset key (e.g., 181), an operation of offsetting 185 to a fourth result (e.g., 189) of applying the same computation 105 of the artificial neural network 401 to a modified part (e.g., 187) to generate a corresponding fifth result (e.g., 171) of applying the same computation 105 of the artificial neural network 401 to a corresponding unmodified part (e.g., 161). Sixth results (e.g., 171, 173, . . . , 175) of applying the same computation 105 of the artificial neural network 401 to the plurality of unmodified parts (e.g., 161, 165, . . . , 165), including the fifth result (e.g., 171), are summed 117 to obtain the third result (e.g., 157) of applying the same computation 105 of the artificial neural network 401 to the data sample 119.

For example, the shuffled task manager can generate an offset key 181 for the data sample 119 to randomize the operation of offsetting 183 in modifying the unmodified part (e.g., 161), among the plurality of unmodified parts (e.g., 161, 163, . . . , 165), to generate the modified part (e.g., 187) among the first parts (e.g., 187, 163, . . . , 165).

For example, the operation of offsetting 183 can be configured to perform bit-wise shifting, adding a constant, multiplying by a constant, or any combination thereof, to convert each number in the unmodified part (e.g., 161) to a corresponding number in the modified part (187).

FIG. 5 illustrates an example of applying an operation of offsetting 183 to one unmodified part 161. In general, different (or same) operations of offsetting 183 can be applied to more than one unmodified part (e.g., 161) to generate corresponding more than one modified part (e.g., 187) for outsourcing computing tasks.

As in FIG. 3, unmodified parts (e.g., 161, 163, . . . , 165) derived from the data sample 119 can be generated using random numbers such that any subset of the unmodified parts (e.g., 161, 163, . . . , 165) is random and insufficient to recover the data sample 119. The operation of offsetting 183 increases the difficulty for an external entity to recover the data sample 119 when the complete set of outsourced parts 187, 163, . . . , 165 becomes available to the external entity.

The numbers in the modified part (e.g., 187) can be configured to have a same number of bits as corresponding numbers in the unmodified part (e.g., 161) such that the operation of offsetting 183 does not increase the precision requirement in applying the computation 105 of the artificial neural network 401.

For example, a first precision requirement to apply the same computation 105 of the artificial neural network 401 to the modified part 187 is same as a second precision requirement to apply the same computation 105 of the artificial neural network 401 to the unmodified part 161. Further, a third precision requirement to apply the same computation 105 of the artificial neural network 401 to the data sample 119 is same as the second precision requirement to apply the same computation 105 of the artificial neural network 401 to the unmodified part 161. Thus, the conversion of the data sample 119 to parts (e.g., 187, 163, . . . , 165) in outsource tasks of computing do not increase the precision requirement of computing circuits in deep learning accelerators (DLA) 303 used by the external entities. Thus, accelerating circuits of the external entities (e.g., matrix-matrix unit 321, matrix-vector unit 341, vector-vector unit 361, and/or multiply-accumulate (MAC) units 371) usable to apply the computation 105 to the data sample 119 can be sufficient to apply the computation 105 to the outsourced parts (e.g., 187, 163, . . . , 165).

For example, the random numbers in the unmodified parts (e.g., 161) can be generated according to the offset key 181 to have a number of leading bits or tailing bits that are zeros such that after the operation of offsetting 183 is applied, no additional bits are required to present the numbers in the modified part 187 to prevent data/precision loss.

FIG. 22 shows a method to secure computation models in outsourcing tasks of deep learning computation according to one embodiment.

For example, the method of FIG. 22 can be performed by a shuffled task manager implemented via software and/or hardware in a computing device to generate and offset parts of artificial neural network models, generate and offset parts of data samples, generate computing tasks of applying sample parts to model parts for distribution/outsourcing to external entities, and use results receive from the external entities to construct the results of applying the data samples as inputs to the artificial neural network models, as in FIG. 1 to FIG. 7. The computing device can outsource the tasks to other computing devices having Deep Learning Accelerators (DLA) (e.g., 303) having processing units 311, such as matrix-matrix unit 321, matrix-vector unit 341, vector-vector unit 361, and/or multiply-accumulate (MAC) unit 371 as illustrated in FIG. 15 to FIG. 18). Optionally, the computing device can have a Deep Learning Accelerator (DLA) (e.g., 303) and a compiler 403 to convert a description of an artificial neural network (ANN) 401 to instructions 405 and matrices 407 representative of a task of Deep Learning Accelerator Computation 105.

At block 471, the shuffled task manager configured in the computing device can generate, via splitting an artificial neural network model 219, a plurality of first model parts 261, . . . , 265 to represent the artificial neural network model 219.

At block 473, the shuffled task manager in the computing device generates, a plurality of computing tasks. Each of the computing tasks including performing a computation of a model part (e.g., 261) responsive to an input (e.g., sample part 161 or 163, or data sample 119). The computing tasks can include performing computations of the first model parts 261, . . . , 265. The computing tasks can include performing computations of other model parts (e.g., dummy model parts, or model parts for other ANN models).

At block 475, the shuffled task manager in the computing device shuffles (e.g., according to a shuffling map 101) the computing tasks in the distribution of the computing tasks to external entities. Thus, the association of model parts (e.g., 261, . . . , 265) with ANN model (e.g., 219) is obscured. The distribution is configured to exclude each of the external entities from receiving at least one of the first model parts 261, . . . , 265. Without a complete set of the first model parts 261, . . . , 265, an external entity cannot reconstruct the ANN model 219. Further, some of the first parts can be modified parts that are protected via offsetting 183 and/or Homomorphic Encryption.

At block 477, the computing device receives, from the external entities, results of performing the computing tasks.

At block 479, the shuffled task manager in the computing device can identify (e.g., using the shuffling map 101) a subset of the results corresponding to the computations of the first model parts 261, . . . , 265.

At block 480, the shuffled task manager in the computing device can obtain, based on operating on the subset, a result of a computation of the artificial neural network model 219.

For example, the sum 217 of the first model parts 261, . . . , 265 can be configured to be equal to the artificial neural network model 219. Thus, a sum 117 of the results of the first model parts 261, . . . , 265 responsive to a same input (e.g., sample part 161 or 163, or data sample 119) is equal to the result of the ANN model 219 responsive to the same input.

For example, a random number generator can be used to generate random numbers as numbers in at least one of the first model parts 261, . . . , 265. One of the first model parts 261, . . . , 265 can be generated from subtracting a sum of a subset of the first model parts 261, . . . , 265 from the artificial neural network model 219.

In some implementations, the shuffled task manager in the computing device generates a plurality of second model parts 261, . . . , 265 such that a sum of the second model parts 261, . . . , 265 is equal to the artificial neural network model 219. Then, the shuffled task manager applies an operation of offsetting 183 to at least a portion of the second model parts 261, . . . , 265 to generate the first model parts. In such implementations, the sum of the first model parts is not equal to the artificial neural network model 219. Distributing such first model parts to external entities can increase the difficulties for the external entities cooperating with each other to discover the ANN model 219. For example, the operation of offsetting 183 can be applied via bit-wise shifting, adding a constant, or multiplying a constant, or any combination thereof. To determine the computing results of the second model parts from the computing results of the first model parts, the shuffled task manager can apply an operation of reverse offsetting 185.

Optionally, or in combination, at least a portion of the second model parts 261, . . . , 265 can be encrypted using an encryption key to generate the first model parts such that the sum of the first model parts communicated to external entities is not equal to the artificial neural network model 219. To determine the computing results of the second model parts from the computing results of the first model parts provided in ciphertext generated through Homomorphic Encryption, the shuffled task manager can apply an operation of decryption.

To protect a data sample 119 as input to the artificial neural network model, the shuffled task manager can generate, via splitting a data sample, a plurality of first sample parts 161, . . . , 165 to represent the data sample 119. The computing tasks generated for distribution to the external entities can include performing computations of the first model parts 261, . . . , 265 responsive to each of the first sample parts 161, . . . , 165. The distribution of the computing tasks can be configured to exclude each of the external entities from receiving at least one of the first model parts 261, . . . , 265 and at least one of the first sample parts 161, . . . , 165.

Optionally, the first sample parts can be modified parts generated from second sample parts that have a sum equal to the data sample 119. For example, the shuffled task manager can transform (e.g., offsetting 183 or encrypting) at least a portion of the second sample parts to generate the first sample parts, such that a sum of the first sample parts is not equal to the data sample 119.

FIG. 23 shows a method to secure data via splitting a tensor in outsourcing tasks of deep learning computation according to one embodiment.

For example, the method of FIG. 23 can be performed by a shuffled task manager implemented via software and/or hardware in a computing device to generate computing tasks of a tensor or matrix of an artificial neural network for outsourcing to external entities, as in FIG. 1 to FIG. 10. The computing device can outsource the tasks to other computing devices having Deep Learning Accelerators (DLA) (e.g., 303 having processing units 311, such as matrix-matrix unit 321, matrix-vector unit 341, vector-vector unit 361, and/or multiply-accumulate (MAC) unit 371 as illustrated in FIG. 15 to FIG. 18). Optionally, the computing device can have a Deep Learning Accelerator (DLA) (e.g., 303) and a compiler 403 to convert a description of an artificial neural network (ANN) 401 to instructions 405 and matrices 407 representative of computing tasks to be performed using Deep Learning Accelerators (e.g., 303).

At block 481, the shuffled task manager in a computing device receives a tensor 281 having elements specifying a computation of an artificial neural network 401. The tensor 281 has a first dimension and a second dimension.

For example, rows of the tensor 281 are representative of divisions of the tensor along the first dimension; and columns of the tensor 281 are representative of divisions of the tensor along the second dimension.

For example, the tensor 281 can be partitioned along the first dimension to generate row portions 241, 243, . . . , 245, where each of the row portions contains one or more rows of elements of the tensor 281.

For example, the tensor 281 can be partitioned along the second dimension to generate column portions 251, 253, . . . , 255, where each of the column portions contains one or more columns of elements of the tensor 281.

At block 483, the shuffled task manager in the computing device generates a plurality of computing tasks via partitioning, along the first dimension and the second dimension, the tensor into a plurality of portions for the plurality of computing tasks respectively. Each of the computing tasks is configured to operate a respective portion among the plurality of portions.

For example, the tensor 281 can be split into row portions 241, 243, . . . , 245 to generate computing tasks of applying an input 247 to each of the row portions 241, 243, . . . , 245.

For example, the tensor 281 can be split into column portions 251, 253, . . . , 255 to generate computing tasks of applying parts 211, 213, . . . , 215 of an input 247 to the column portions 241, 243, . . . , 245 respectively.

For example, some of (or each of) the row portions 241, 243, . . . , 245 can be each split further into column portions to generate computing tasks in a way similar to the splitting of the tensor 281 into column portions 251, 253, . . . , 255.

For example, some of (or each of) the column portions 251, 253, . . . , 255 can be each split further into row portions to generate computing tasks in a way similar to the splitting of the tensor 281 into row portions 241, 243, . . . , 245.

For example, the portions of the tensor 281 can be configured with first subsets corresponding to the row portions 241, 243, . . . , 245 representing the division of the tensor 281 along the first dimension. Computations involving the first subsets (e.g., row portions 241, 243, . . . , 245) are independent from each other; and aggregation of computing results of the first subsets (e.g., row portions 241, 243, . . . , 245) along the first dimension can generate the result of the computation of the tensor 281 in the artificial neural network 401.

For example, the portions of the tensor 281 can be configured with second subsets corresponding to the column portions 251, 253, . . . , 255 representing the division of the tensor 281 along the second dimension; computations involving the second subsets (e.g., column portions 251, 253, . . . , 255) are independent from each other; and a summation of computing results of the second subsets along the second dimension can generate the result of the computation of the tensor 281 in the artificial neural network 401

At block 485, the shuffled task manager in the computing device shuffles the computing tasks in the distribution of the computing tasks to external entities.

For example, the distribution can be configured such that each of the external entities is excluded from receiving a subset of the portions. Without a complete set of the portions representative of the tensor 281, an external entity cannot reconstruct the tensor 281.

Optionally, at least one of the portions representative of the tensor 281 can be generated via offsetting, bit-wise shifting, adding a constant, multiplying by a constant, or homomorphic encryption, or any combination thereof. Such transformation can make it difficult to reconstruct the tensor even when an external entity can collect and identify a complete set of the portions representative of the tensor 281.

Optionally, the shuffled task manager in the computing device can shuffle the rows and/or columns in the tensor 281 before partitioning the tensor 281 into portions having first subsets corresponding to row portions 241, 243, . . . , 245, and second subsets corresponding to column portions 251, 253, . . . , 255. The row and/or column shuffling can further increase the difficulties in an attempt by an external entity to recover the tensor 281 and/or a contiguous portion of the tensor 281.

At block 487, the shuffled task manager in the computing device communicates the portions to the external entities according to the computing tasks being shuffled and assigned to the external entities.

At block 489, the shuffled task manager in the computing device receives, from the external entities, results of the computing tasks.

At block 491, the shuffled task manager in the computing device generates, using the results from the external entities, a result of the computation of the artificial neural network.

Optionally, a corresponding portion 251 in the tensor 281 can be split into portions (e.g., 269 and 279) corresponding to a third subset of portions representative of the tensor 281 and used in respective computing tasks. A sum of the third subset (e.g., portions 269 and 279) is equal to the corresponding portion 251 in the tensor 281. After obtaining the results of computing tasks, each performed using one portion among the third subset (e.g., portions 269 and 279), the results can be summed 289 to obtain the result of the computation of the corresponding portion 251 of the tensor 281 in the artificial neural network 401.

Optionally, the portions (e.g., 269 and 279) in the third set can be randomized. For example, random numbers can be generated as numbers in at least one first portion (e.g., 269) among the third subset; and the scuffled task manager can generate a second portion (e.g., 269) among the third subset from subtracting, from the corresponding portion 251 in the tensor 281, a sum of the at least one first portion (e.g., 269).

Optionally, each of the external entities receiving a first one (e.g., 269) in the third subset is excluded from receiving from the computing device a second one (e.g., 269) in the third subset.

FIG. 24 shows a method to secure data via partitioning a tensor into portions with varying granularity levels according to one embodiment.

For example, the method of FIG. 24 can be performed by a shuffled task manager implemented via software and/or hardware in a computing device to generate computing tasks of a tensor or matrix of an artificial neural network for outsourcing to external entities, as in FIG. 1 to FIG. 14. The computing device can outsource the tasks to other computing devices having Deep Learning Accelerators (DLA) (e.g., 303 having processing units 311, such as matrix-matrix unit 321, matrix-vector unit 341, vector-vector unit 361, and/or multiply-accumulate (MAC) unit 371 as illustrated in FIG. 15 to FIG. 18). Optionally, the computing device can have a Deep Learning Accelerator (DLA) (e.g., 303) and a compiler 403 to convert a description of an artificial neural network (ANN) 401 to instructions 405 and matrices 407 representative of computing tasks to be performed using Deep Learning Accelerators (e.g., 303).

At block 661, a shuffled task manager in a computing device receives a description of an artificial neural network 401.

For example, the shuffled task manager can include a compiler 403 to convert the description of the artificial neural network 401 into computing tasks to be outsourced to external entities. Each of the computing tasks can include instructions 405 and matrices 407 of a portion of the computation of the artificial neural network 401. Optionally, each computing tasks can be provided to an external entity in the form of a description of a portion of the computation of the artificial neural network 401; and the external entity receiving the description can run a compiler 403 to convert the received description to the instructions 405 and matrices 407 for execution via a deep learning accelerator 303 of the external entity.

At block 663, the shuffled task manager in the computing device identifies, from the description of the artificial neural network 401, a plurality of portions (e.g., 621, 623, . . . , 625; 631, . . . , 633, 635; 637, . . . , 639) of a tensor 281 identified in the description for a computation of the artificial neural network 401. The portions (e.g., 621, 623, . . . , 625; 631, . . . , 633, 635; 637, . . . , 639) are identified to have different sizes and thus varying granularity levels.

For example, the tensor 281 has multiple columns of elements and multiple rows of elements; and the tensor 281 can be partitioned into the portions (e.g., 621, 623, . . . , 625; 631, . . . , 633, 635; 637, . . . , 639) with different column sizes (e.g., 601, 603, . . . , 605) and different row sizes (e.g., 611, 613, . . . , 615, 617).

Optionally, at least two of the portions (e.g., 621 and 631 in FIG. 13; or 623 and 637 in FIG. 14) have elements from one or more same columns of the tensor 281 and have aligned first column boundaries (e.g., left column boundaries) but misaligned second column boundaries (e.g., right column boundaries).

Optionally, at least two of the portions (e.g., 621 and 623 in FIG. 14) have elements from one or more same rows of the tensor and have aligned first row boundaries (e.g., upper row boundaries) but misaligned second row boundaries (e.g., lower row boundaries).

Optionally, the portions can be configured in a hierarchy (e.g., as illustrated in FIG. 12). A first portion (e.g., 623 in FIG. 12) has a row size (e.g., 611 in FIG. 12); a second portion (e.g., 631 in FIG. 12) has a column size (e.g., 601 in FIG. 12); and a subset of the portions has an aggregate row size equal to the row size of the first portion and an aggregated column size equal to the column size of the second portion.

For example, the shuffled task manager can identify a third portion of the tensor 281 in the area to the left of the portion 623 and above the portion 631 in FIG. 12. The third portion has the row size 611 and the column size 601. the shuffled task manager can partition the third portion to generate the subset without partitioning its neighboring portions 623 and 631.

For example, the shuffled task manager can partition the tensor 281 into a plurality of row portions 241, 243, . . . , 245 having different row sizes (e.g., 611, 613, . . . , 617). Then, the shuffled task manager further partitions each of the row portions 241, 243, . . . , 245 according to different sequences of column sizes (e.g., 601, 603, . . . , 605) to identify the plurality of portions. Alternatively, the shuffled task manager can partition the tensor 281 into a plurality of column portions 251, 253, . . . , 255 having different column sizes (e.g., 601, 603, . . . , 605). Then, the shuffled task manager further partitions each of the column portions 251, 253, . . . , 255 according to different sequences of row sizes (e.g., 611, 613, . . . , 617) to identify the plurality of portions.

Optionally, the shuffled task manager can shuffle a first sequence of column sizes (e.g., 601, 603, . . . , 605) used to partition a first row portion (e.g., 241), to generate a second sequence of column sizes used to partition a second row portion (e.g., 243). Similarly, the shuffled task manager can shuffle a first sequence of row sizes (e.g., 611, 613, . . . , 617) used to partition a first column portion (e.g., 251), to generate a second sequence of row sizes used to partition a second column portion (e.g., 253).

Optionally, the shuffled task manager can combine and/or split column sizes in the first sequence to generate the second sequence such that the first row portion (e.g., 241) and the second row portion (e.g., 243) are partitioned into different numbers of portions. Similarly, the shuffled task manager can combine and/or split row sizes in the first sequence to generate the second sequence such that the first column portion (e.g., 251) and the second column portion (e.g., 253) are partitioned into different numbers of portions.

For example, the shuffled task manager can partition the tensor 281 into a plurality of column portions 251, 253, . . . , 255 having different row sizes (e.g., 601, 603, . . . , 605). Then, the shuffled task manager further partitions each of the columns portions 251, 253, . . . , 255 according to different randomly generated sequences of row sizes (e.g., 611, 613, . . . , 617) to identify the plurality of portions.

At block 665, the shuffled task manager in the computing device generates a plurality of computing tasks, where each of the computing tasks is configured to operate based on one of the portions (e.g., 621, 623, . . . , 625; 631, . . . , 633, 635; 637, . . . , 639) of the tensor 281.

For example, if the tensor 281 is to be multiplied by an input vector/matrix, a portion of the tensor 281 having elements from a subset of columns of the tensor can be configured in the corresponding computing task to be multiplied by a subset of corresponding rows of the input vector/matrix (e.g., as illustrated in FIG. 9).

At block 667, the shuffled task manager in the computing device shuffles at least the computing tasks corresponding to the portions of the tensor 281 in distribution of the computing tasks to external entities.

At block 669, the computing device communicates with the external entities to cause the external entities to perform the computing tasks and provide results of the computing tasks back to the computing device.

Since the computing tasks have been shuffled out of order for distribution to the external entities, it is difficult for the external entities to identify the portions for the tensor 281 and reconstruct the tensor 281 from the identified portions.

Further, the distribution of the computing tasks to external entities can be configured such that each of the external entities is excluded from receiving a subset of the plurality of portions. Without a complete set of the portions, the tensor 281 cannot be reconstructed.

Optionally, at least one of the plurality of portions of the tensor can be further secured via a transformation, such as offsetting, bit-wise shifting, adding a constant, multiplying by a constant, or homomorphic encryption, or any combination thereof.

Optionally, at least one of the plurality of portions of the tensor can be further secured via splitting into the sum of two or more parts (e.g., as the split of portion 251 into the sum 289 of portions 269 and 279 in FIG. 10).

Optionally, the shuffled task manager can shuffle the columns of the tensor, shuffle the rows of the tensor to generate a shuffled tensor, and partition the shuffled tensor into the plurality of portions.

At block 671, the shuffled task manager in the computing device generates, using the results from the external entities, a result of the computation of the artificial neural network.

For example, the results of column portions of a same row position can be summed to generate the result of a row portion corresponding to the row position; and results of different row positions can be aggregated according to their row positions to from the result of the tensor (e.g., as illustrated in FIG. 8 and FIG. 9).

Figure 25:
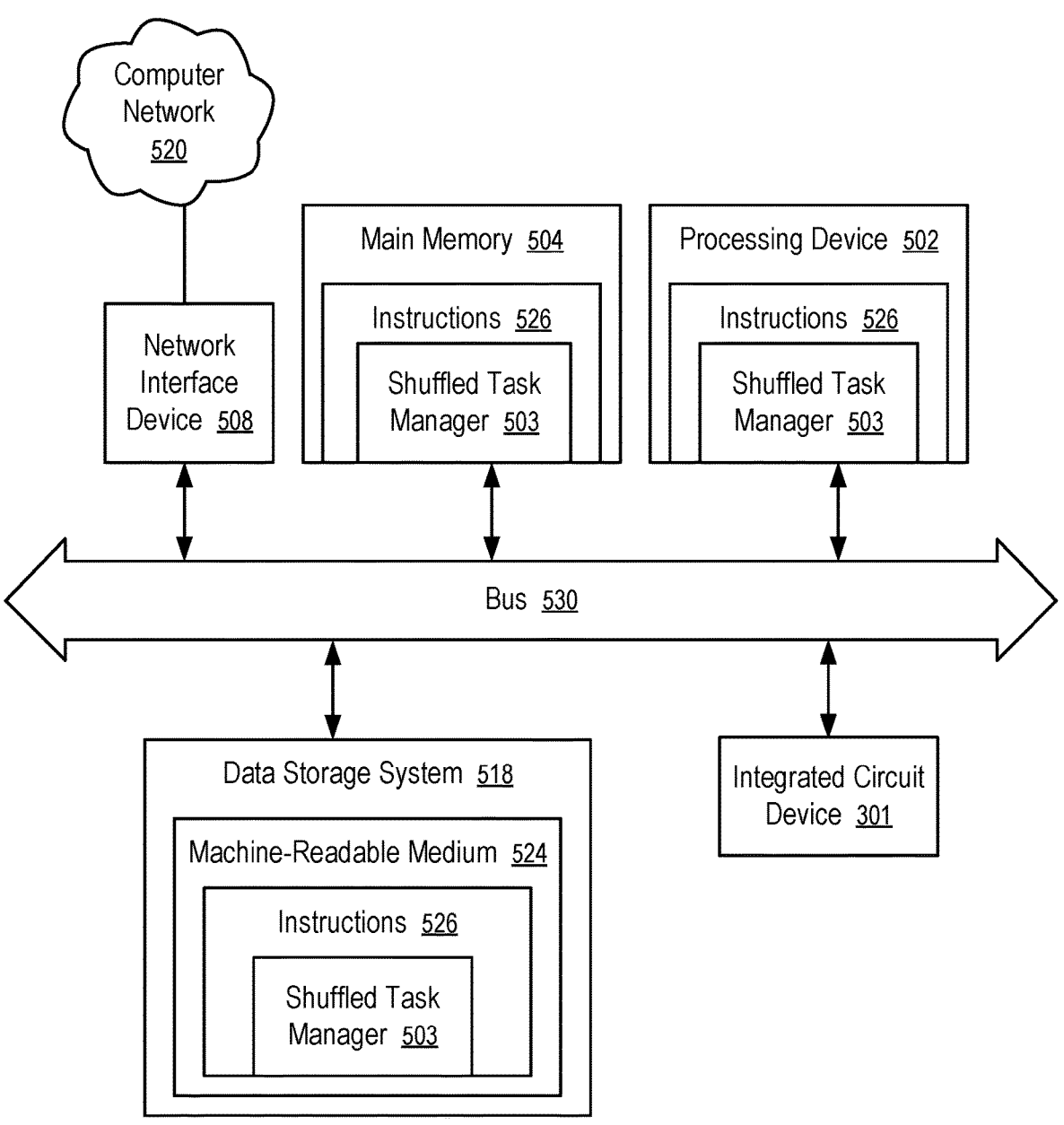
FIG. 25 shows a block diagram of an example computer system in which embodiments of the present disclosure can operate.

FIG. 25 illustrates an example machine of a computer system within which a set of instructions, for causing the machine to perform any one or more of the methodologies discussed herein, can be executed.

In some embodiments, the computer system of FIG. 25 can implement a shuffled task manager with operations of FIG. 20, FIG. 21, FIG. 22, FIG. 23, and/or FIG. 24. The shuffled task manager can optionally include a compiler 403 of FIG. 19 with an integrated circuit device 301 of FIG. 15 having matrix processing units illustrated in FIG. 16 to FIG. 18.

The computer system of FIG. 25 can be used to perform the operations of a shuffled task manager 503 described with reference to FIG. 1 to FIG. 24 by executing instructions configured to perform the operations corresponding to the shuffled task manager 503.

In some embodiments, the machine can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 25 includes a processing device 502, a main memory 504, and a data storage system 518, which communicate with each other via a bus 530. For example, the processing device 502 can include one or more microprocessors; the main memory can include read-only memory (ROM), flash memory, dynamic random access memory (DRAM), such as synchronous DRAM (SDRAM) or Rambus DRAM (RDRAM), static random access memory (SRAM), etc. The bus 530 can include, or be replaced with, multiple buses.

The processing device 502 in FIG. 25 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations discussed in connection with the DLA compiler 403. Optionally, the processing device 502 can include a Deep Learning Accelerator 303.

The computer system of FIG. 25 can further include a network interface device 508 to communicate over a computer network 520.

Optionally, the bus 530 is connected to an integrated circuit device 301 that has a Deep Learning Accelerator 303 and Random Access Memory 305 illustrated in FIG. 15. The compiler 403 can write its compiler output (e.g., instructions 405 and matrices 407) into the Random Access Memory 305 of the integrated circuit device 301 to enable the Integrated Circuit Device 301 to perform matrix computations of an Artificial Neural Network 401 specified by the ANN description. Optionally, the compiler output (e.g., instructions 405 and matrices 407) can be stored into the Random Access Memory 305 of one or more other integrated circuit devices 301 through the network interface device 508 and the computer network 520.

The data storage system 518 can include a machine-readable medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system, the main memory 504 and the processing device 502 also constituting machine-readable storage media.

In one embodiment, the instructions 526 include instructions to implement functionality corresponding to a shuffled task manager 503, such as the shuffled task manager 503 described with reference to FIG. 1 to FIG. 24. While the machine-readable medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which intercon-nects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network inter-faces, printers, scanners, video cameras and other devices known in the art. In one embodiment, when the data pro-cessing system is a server system, some of the I/O devices, such as printers, scanners, mice, and/or keyboards, are optional.

The inter-connect can include one or more buses con-nected to one another through various bridges, controllers and/or adapters. In one embodiment the I/O controllers include a USB (Universal Serial Bus) adapter for controlling USB peripherals, and/or an IEEE-2394 bus adapter for controlling IEEE-2394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a micropro-cessor.

Alternatively, or in combination, the functions and opera-tions as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a comput-ing product in a variety of forms and are capable of being applied regardless of the particular type of machine or computer-readable media used to actually effect the distri-bution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer pro-grams." The computer programs typically include one or more instructions set at various times in various memory and storage devices in a computer, and that, when read and executed by one or more processors in a computer, cause the computer to perform operations necessary to execute ele-ments involving the various aspects.

A machine readable medium can be used to store software and data which when executed by a data processing system causes the system to perform various methods. The execut-able software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different central-ized servers and/or peer to peer networks at different times and in different communication sessions or in a same com-munication session. The data and instructions can be obtained in entirety prior to the execution of the applica-tions. Alternatively, portions of the data and instructions can be obtained dynamically, just in time, when needed for execution. Thus, it is not required that the data and instruc-tions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical stor-age media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acousti-cal or other forms of propagated signals, such as carrier waves, infrared signals, digital signals, etc. However, propa-gated signals, such as carrier waves, infrared signals, digital signals, etc. are not tangible machine readable medium and are not configured to store instructions.

In general, a machine readable medium includes any mechanism that provides (i.e., stores and/or transmits) infor-mation in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. How-ever, in certain instances, well known or conventional details are not described in order to avoid obscuring the description. References to one or an embodiment in the present disclo-sure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving, in a computing device, a description of an artificial neural network;
identifying, by the computing device from the description, a plurality of portions of a tensor identified in the description for a computation of the artificial neural network, the portions having different sizes;
generating, by the computing device, a plurality of computing tasks, each of the computing tasks configured to operate based on one of the portions;
shuffling, by the computing device, at least the computing tasks in distribution of the computing tasks to external entities;
communicating, by the computing device, with the external entities to cause the external entities to perform the computing tasks and provide results of the computing tasks to the computing device; and
generating, by the computing device using the results from the external entities, a result of the computation of the artificial neural network.

2. The method of claim 1, wherein the tensor has multiple columns of elements and multiple rows of elements; and the portions have different column sizes and different row sizes.

3. The method of claim 2, wherein at least two of the portions have aligned first column boundaries but misaligned second column boundaries.

4. The method of claim 3, wherein at least two of the portions have aligned first row boundaries but misaligned second row boundaries.

5. The method of claim 2, wherein the portions have a first portion, a second portion, and a subset not including the first portion and the second portion; and the subset has an aggregate row size equal to a row size of the first portion and an aggregated column size equal to a column size of the second portion.

6. The method of claim 5, further comprising:
identifying a third portion of the tensor having the row size and the column size; and
partitioning the third portion to generate the subset.

7. The method of claim 2, further comprising:
partitioning the tensor into a plurality of row portions; and
partitioning each of the row portions according to different sequences of column sizes to identify the plurality of portions.

8. The method of claim 7, further comprising:
shuffling a first sequence of column sizes used to partition a first row portion, to generate a second sequence of column sizes used to partition a second row portion;
wherein the first row portion and the second row portion are partitioned into different numbers of portions.

9. The method of claim 2, further comprising:
applying a transformation to generate at least one of the plurality of portions;
wherein the transformation includes offsetting, bit-wise shifting, adding a constant, multiplying by a constant, or homomorphic encryption, or any combination thereof.

10. The method of claim 9, wherein each of the external entities is excluded from receiving a subset of the plurality of portions.

11. The method of claim 10, further comprising:
shuffling columns of the tensor and rows of the tensor to generate the plurality of portions.

12. A computing device, comprising:
memory; and
at least one microprocessor coupled to the memory and configured via instructions to:
receive a description of an artificial neural network;
identify, from the description, a plurality of portions of a tensor identified in the description for a computation of the artificial neural network, the portions having different sizes;
generate, by the computing device, a plurality of computing tasks, each of the computing tasks configured to operate based on one of the portions;
shuffle, by the computing device, at least the computing tasks in distribution of the computing tasks to external entities;
communicate, by the computing device, with the external entities to cause the external entities to perform the computing tasks and provide results of the computing tasks to the computing device; and
generate, by the computing device using the results from the external entities, a result of the computation of the artificial neural network.

13. The computing device of claim 12, wherein the tensor has multiple columns of elements and multiple rows of elements; and the portions have different column sizes and different row sizes.

14. The computing device of claim 13, wherein at least two of the portions have aligned first column boundaries but misaligned second column boundaries; and at least two of the portions have aligned first row boundaries but misaligned second row boundaries.

15. The computing device of claim 13, wherein the portions have a first portion, a second portion, and a subset not including the first portion and the second portion; and the subset has an aggregate row size equal to a row size of the first portion and an aggregated column size equal to a column size of the second portion.

16. The computing device of claim 13, further comprising:
partitioning the tensor into a plurality of column portions; and
partitioning each of the column according to different sequences of row sizes to identify the plurality of portions.

17. The computing device of claim 16, further comprising:
shuffling a first sequence of column sizes used to partition a first row portion, to generate a second sequence of column sizes used to partition a second row portion;
wherein the first row portion and the second row portion are partitioned into different numbers of portions.

18. A non-transitory computer storage medium storing instructions which, when executed in a computing device, cause the computing device to perform a method, comprising:
receiving, in the computing device, a description of an artificial neural network;
identifying, by the computing device from the description, a plurality of portions of a tensor identified in the description for a computation of the artificial neural network, the portions having different sizes;

generating, by the computing device, a plurality of computing tasks, each of the computing tasks configured to operate based on one of the portions;

shuffling, by the computing device, at least the computing tasks in distribution of the computing tasks to external entities;

communicating, by the computing device, with the external entities to cause the external entities to perform the computing tasks and provide results of the computing tasks to the computing device; and generating, by the computing device using the results from the external entities, a result of the computation of the artificial neural network.

19. The non-transitory computer storage medium of claim 18, wherein at least two of the portions have aligned first column boundaries but misaligned second column boundaries; and at least two of the portions have aligned first row boundaries but misaligned second row boundaries.

20. The non-transitory computer storage medium of claim 18, wherein the portions have a first portion, a second portion, and a subset not including the first portion and the second portion; and the subset has an aggregate row size equal to a row size of the first portion and an aggregated column size equal to a column size of the second portion.

* * * * *